(12) United States Patent
Tamai

(10) Patent No.: US 7,852,557 B2
(45) Date of Patent: Dec. 14, 2010

(54) STEREOSCOPIC SHEET STRUCTURE

(75) Inventor: Natsuko Tamai, Sumida-ku (JP)

(73) Assignee: Grapac Japan Co., Inc., Tokyo (JP)

( * ) Notice: Subject to any disclaimer, the term of this patent is extended or adjusted under 35 U.S.C. 154(b) by 0 days.

(21) Appl. No.: 11/995,186

(22) PCT Filed: Jul. 12, 2006

(86) PCT No.: PCT/JP2006/313872
§ 371 (c)(1),
(2), (4) Date: Jan. 9, 2008

(87) PCT Pub. No.: WO2007/007793
PCT Pub. Date: Jan. 18, 2007

(65) Prior Publication Data
US 2009/0225419 A1    Sep. 10, 2009

(30) Foreign Application Priority Data

Jul. 12, 2005  (JP) ............................. 2005-202550
Jan. 31, 2006  (JP) ............................. 2006-021838

(51) Int. Cl.
*G02B 27/22*   (2006.01)
(52) U.S. Cl. ...................................... 359/463; 359/619
(58) Field of Classification Search ...................... None
See application file for complete search history.

(56) References Cited

U.S. PATENT DOCUMENTS

| 4,765,656 A | 8/1988 | Becker et al. |
| 6,450,540 B1 | 9/2002 | Kim |

FOREIGN PATENT DOCUMENTS

| JP | 62-161596 A | 7/1987 |
| JP | 7-198905 A | 8/1995 |
| JP | 09-207254 B2 | 8/1997 |
| JP | 10-35083 A | 2/1998 |
| JP | 10-035083 B2 | 2/1998 |
| JP | 11-189000 B2 | 7/1999 |
| JP | 2001-55000 A | 2/2001 |
| JP | 2001-180198 A | 7/2001 |

(Continued)

*Primary Examiner*—Lee Fineman
(74) *Attorney, Agent, or Firm*—Holtz, Holtz, Goodman & Chick, P.C.

(57) ABSTRACT

An object of the present invention is to provide a stereoscopic sheet structure in which a three-dimensional design appears to be changing by changing the angle of observation, the stereoscopic sheet structure being a stereoscopic sheet structure that has: a convex lens assembly which is formed on one surface of a sheet member and in which a plurality of convex lenses are arranged; and a repeating design portion in which a plurality of design units are arranged on a focal plane of the convex lenses at arrangement intervals and/or in arrangement directions different from those of the convex lenses, and which has a continuously deformed design portion in which the arrangement intervals and arrangement directions of the design units regularly change while satisfying the condition of $0.95 \leq D_{N \sim N+1}/D_{N+1 \sim N+2} \leq 0.95$ and $-1 \leq \theta \leq +1$. It should be noted that the D is an interval between adjacent design elements, and the θ is an intersection angle that is formed between a straight line connecting adjacent design elements and a straight line connecting one of the adjacent design elements to a design element adjacent thereto.

8 Claims, 29 Drawing Sheets

FOREIGN PATENT DOCUMENTS

| | | |
|---|---|---|
| JP | 2002-46400 A | 2/2002 |
| JP | 2002-120499 A | 4/2002 |
| JP | 2002-120500 A | 4/2002 |
| JP | 2002-169234 A | 6/2002 |
| JP | 2002-307900 A | 10/2002 |
| JP | 2003-39583 A | 2/2003 |
| JP | 2003039583 A * | 2/2003 |
| JP | 2003-226099 A | 8/2003 |
| JP | 2003220173 A | 8/2003 |

* cited by examiner

Figure 1
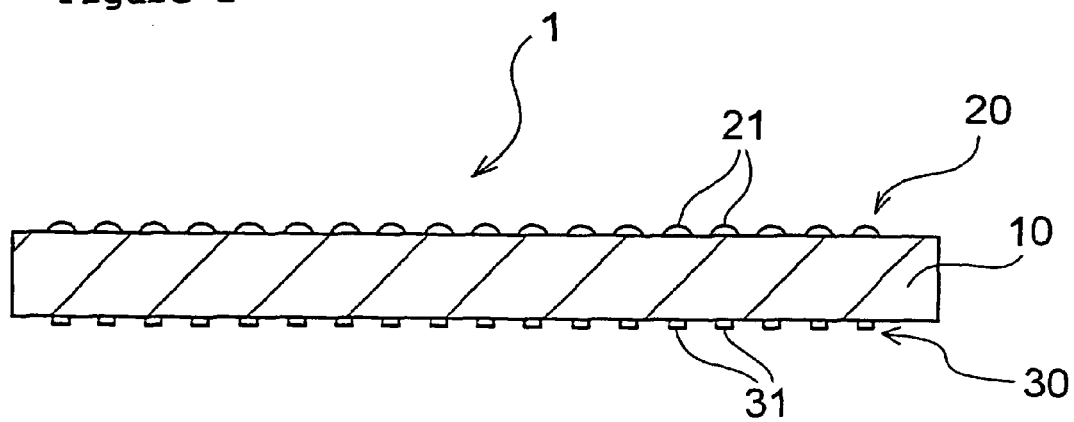
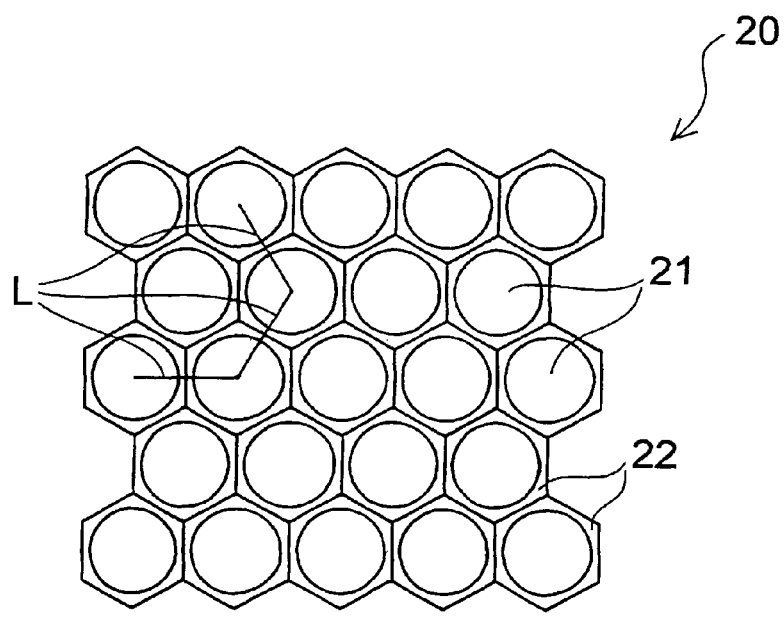
Figure 2

STEREOSCOPIC SHEET STRUCTURE

This application is a U.S. National Phase Application under 35 USC 371 of International Application PCT/JP2006/313872 filed Jul. 12, 2006.

TECHNICAL FIELD

The present invention relates to a stereoscopic sheet structure and, more particularly, to a stereoscopic sheet structure in which three-dimensional moiré designs appear as though, for example, the shape of design units forming the three-dimensional moiré designs, the size of the design units, the positions of the design units, and/or spaces between the design units were changed by changing the angle of observation.

BACKGROUND ART

Patent Document 1 has an object of "providing a decorative sheet in which three-dimensional designs are formed on a transparent sheet by forming pattern portions on the front and rear surfaces of the transparent sheet," and proposes "a decorative sheet characterized in that one side of the transparent sheet is provided with a first pattern portion having first designs that are repeatedly formed at predetermined intervals, and the other side of the transparent sheet is provided with a second pattern portion having moiré designs that are formed by second designs having a similar shape as that of the first designs" (see claim 1 and the paragraph 0005 of Patent Document 1). Patent Document 2 has an object of "providing a decorative sheet in which three-dimensionally developed designs are changed," and proposes "a decorative sheet in which designs are developed three-dimensionally by a lens part having a plurality of convex lens-like projections and a design part having designs, wherein the plurality of convex lens-like projections are provided so as to be changed" (see claim 1 and the paragraph 0005 of Patent Document 2). Patent Document 3 has an object of "providing, by means of an easy and low-cost technique, a sheet that has such an excellent decorativeness that a design thereof is changeable with the angle of observation," and proposes "a decorative sheet characterized in that a plurality of convex lens-shaped projections 21 are provided on a front surface 2 of a transparent sheet 1 in an arbitrary continuous pattern, and designs 31 having the same continuous pattern as the front surface 2 are printed on a rear surface 3 of the sheet 1 in displacement from the continuous pattern on the front surface 2" (see claim 1 and the paragraph 0004 of Patent Document 3). Patent Document 4 intends to solve the technical problem in which "a plastic film needs to be embossed to change its shape and size in order to obtain three-dimensional and enlarged stipple designs having different sizes, and such a process requires a change of the mold itself, which is expensive, thus it was difficult to obtain a variety of enlarged three-dimensional stipple designs," and thus proposes "a decorative body with stipple designs, in which a number of independent colored or non-colored projected converging devices A having transparency are printed, in a regularly arranged state at certain fine intervals, on a front surface of a colored or non-colored transparent substrate B by means of print ink having transparency, and a plurality of colored pixels C having the shape that is the same as or different from that of the projected converging devices A formed on the front surface are printed on a rear surface of the transparent substrate B, in the same arrangement state as that of the projected converging device A, and further each of the colored pixels C is positioned by shifting an intersection angle with respect to each of the projected converging devices A formed on the front surface so that the size in which the colored pixels C are observed are changed significantly due to the intersection angle, wherein the colored pixel C appears as an expanded image having a three-dimensional effect when viewed from the front surface, and the expanded image presents a fluctuation effect when viewed from a different perspective" (see claim 1 and the paragraph 0006 of Patent Document 4).

Moreover, Patent Document 5 has an object of "providing a virtual image appearing decorative body that causes an expanded virtual image of the same shape as that of a picture element to appear above or below a plane convex lens-shaped light collecting element layer," and discloses "means of solution, in which a plane convex lens-shaped light collecting element layer in which a number of plane convex lens-shaped light collecting elements of the same shape and size are arranged vertically and horizontally, and a picture element layer in which a number of picture elements of the same shape and size as a transparent substrate layer are arranged vertically and horizontally are configured, wherein at least one pair of the plane convex lens-shaped light collecting element and the picture element completely overlap with each other vertically, the plane convex lens-shaped light collecting element layer and the picture element layer are arranged so that other picture elements that are separated at equal distance from the overlapping picture element are dislocated in the same width toward the outside (or inside) radially around the overlapping picture element to the plane convex lens-shaped light collecting element facing the abovementioned other picture elements, to increase the dislocation width of the picture elements from the central picture element toward the outside picture elements, so that an expanded virtual image of the same shape as the shape of the picture elements is caused to appear above (or below) the light collecting element layer" (see the abstract of Patent Document 5). Patent Document 6 has an object of "providing a virtual image developing decorator in which a depth position and a height position from a front of the decorator of a virtual image are changed in association with an alteration made when a direction for visually observing the virtual image developing decorator is altered," and discloses means in which "virtual image developing decorator comprises a plano-convex lens-like converging element layer formed by laterally and longitudinally aligning many plano-convex lens-like converging elements, a transparent base plate layer, and a pixel layer formed by laterally and longitudinally aligning many pixels at different intervals, so that alignments of one pixels and alignments of another pixels at equal distances to those of the one pixels of the alignments of the two perpendicular pixels including the superposed pixels are deviated toward an inside to the alignments of the plano-convex lens-like converging elements, largely deviated in width at outer side, the alignments of the other pixels and the alignments of the another pixels at the equal distance to those of the one pixels are deviated toward an outside to the alignments of the plano-convex lens-like converging elements, largely deviated in width at the outer side and the virtual image is developed at the pixels superposed above or below the plano-convex lens-like converting elements as a center according to the direction for visually observing the image" (see the abstract of Patent Document 6). Patent Document 7 has an object of "providing a decorative body presenting virtual images which presents enlarged virtual images of pixels above or below a plano-convex-lens-shaped condenser element layer," and discloses, as the means for solving the problem, "the decorative body is constituted of the plano-convex-lens-shaped condenser element layer formed by lining up longitudinally and laterally a large number of plano-convex-lens-shaped condenser elements, a transparent base layer and a pixel layer formed by lining up longitudinally and laterally a large number of pixels. The size of each pixel becomes smaller as the pixel is disposed on another pixel line located farther from one pixel line selected as a basic pixel line. The plano-convex-lens-shaped condenser element layer and the pixel layer are disposed so that at least one set of the elements overlaps vertically in the most degree, that the other pixels at an equal distance from the overlapping pixels slip radially from the condenser elements corresponding to the other pixels, with respect to the overlapping pixel as the center, and that the width of slippage becomes larger as the pixels are located farther outside from the pixel being the center. The enlarged virtual images are presented above or below the plano-convex-lens-shaped condenser element layer" (see the abstract of Patent Document 7). Patent Document 8 has an object of "providing a virtual image developing decorative object for developing a virtual image, which is moved in matching relation to respective pixels when a visual position is moved, above or below a planoconcave lens-like condenser element layer," and discloses, as the means for solving the problem, means in which "a plane convex lens light condensing element layer in which a plane convex lens light condensing elements are arranged and a pixel layer in which pixels are arranged are provided, wherein the pixels arranged on each pixel row (or each pixel column) of the pixel layer are rotated in a pattern accumulating the same rotational angle, a pair of each plane convex lens light condensing element and each pixel is stacked, a pair of other pixel column that are equally distant from the pixel column having stacked pixels are shifted from the pixel column having stacked pixels toward the outside (or the inside) with respect to the corresponding plane convex lens light condensing element column, the plane convex lens light condensing element layer and the pixel layer are disposed such that the width by which the pixel column is shifted becomes large toward the outside of the pixel column having stacked pixels, and a virtual image formed above (or below) the plane convex lens light condensing element layer is moved according to each pixel when the position of observation is moved" (see the abstract of Patent Document 8). Patent Document 9 has an object of providing "a decorative display on which an enlarged image of a stereoscopic figure can be visualized in the static state of little swaying without restrictions for spots for visualizing," and discloses, as the means for solving the problem, "a plurality of colored pixels 42 provided with the arranging properties and direction properties of respective pixels 42 disposed two-dimensionally and at the equal intervals on the back of a sheet-shaped material 41 to form image patterns on the decorative display. A plurality of convex lens-shaped beam condensing elements 44 provided with the direction properties same as those of the image patterns are formed on lines of respective beam condensing elements 44 and disposed two-dimensionally to form beam condensing patterns on the surface of the sheet-shaped transparent material 41. Image patterns 43 and beam condensing patterns are so formed as to provide the disposition pitch of respective pixels 42 different from the disposition pitch of respective beam condensing elements 44" (see the abstract of Patent Document 9). Patent Document 10 has an object of providing "a decorative display on which the three-dimensional enlarged image of a pattern appears in a shake-free static state wherever it may seen from", and discloses, as the means for solving the problem, "in this decorative display, a plurality of colored pixels 42 are two-dimensionally and evenly arranged on the back side of a sheet-type transparent material 41, each line of the pixels 42 being given a directivity, to form an image pattern. A plurality of convex light-condensing elements 44 are also two-dimensionally and evenly arranged on the front side of the transparent material 41, each line of the light-condensing elements 44 being given the same directivity as that of the image pattern, to form a light-condensing element pattern. The image pattern 43 and the light-condensing element pattern are formed in a way that the pixels 42 and the light-condensing elements 44 differ in array pitch" (see the abstract of Patent Document 10).

[Patent Document 1] Japanese Patent No. 3131771
[Patent Document 2] Japanese Published Unexamined Patent Application No. 2003-39583
[Patent Document 3] Japanese Patent No. 2761861
[Patent Document 4] Japanese Patent No. 3338860
[Patent Document 5] Japanese Published Unexamined Patent Application No. 2001-55000
[Patent Document 6] Japanese Published Unexamined Patent Application No. 2002-46400
[Patent Document 7] Japanese Published Unexamined Patent Application No. 2002-120500
[Patent Document 8] Japanese Published Unexamined Patent Application No. 2003-226099
[Patent Document 9] Japanese Published Unexamined Patent Application No. 2001-180198
[Patent Document 10] Japanese Published Unexamined Patent Application No. 2003-220173

DISCLOSURE OF THE INVENTION

Problems to be Solved by the Invention

However, these stereoscopic sheet structures and the like have the following problems; even if the designs are observed at different angles via the lens assembly, the degree of the displacement of the positions at which the designs appear is constant and the designs appear simply three-dimensionally, thus a three-dimensional visual effect is small. Besides, the shapes of the three-dimensional designs are not changed, thus, again, a three-dimensional visual effect is small. Moreover, in these stereoscopic sheet structures and the like where the designs appear as though they are displaced, depending on the angle at which the designs are observed, the amount of displacement of the designs becomes small when the distance of observing the stereoscopic sheet structure becomes longer (when visual distance becomes longer), and as a result the effect of viewing the designs three-dimensionally becomes small.

Means to Solve the Problems

Therefore, it is an object of the present invention to provide a stereoscopic sheet structure in which three-dimensional moiré designs appear variably by changing the angle of observation when the designs are observed via a lens assembly. More specifically, an object of the present invention is to provide a stereoscopic sheet structure in which when three-dimensional moiré designs are observed via a lens assembly, the designs appear as though they were displaced and moved, by changing the angle of observation, even if the visual distance is long or short, and a stereoscopic sheet structure in which the shape of the three-dimensional moiré designs appears variably by changing the angle of observation.

A first means for achieving the abovementioned object is directed to a stereoscopic sheet structure, comprising:

a convex lens assembly which is provided on one surface of a sheet member and in which a plurality of convex lenses for focusing light on the other surface are disposed at predetermined arrangement intervals and in predetermined arrangement directions; and a repeating design portion in which a plurality of design units are arranged on a focal plane of the convex lenses at arrangement intervals and/or in arrangement directions different from those of the convex lenses, and which has a continuously deformed design portion in which the arrangement intervals of the design units change regularly such that when any three adjacent design units are selected, a ratio ($D_{N\sim N+1}/D_{N+1\sim N+2}$) of an interval $D_{N\sim N+1}$ between a $N^{th}$ design unit N and a N+1$^{th}$ design unit N+1 adjacent thereto to an interval $D_{N+1\sim N+2}$ between the N+1$^{th}$ design unit N+1 and a N+2$^{th}$ design unit N+2 adjacent thereto falls within a range of 0.95 to 1.05, and the arrangement directions of the design units change regularly such that an intersection angle that is formed between an extended line of a straight line connecting the N$^{th}$ design unit N and the N+1$^{th}$ design unit N+1 adjacent thereto and a straight line connecting the N+1$^{th}$ design unit N+1 and the N+2$^{th}$ design unit N+2 adjacent thereto falls within a range of −1 degree to +1 degree.

A second means for achieving the abovementioned object is directed to a stereoscopic sheet structure, comprising:

a convex lens assembly which is provided on one surface of a sheet member and in which a plurality of convex lenses for focusing light on the other surface are disposed at predetermined arrangement intervals and in predetermined arrangement directions; and a repeating design portion in which a plurality of design units are arranged on a focal plane of the convex lenses at arrangement intervals and/or in arrangement directions different from those of the convex lenses, and which has a line segment assembly portion in which the design units are line segments, and the plurality of line segments are arranged at intervals different from the arrangement intervals of the convex lenses of the convex lens assembly.

In a preferred embodiment of the stereoscopic sheet structure, the repeating design portion has a plurality of the line segment assembly portions, and directions of extension of the plurality of line segments forming one of the line segment assembly portions are different from directions of extension of the line segments forming other line segment assembly portions.

A third means for achieving the abovementioned object is directed to a stereoscopic sheet structure, comprising:

a convex lens assembly which is provided on one surface of a sheet member and in which a plurality of convex lenses for focusing light on the other surface are disposed at predetermined arrangement intervals and in predetermined arrangement directions; and a repeating design portion in which a plurality of design units are arranged on a focal plane of the convex lenses at arrangement intervals and/or in arrangement directions different from those of the convex lenses, and which has a continuously deformed design portion in which a design pattern that has the plurality of design units arranged at arrangement intervals different from the arrangement intervals of the plurality of convex lenses of the convex lens assembly has formed therein a plurality of sections obtained by division at regular intervals in the respective arrangement directions of the design units and have the equal number of design units, and the design pattern is deformed such that the section formed along at least one of the arrangement directions has a plurality of design units that are arranged in the one direction at arrangement intervals different from an arrangement intervals that follow the one direction in the design units contained in another section adjacent to the section in the one direction.

A fourth means for achieving the abovementioned object is directed to a stereoscopic sheet structure, comprising:

a convex lens assembly which is provided on one surface of a sheet member and in which a plurality of convex lenses for focusing light on the other surface are disposed at predetermined arrangement intervals and in predetermined arrangement directions; and a repeating design portion in which a plurality of design units are arranged on a focal plane of the convex lenses at arrangement intervals and/or in arrangement directions different from those of the convex lenses, and which has the continuously deformed design portion described in the first means and the continuously deformed design portion described in the third means.

A fifth means for achieving the abovementioned object is directed to a stereoscopic sheet structure comprising:

the convex lens assembly of the first means on one surface of a first sheet member; and the repeating design portion of any one of the first means, the second means, the third means or the fourth means on one surface of a second sheet member, wherein the first sheet member and the second sheet member are stacked detachably or integrally so that a focal plane of the convex lenses of the first sheet member faces the surface of the second sheet member that has the repeating design portion.

According to the present invention, a stereoscopic sheet structure in which three-dimensional moiré designs appear variably by changing the angle of observation can be provided.

Specifically, the present invention, particularly the stereoscopic sheet structures described in the first means and the second means, can provide a stereoscopic sheet structure in which when the three-dimensional moiré designs are observed via the lens assembly, the three-dimensional moiré designs appear as though they were displaced and moved, by changing the angle of observation, even if the visual distance is long or short. Therefore, the present invention can sufficiently fulfill a function in which the three-dimensional moiré designs appear as though they were displaced and moved, by changing the angle of observation, thus the stereoscopic sheet structure of the present invention can be applied to an advertising display in the street, a poster, an advertisement tower, an information display board and the like that can be observed at a long visual distance, in addition to a packaging material and the like that are normally observed at a short visual distance.

Moreover, the present invention, particularly the stereoscopic sheet structure of the third means, can provide a stereoscopic sheet structure in which when the three-dimensional moiré designs are observed via the lens assembly, the shape of the designs appears variably by changing the angle of observation. Therefore, the present invention can fulfill a function in which the shape of the three-dimensional moiré designs appears variably by changing the angle of observation, thus the stereoscopic sheet structure of the present invention can be applied suitably to a packaging material, an advertising display in the street, a poster, an advertisement tower, an information display board and the like that catch the eye.

In addition, the present invention has the continuously deformed design portion in which a part or the whole of the repeating designs is deformed, and the line segment assembly portion, and the continuously deformed design portion and the line segment assembly portion can be formed easily, thus the stereoscopic sheet structure having the abovementioned effects can be produced easily.

BRIEF DESCRIPTION OF THE DRAWINGS

FIG. 1 is a schematic cross-sectional view showing the stereoscopic sheet structure as an example of the present invention.

FIG. 2 is a view showing an example of an arrangement that can be adopted as the arrangement of a convex lens assembly.

Figure 3:
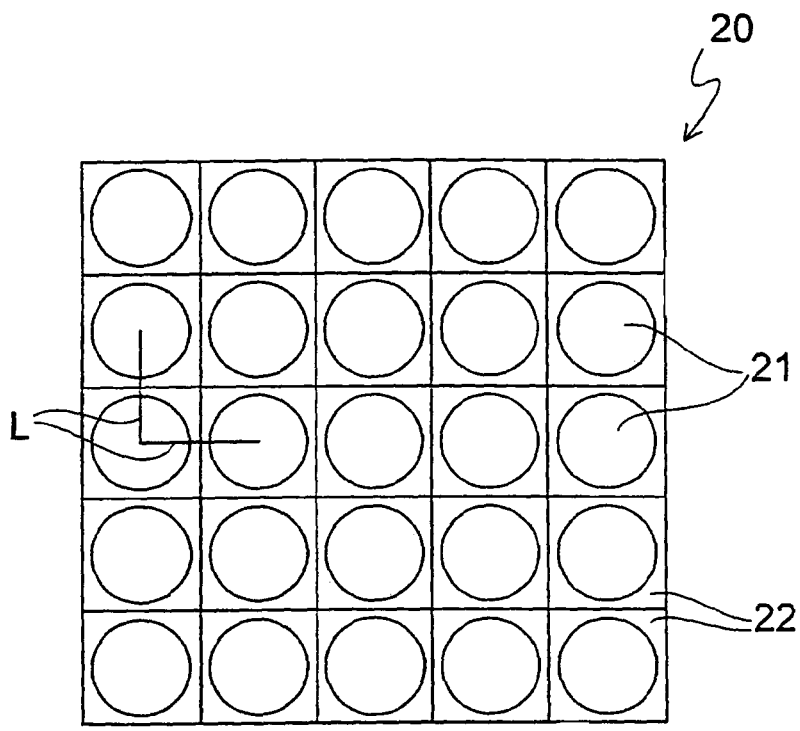
FIG. 3 is a view showing an example of an arrangement that can be adopted as the arrangement of the convex lens assembly.

EXPLANATION OF REFERENCE NUMERALS 1, 2, 3, 4, 5 Stereoscopic sheet structure
10, 11 Sheet member
15 Image
20 Convex lens assembly
21 Convex lens
22 Lens forming section
30, 30D, 50, 70 Repeating design 31, 32 Design unit
35, 36, 37, 38, 39 Design pattern
40 through 49A Continuously deformed design portion
60 Line segment assembly portion
65 Line segment

BEST MODE FOR CARRYING OUT THE INVENTION

A first embodiment of the present invention, that is, a stereoscopic sheet structure 1 which is an example of the stereoscopic sheet structure of the first means is described with reference to the drawings. In the stereoscopic sheet structure 1 of the first embodiment, as shown in FIG. 1, one surface of a sheet member 10 has a convex lens assembly 20 having a plurality of convex lenses 21 formed thereon, and the other surface of the same has a repeating design portion 30.

As shown in FIG. 1, the sheet member 10 is composed of one sheet and supports the convex lens assembly 20, which is described hereinafter. The stereoscopic sheet structure 1 is so designed as to observe, through the convex lens assembly 20, the repeating design portion 30 that is formed on a surface opposite to the one surface of the sheet member 10 on which the convex lens assembly 20 is formed, thus it is required that the sheet member 10 is transparent. Here, the term "transparent" means that the sheet member 10 has sufficient transparency to observe the repeating design portion 30, and includes the concept of transparent and colorless, half-transparent, and colored and transparent states. The material of the sheet member 10 may be a transparent material so as to be able to support the convex lens assembly 20, and examples include a synthetic resin, glass, a transparent coating film and the like.

The thickness of the sheet member 10 is substantially the same as the focal length of the convex lenses 21. In other words, when the convex lens assembly 20 is formed on one of the surfaces of the sheet member 10, the thickness of the sheet member 10 is determined such that the convex lenses 21 of the convex lens assembly 20 focus light on the other surface of the sheet member 10. The thickness of the sheet member 10 is normally 0.1 through 10.0 mm according to the focal length of the convex lenses 21, but may be 0.1 through 0.8 mm. The sheet member 10 may have a shape so as to be able to support the convex lens assembly 20 and applied to an information display board or the like, and can be formed into a plate having, for example, planar shape, curved shape, or any concave or convex shape.

In this sheet member 10, the surface thereof on which the after-described convex lens assembly 20 is formed is preferably as smooth as possible. Preferred smoothness of the surface of the sheet member 10 on which the convex lens assembly 20 is formed can be defined by an arithmetic average roughness value (Ra value) defined by JIS B 0601 and the maximum height value (Ry value). The Ra value of the surface of the sheet member 10 on which the convex lens assembly 20 is formed is preferably 0.001 through 5 (μm), and particularly preferably 0.002 through 0.6 (μm), and the Ry value is preferably 0.001 through 28 (μm), and particularly preferably 0.002 through 3 (μm). It should be noted that in some cases a preferred range of the Ra value can be from 0.001 through 0.6 and 0.002 through 5, and a preferred range of the Ry value can be from 0.002 through 28 and 0.001 through 3. If the smoothness of the surface of the sheet member 10 on which the convex lens assembly 20 is formed is within the abovementioned ranges, the convex lens assembly 20 can be provided with uniform convex lenses 21, and especially the convex lens assembly 20 can be formed effectively by means of print processes described hereinafter. If the smoothness of the abovementioned planar surface is poor, eventually the function of the convex lens assembly 20 to be formed becomes deteriorated.

The convex lens assembly 20 is configured by forming a plurality of convex lenses 21 on a surface of the sheet member 10. The convex lenses 21 may be arranged so as to be able to obtain a special visual effect where the design units of the repeating design portion appear as though they were floating or subducted, and such arrangement is characterized by a lens forming section in which a single convex lens 21 is formed, a space between the lens forming sections, and the like. Examples of the shape of the lens forming section include polygons such as triangle, square, pentagon and hexagon, circle, ellipse, and the like. In the lens forming section, a single convex lens 21 is formed, whereby an arrangement of the convex lenses 21 is determined. The size of a pattern forming section (a space between adjacent pattern forming sections) is determined according to an arrangement interval L of the convex lenses, as described hereinafter.

Figure 4:
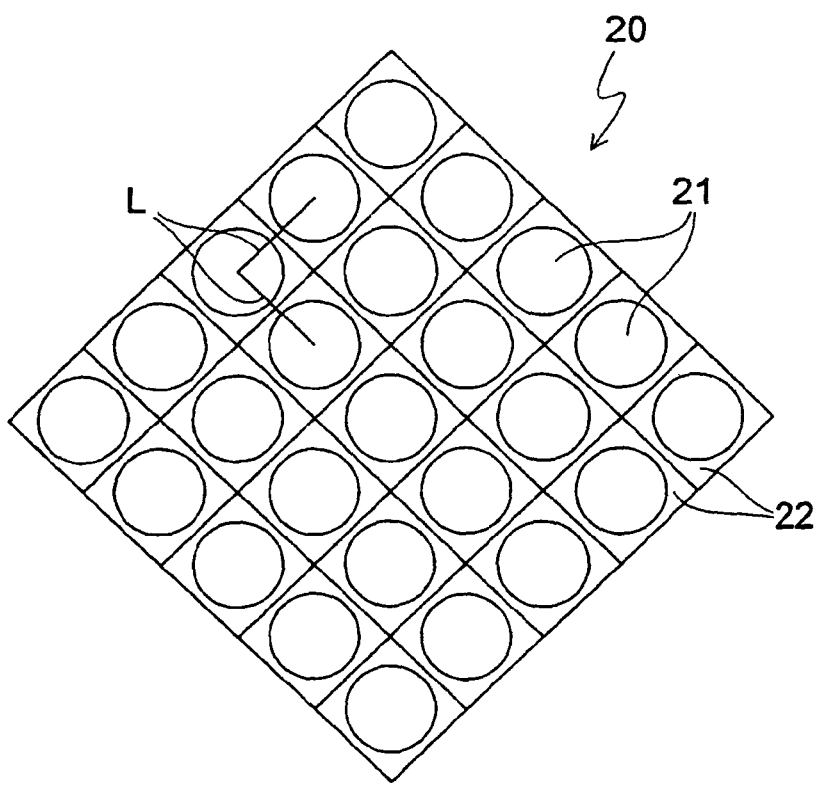
FIG. 4 is a view showing an example of an arrangement that can be adopted as the arrangement of the convex lens assembly.
Figure 5:
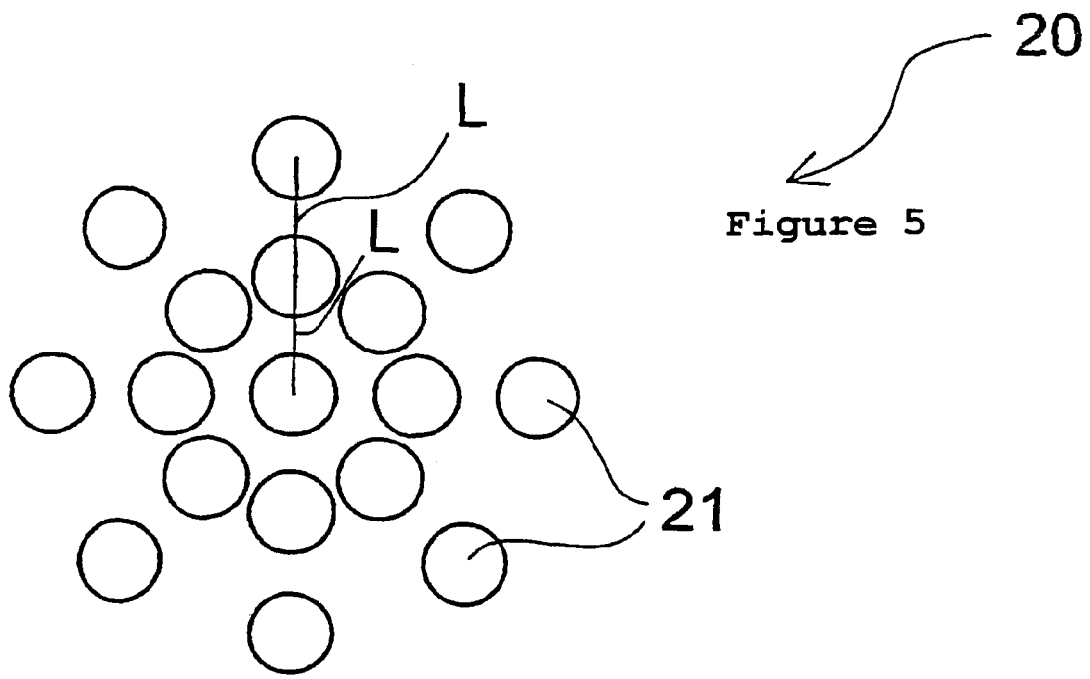
FIG. 5 is a view showing an example of an arrangement that can be adopted as the arrangement of the convex lens assembly.
Figure 6:
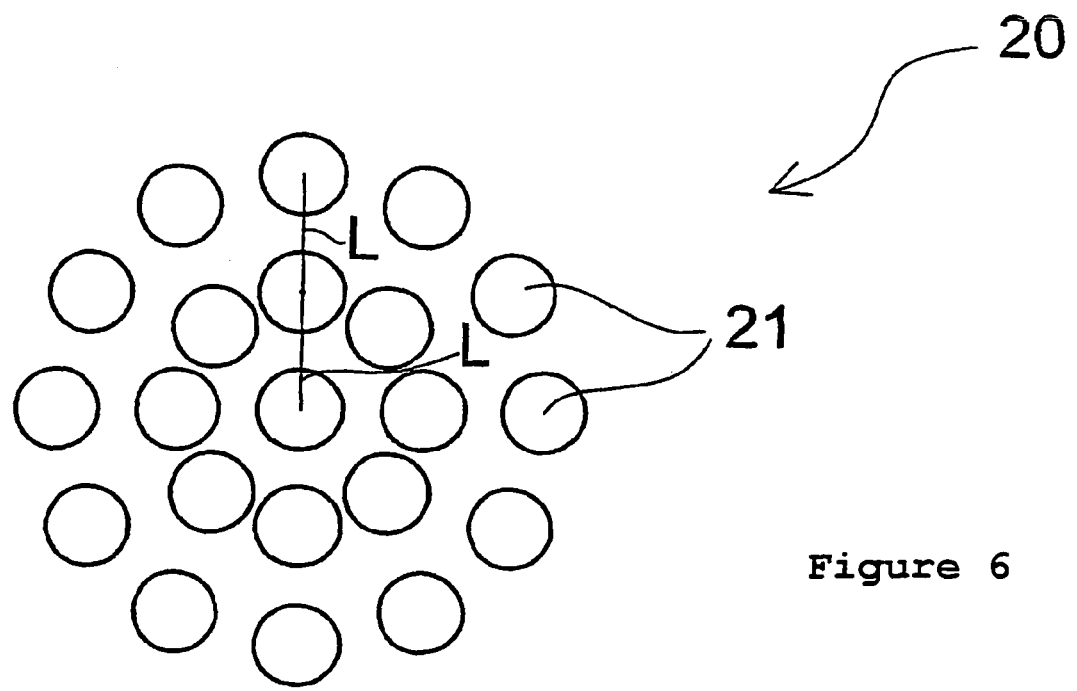
FIG. 6 is a view showing an example of an arrangement that can be adopted as the arrangement of the convex lens assembly.
Figure 7:
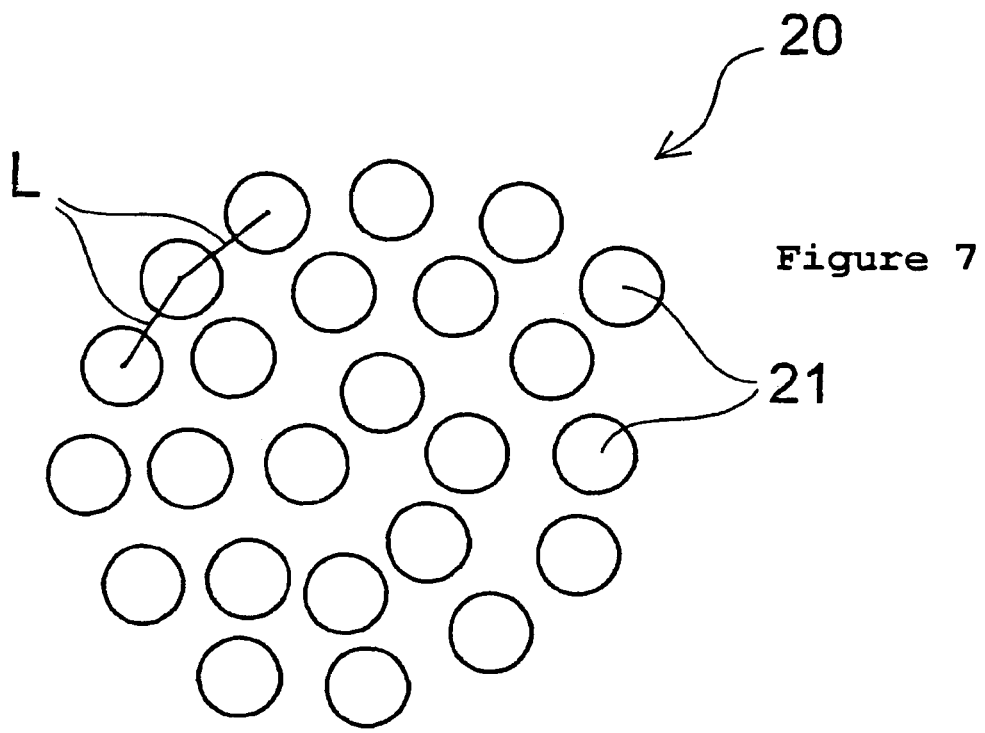
FIG. 7 is a view showing an example of an arrangement that can be adopted as the arrangement of the convex lens assembly.
Figure 8:
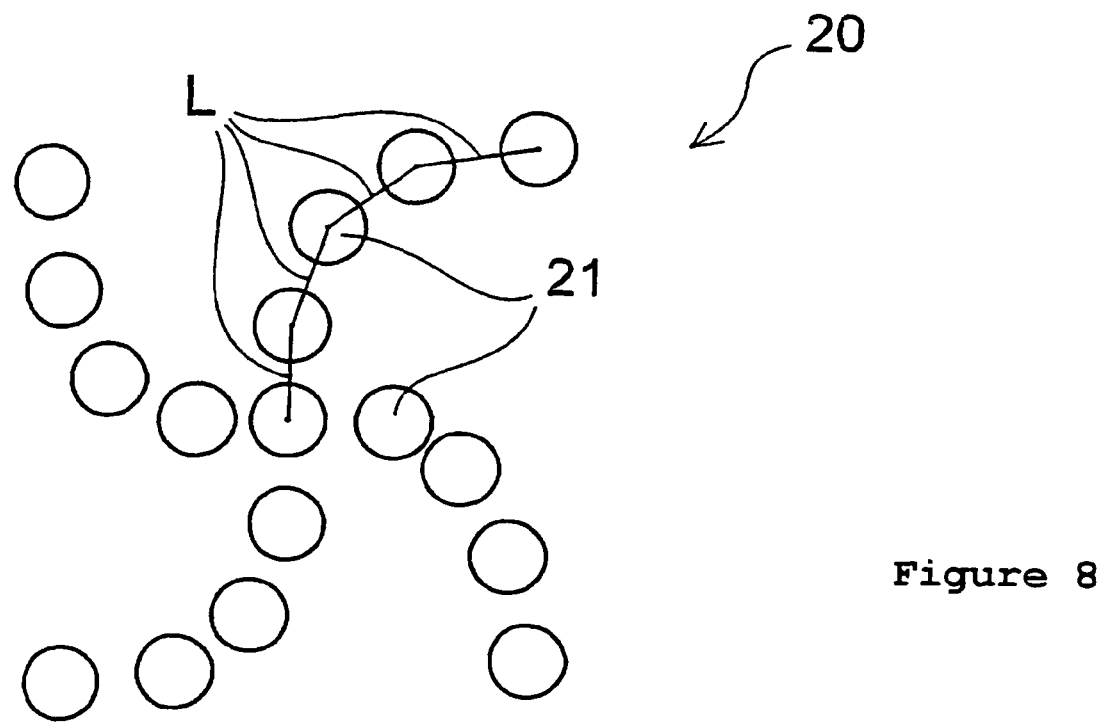
FIG. 8 is a view showing an example of an arrangement that can be adopted as the arrangement of the convex lens assembly.

Examples of the arrangement of the convex lens assembly 20 include the arrangements shown in FIG. 2 through FIG. 8. The arrangement of the convex lens assembly 20 shown in FIG. 2 is a honeycomb-shaped arrangement in which a single convex lens 21 is formed in each of hexagonal lens forming section 22 disposed closely adjacent to each other. The arrangement of the convex lens assembly 20 shown in FIG. 3 is a square-shaped arrangement in which a single convex lens 21 is formed in each of regular square lens forming sections 22 disposed vertically and horizontally. The arrangement of the convex lens assembly 20 shown in FIG. 4 is a square shape in which a single convex lens 21 is formed in each of regular square pattern forming sections 22 that are arranged vertically and horizontally at a rotational angle of 45 degrees. The arrangement of the convex lens assembly 20 shown in FIG. 5 is a radial arrangement in which a single convex lens 21 is formed in each of lens forming sections (not shown in FIG. 5) that are disposed radially from one point. The arrangement of the convex lens assembly 20 shown in FIG. 6 is a concentric arrangement in which a single convex lens 21 is formed in each of concentrically disposed lens forming sections (not shown in FIG. 6). The arrangement of the convex lens assembly 20 shown in FIG. 7 is a spiral arrangement in which a single convex lens 21 is formed in each of lens forming sections (not shown in FIG. 7) that are disposed spirally from one point. The arrangement of the convex lens assembly 20 shown in FIG. 8 is a radially curved arrangement in which the convex lenses 21 are formed within respective lens forming sections (not shown in FIG. 8) that are disposed in a curved line extending from one point in a radial direction. In the stereoscopic sheet structure 1, which is an example of the stereoscopic sheet structure of the first embodiment, the arrangement of the lens forming sections 22 is the honeycomb-shaped arrangement shown in FIG. 2.

The convex lens 21 is preferably formed in substantially a central part of the lens forming section 22. The convex lens 21 is shaped so as to be able to focus light entering this convex lens 21. The size of the convex lens 21 may be equal to or smaller than the size of the lens forming section and may be particularly preferably the same as that of the lens forming section. The convex lens 21 may have a thickness enough to be able to focus the light entering the convex lens 21 onto the rear surface of the sheet member 10 and is therefore, for example, approximately 5 through 100 μm.

The convex lenses 21 are arranged toward the arrangement direction of the lens forming sections 22, with the arrangement intervals L between adjacent convex lenses 21. The length of the arrangement intervals L between the convex lenses 21 at this moment is not particularly restricted and thus has an equal length or different lengths. In the stereoscopic sheet structure 1, which is an example of the stereoscopic sheet structure (FIG. 1), the plurality of convex lenses 21 are arranged at the arrangement intervals L having the equal length. The length of the arrangement intervals L between the convex lenses 21 is preferably, for example, approximately 0.1 through 1.2 mm, and particularly preferably 0.12 through 0.42 mm. The arrangement interval L between the convex lenses 21 indicates the distance between any position of a certain convex lens 21 and a position of an adjacent convex lens 21 that corresponds to the abovementioned any position, in the arrangement direction of the lens forming sections 22. For reference, in the arrangements shown in FIG. 2 through FIG. 8, a distance between the centers of convex lenses 21 is illustrated as the arrangement interval L.

The material of the convex lens assembly 20 may be one that is capable of functioning as a lens, and examples thereof include acrylic acid ester resins such as acrylic acid methyl resin, methacrylic acid ester resins such as methacrylic acid methyl resin, vinyl resins, or a resin composition having these resins.

Figure 9:
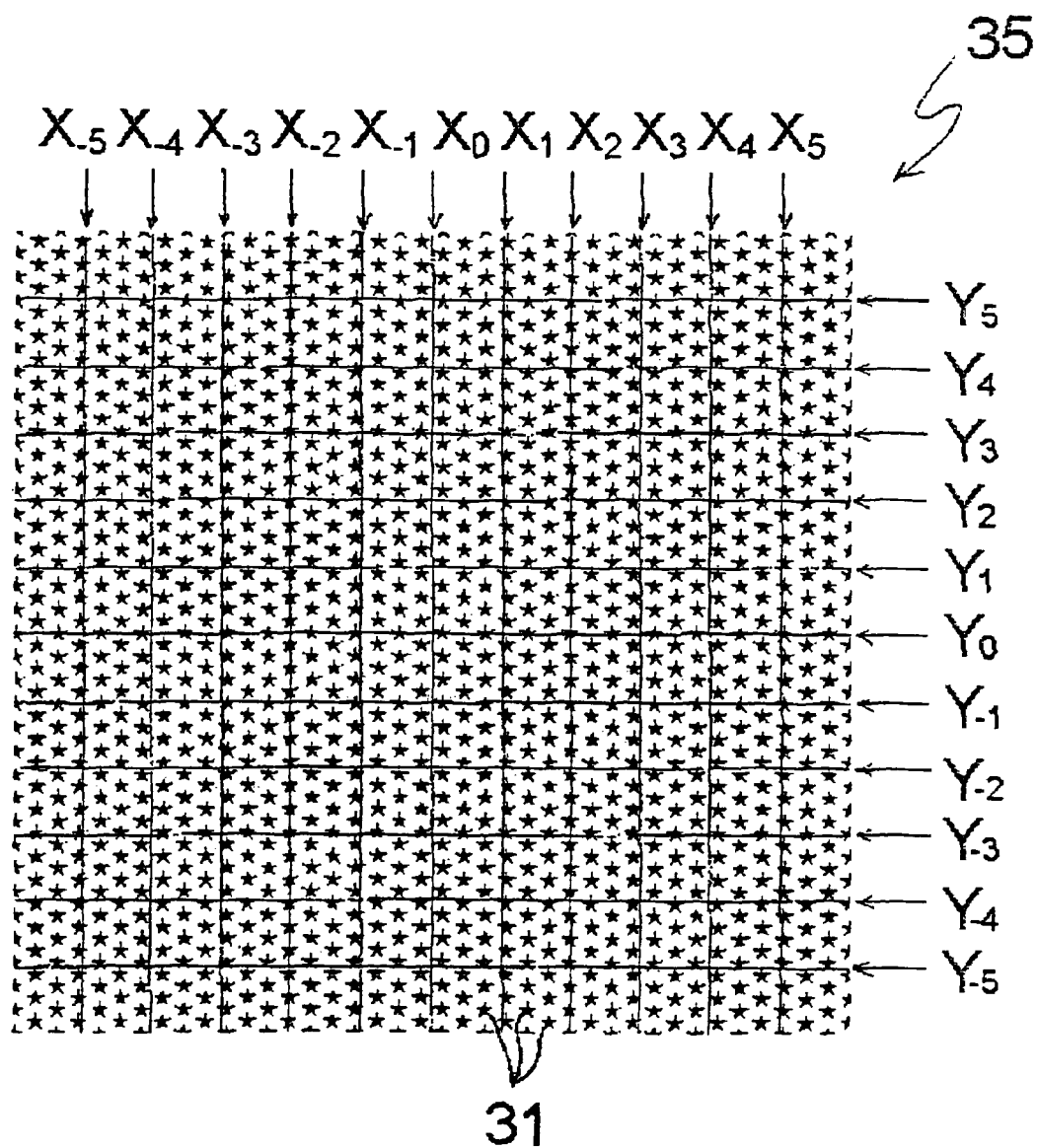
FIG. 9 is a view showing an example of patterns that can be adopted as design patterns.

As described above, in the stereoscopic sheet structure 1 of the first embodiment, the surface of the sheet member 10 that does not have the convex lens assembly 20, that is, normally the surface on which the convex lenses formed on one of the surface of the sheet member 10 focus light, has the repeating design portion 30. The repeating design portion 30 has a continuously deformed design portion in which the arrangement intervals and arrangement directions of the plurality of adjacent design units 31 vary such that the arrangement of the design units 31 differs from that of the plurality of convex lenses 21. An example of the repeating design portion 30 of the stereoscopic sheet structure 1 is described with reference to FIG. 9 through FIG. 17. It should be noted that FIG. 9 and FIG. 14 are reference drawings for explaining the three-dimensional moiré design of the present invention. According to the embodiments shown in FIGS. 10, 12, 15, 16 and 17, the repeating design portion 30 has the continuously deformed design portion in which the arrangement intervals D of the design units regularly change such that, when any three adjacent design units are selected, the ratio $(D_{N \sim N+1}/D_{N+1 \sim N+2})$ of an interval $D_{N \sim N+1}$ between a $N^{th}$ design unit N and a $N+1^{th}$ design unit N+1 adjacent thereto to an interval $D_{N+1 \sim N+2}$ between the $N+1^{th}$ design unit N+1 and a $N+2^{th}$ design unit N+2 adjacent thereto falls within a range of 0.95 to 1.05, or, in other words, satisfies the following expression (1), and the arrangement direction of the design units changes regularly such that an intersection angle θ (sometimes called "arrangement angle θ" hereinafter) that is formed between an extended line of a straight line connecting the $N^{th}$ design unit N with the $N+1^{th}$ design unit N+1 adjacent thereto and a straight line connecting the $N+1^{th}$ design unit N+1 with the $N+2^{th}$ design unit N+2 adjacent thereto falls within a range of −1 degree to +1 degree, or, in other words, satisfies the following expression (2).

$$0.95 \leq D_{N \sim N+1}/D_{N+1 \sim N+2} \leq 1.05 \quad \text{Expression (1)}$$

$$-1 \leq \theta \leq +1 \quad \text{Expression (2)}$$

It should be noted that if the abovementioned ratio $(D_{N \sim N+1}/D_{N+1 \sim N+2})$ is less than 0.95, the three-dimensional moiré designs are so small that the degree of subduction of the designs cannot be recognized even when the designs are observed from the convex lens assembly side, but if the abovementioned ratio is greater than 1.05 the three-dimensional moiré patterns are so small that the degree of floating of the designs cannot be recognized even when the designs are observed from the convex lens assembly side. Moreover, if the abovementioned intersection angle becomes less than −1 degree or exceeds +1 degree, a change in the three-dimensional moiré patterns cannot be recognized.

Figure 10:
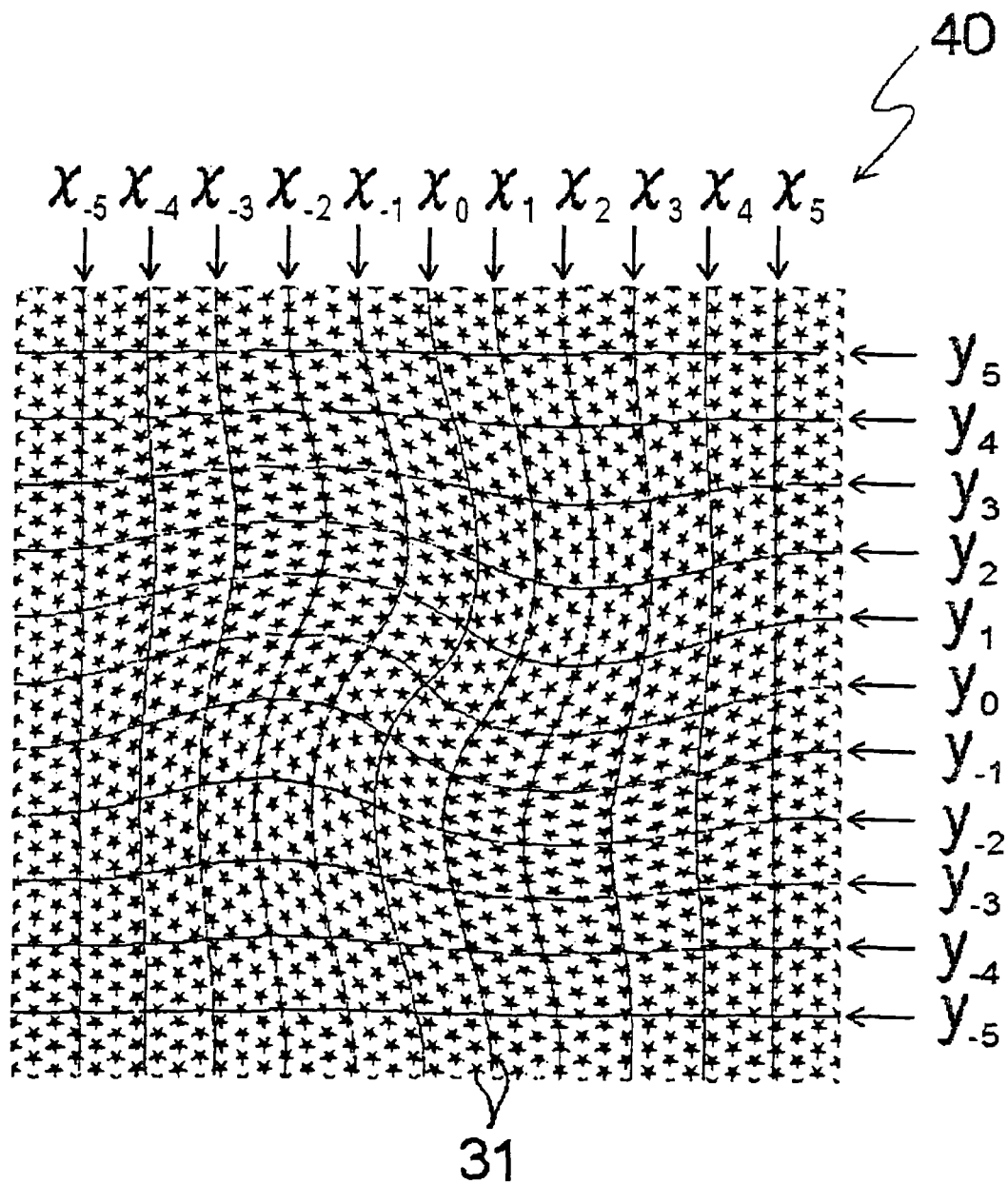
FIG. 10 is a view showing an example of a continuously deformed design portion in the stereoscopic sheet structure of a first embodiment.

A repeating design that has a continuously deformed design portion 40 shown in FIG. 10 can be an example of the repeating design portion 30. This continuously deformed design portion 40 is made by deforming a design pattern 35 in which star-shaped design units 31 are arranged in an arrangement pattern similar to the arrangement of the convex lens assembly 20 (see FIG. 9), so that the arrangement interval D between two design units 31 adjacent in the arrangement direction of the arrangement pattern 35 and the arrangement angle θ formed by the abovementioned arrangement direction and the straight line connecting the two design units 31 are changed continuously, as shown in FIG. 10.

As shown in FIG. 9, the design pattern 35 before deformation has so-called similar arrangement patterns in which the arrangement direction of the convex lenses in the convex lens assembly 20 is the same as the arrangement direction of the design units but the arrangement interval L (referred to as "pitch") between convex lenses is different from the arrangement interval D between design units, i.e., arrangement patterns in each of which a plurality of the star-shaped design units 31 are arranged at the arrangement intervals D different from the arrangement intervals L between the plurality of convex lenses in the convex lens assembly 20, but the arrangement patterns of the design pattern 35 are not limited to such arrangement patterns. Specifically, the design pattern 35 before deformation may have an arrangement similar to the arrangement of the convex lens assembly 20, and examples include cases where the arrangement interval D of the design pattern 35 is smaller or larger than the arrangement interval L of the convex lens assembly 20 and where the arrangement direction of the design pattern 35 is the same as or different from the arrangement direction of the convex lens assembly 20. For example, when the convex lens assembly 20 is formed according to the arrangements shown in FIG. 2 through FIG. 8, the design pattern is formed according to the arrangements shown in FIG. 2 through FIG. 8 having intervals different from the arrangement intervals L in the arrangements shown in FIG. 2 through FIG. 8.

Here, when a design pattern is configured by discontinuous designs, the design units configuring the design pattern indicate the discontinuous designs configuring a design pattern, and when a design pattern is configured by continuous designs such as a line segment, the design units configuring the design pattern indicate divided continuous shape which is a part of the designs and obtained by dividing the design pattern into a lattice form at predetermined intervals. The shape of the discontinuous designs serving as the design units is not particularly limited, thus the examples thereof include polygons such as triangle, square, pentagon and hexagon, circle, ellipse, heart shape, star shape, tear shape, character shape, and any other shape.

Since the convex lens assembly 20 of the stereoscopic sheet structure 1 (the lens forming sections 22) is formed according to the honeycomb-shaped arrangement shown in FIG. 2, the design pattern 35 is so configured that the plurality of star-shaped design units 31 are formed according to the honeycomb-shaped arrangement, as shown in FIG. 9. It should be noted that auxiliary lines $X_{-5}$ through $X_5$ and $Y_{-5}$ through $Y_5$ shown in FIG. 9 are auxiliary lines for explaining a state for changing the design pattern 35, and do not configure the design pattern 35.

Figure 11:
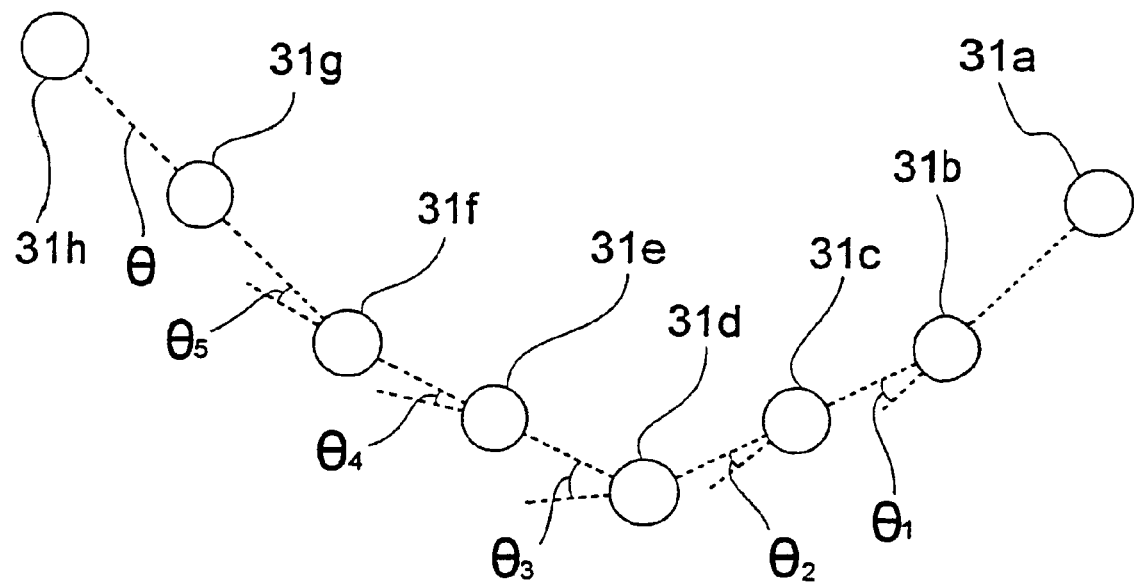
FIG. 11 is a view for explaining a continuously deformed design that is configured by continuously changing an arrangement angle θ that is formed between the direction of the arrangement of design units 31 formed along an auxiliary line $Y_0$ of the design patterns shown in FIG. 9 and a straight line connecting the two design units 31.

FIG. 11 is an explanatory diagram showing regularity of the arrangement of the design units 31 in the design pattern of the first embodiment, that is, the design pattern 40 shown in, for example, FIG. 10. As shown in FIG. 11, when any three continuous design units, e.g., 31a through 31c, of the design pattern 40 are noted, an intersection angle $\theta_1$ formed by a straight line connecting the design unit 31a and the design unit 31b and a straight line connecting the design unit 31b and the design unit 31c is within a range of −1 degree to +1 degree. An intersection angle $\theta_2$ formed by the straight line connecting the design unit 31c and the design unit 31b and a straight line connecting the design unit 31c and a design unit 31d is also within the range of −1 degree to +1 degree. In this manner, the relationship in the expression (2) described above is satisfied in the line of the plurality of design units. How the design pattern is designed determines the value of the angle $\theta$ within the range of −1 degree to +1 degree.

The arrangement of the design units 31 shown in FIG. 10 is so deformed that the intersection angle $\theta$ formed by a straight line formed by two adjacent design units and a straight line formed by another design units adjacent to one of the two design units in the design pattern 35 shown in FIG. 9 satisfies the abovementioned expression (1) or is continuously and gradually changed along the plurality of auxiliary lines x and auxiliary lines y that are arranged so that the auxiliary lines x and auxiliary lines y change the form thereof from straight lines to S-shaped curves when the design pattern 35 is designed with the view of obtaining a visual effect.

If the arrangement angle $\theta$ of the design units 31 is changed in this manner, as is clear from FIG. 10 and FIG. 11, the arrangement interval D between the two design units 31 adjacent in the direction of an auxiliary line $y_0$ is also changed slightly with the abovementioned change so as to satisfy the abovementioned expression (1), as is clearly shown in FIG. 11. Specifically, the arrangement interval D between the two design units 31 adjacent in the arrangement direction along the auxiliary line $y_0$ continuously changes gradually or steplessly from each of the auxiliary lines $X_{-5}$ and $X_5$ toward the auxiliary line $X_0$.

The design pattern 35 shown in FIG. 9 is deformed such that the arrangement of the design units 31 along the auxiliary line $x_0$ and the arrangement of the design units 31 along $y_0$ both satisfy the abovementioned expression (1) and expression (2), and at the same time follow the auxiliary line $x_{+5}$ that becomes a straight line again via the S-shaped auxiliary line $x_0$ from the straight auxiliary line $x_{-5}$ and the auxiliary line $y_{+5}$ that becomes a straight line again via the S-shaped auxiliary line $y_0$ from the straight auxiliary line $y_{-5}$, and such that the same number of design units are contained in areas surrounded by the auxiliary lines x and the auxiliary lines y, and as a result the continuously deformed design portion 40 is formed as shown in FIG. 10. This continuously deformed design portion 40 has an arrangement pattern in which the design pattern 35 is bent or twisted at the middle where the auxiliary line $x_0$ intersects with the auxiliary line $y_0$.

An example of the continuously deformed design portion 40 is shown in FIG. 10 and FIG. 11, but when the arrangement angle $\theta$ shown in the expression (2) is continuously changed the width of the arrangement angle $\theta$ and the orientation of the angle (absolute value of $\theta$) can be arbitrarily set within a range satisfying the abovementioned expression (2).

Furthermore, as described above, in the continuously deformed design portion 40 shown in FIG. 10, the auxiliary lines x are formed such that the straight auxiliary line $x_{-5}$ is changed again to the auxiliary line $x_{+5}$ through the S-shaped auxiliary line $x_0$, and at the same time the straight auxiliary line $y_{-5}$ is changed again to the straight auxiliary line $y_{+5}$ through the S-shaped auxiliary line $y_0$, but the patterns of change in the auxiliary lines are not limited to such examples, thus either the auxiliary lines x or the auxiliary line y are changed sequentially and other auxiliary lines may be kept linear or nonlinear to form the continuously deformed design portion 40 by means of a plurality of design coal arranged along these auxiliary lines.

Figure 12:
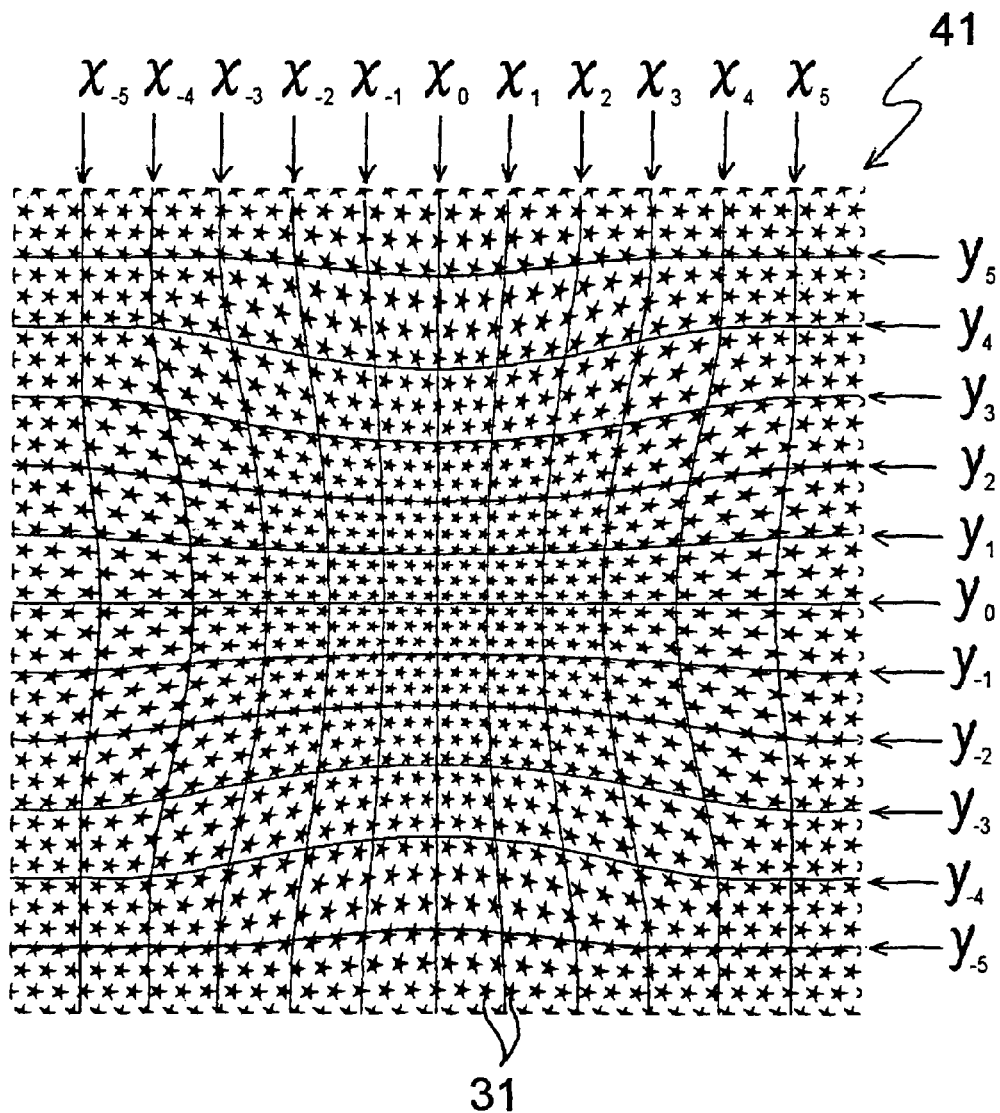
FIG. 12 is a view showing an example of the continuously deformed design portion in the stereoscopic sheet structure of the first embodiment.

Another example of the repeating design portion 30 includes a repeating design portion (not shown) having a continuously deformed design portion 41 shown in FIG. 12. The continuously deformed design portion 41 is configured by deforming the design pattern 35 (see FIG. 9) in which the design units 31 are arranged in the arrangement pattern similar to the arrangement of the convex lens assembly 20, such that the arrangement interval D between two design units 31 adjacent in the arrangement direction of the design pattern 35 and the arrangement angle $\theta$ formed by the arrangement direction and the straight line connecting the two design units 31 change continuously.

The design pattern 35 is the same as the design pattern 35 described as an example of the repeating design portion 30, and has an arrangement pattern in which a plurality of star-shaped design units 31 are arranged at intervals different from the arrangement intervals L of the convex lens assembly 20.

Figure 13:
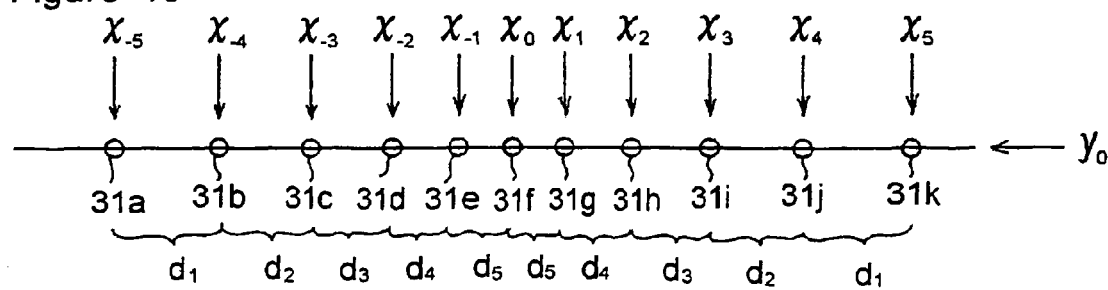
FIG. 13 is a view for explaining a continuously deformed design that is configured by continuously changing an arrangement interval $\underline{d}$ between two design units 31 that are adjacent in an arrangement direction following the auxiliary line $Y_0$ in the arrangement of the design units 31 formed along the auxiliary line $Y_0$ of the design patterns shown in FIG. 9.
Figure 14:
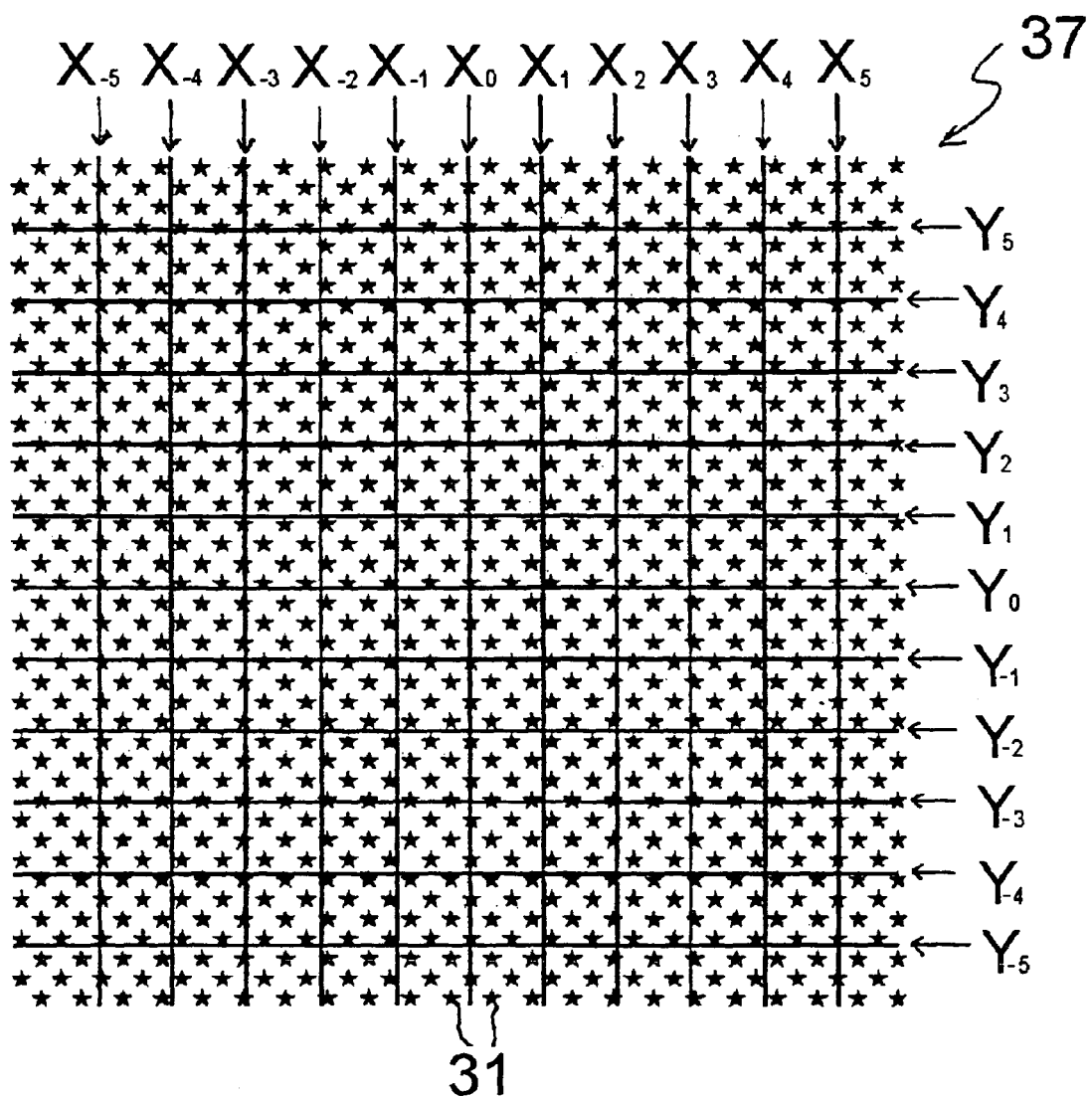
FIG. 14 is a view showing an example of patterns that can be adopted as design patterns.

FIG. 13 is a view for explaining a continuously deformed design that is configured by continuously changing the arrangement interval D between the two design units 31 that are adjacent in the arrangement direction following the auxiliary line $Y_0$ in the arrangement of the design units 31 formed along the auxiliary line $Y_0$ of the design pattern 35 shown in FIG. 9. In FIG. 13, only star-shaped design units 31a through 31k disposed on the auxiliary lines $X_{-5}$ through $X_5$ respectively are indicated by circles and deformed lines are indicated by lower-case letters "x" and "y."

The arrangement of the design units 31 along the $y_0$ shown in FIG. 12 is deformed such that, in the design pattern 35 shown in FIG. 9, the arrangement interval D of the two design units 31 adjacent in the arrangement direction of the design pattern 35 continuously changes gradually or steplessly as shown in FIG. 13 to satisfy the relationship of the expression (1). As a result, the arrangement of the design units 31 has the intervals larger and smaller than the arrangement intervals of the design pattern 35, and the arrangement of the design units 31 between the auxiliary line $x_{-5}$ and the auxiliary line $x_0$ and the arrangement of the design units 31 between the auxiliary line $x_5$ and the auxiliary line $x_0$ are line-symmetric to each other with respect to the auxiliary line $x_0$. Therefore, the arrangement interval $D_1$ between the design units 31a and 31b following the auxiliary line $y_0$ and the arrangement interval $D_1$ between design units 31k and 31j have the equal distance, and the arrangement intervals $D_2$ through $d_5$ also have the same distances as the arrangement intervals $D_2$ through $d_5$ respectively. It should be noted that FIG. 13 shows only the design units 31a through 31k positioned on the auxiliary lines $x_{-5}$ through $x_5$ respectively, but the arrangement of the design units 31 along the auxiliary line $Y_0$ is also deformed line-symmetrically with respect to the auxiliary line $x_0$.

On the other hand, the arrangement of the design units 31 along the $x_0$ shown in FIG. 12 is also deformed line-symmetrically with respect to the auxiliary line $y_0$ as with the arrangement of the design units 31a through 31k formed along the $y_0$. Specifically, the arrangement of the design units 31 formed along the $x_0$ is deformed such that, in the design pattern 35 shown in FIG. 9, the arrangement interval D of the two design units 31 adjacent in the arrangement direction of the design pattern 35 continuously changes gradually or steplessly as shown so as to satisfy the relationship of the expression (1). As a result, the arrangement of the design units 31 formed along the $x_0$ has the intervals larger and smaller than the arrangement intervals of the design pattern 35, and all of the arrangements of the design units 31 formed along the auxiliary line $X_0$ are deformed such that the arrangement of the design units 31 between the auxiliary line $y_{-5}$ and the auxiliary line $y_0$ and the arrangement of the design units 31 between the auxiliary line $y_5$ and the auxiliary line $y_0$ are line-symmetric to each other with respect to the auxiliary line $y_0$.

In this manner, in the design pattern 41 shown in FIG. 12, the arrangement of design units 31 formed along the auxiliary line $X_0$ and the arrangement of the design units 31 formed along the auxiliary line $Y_0$ both are deformed line-symmetrically with respect to the auxiliary line $y_0$, as described above. In the continuously deformed design portion shown in FIG. 12, the number of design units existing within a unit section sectioned by a y-axis and an x-axis is the same in any unit section. Furthermore, the regularity of the arrangements of the design units in the continuously deformed design portion shown in FIG. 12 is such that, specifically, the density of the design units existing in four unit sections around an intersection of a $y_0$-axis and an $x_0$-axis is maximum, and such that the density of the design units within unit sections that are arranged sequentially on the outside of the four unit sections decreases toward the outside. By deforming the arrangements of the design units 31 in this manner, the arrangement angle θ, which is formed by the arrangement direction of the design units 31 formed along the auxiliary line $y_0$ and the straight line connecting the two design units 31 adjacent in this arrangement direction, also slightly changes with the deformation, such that, for example, the arrangement of the design units 31 formed along the auxiliary line $y_4$ shown in FIG. 12 becomes proximate to the direction of the auxiliary line $y_0$, as is clear from FIG. 12 and FIG. 13. Specifically, in the arrangement of the design units 31 formed along the auxiliary line $y_0$, the arrangement angle θ, which is formed by the arrangement direction of the arrangement of the design units 31 and the straight line connecting the two design units 31 adjacent in this arrangement direction, is continuously changed gradually or steplessly. Such change in the arrangement angle is commonly-observed in not only the arrangements of the design units 31 formed along the auxiliary lines y but also the arrangements of the design units 31 formed along the auxiliary lines x. As a result, as shown in FIG. 12, the constantly deformed design portion 41 has the arrangement pattern in which the design pattern 35 converges, with the intersection of the auxiliary line $X_0$ and the auxiliary line $Y_0$ of the design pattern 35 at the center.

An example of the continuously deformed design portion 41 is shown in FIG. 12 and FIG. 13, but when the arrangement interval D is continuously changed gradually or steplessly the size of the arrangement interval D can be arbitrarily set as long as the abovementioned expression (1) is satisfied.

Moreover, in place of the continuously deformed design portion 41 shown in FIG. 12, for example, a continuously deformed design portion in which one of the arrangements of the design units 31 formed along the auxiliary line $y_0$ and auxiliary line $x_0$ is deformed can be obtained. Moreover, for example, only either one of the arrangement of the design units 31 between the auxiliary line $x_{-5}$ and the auxiliary line $x_0$ and the arrangement of the design units 31 between the auxiliary line $X_5$ and the auxiliary line $x_0$ may be deformed, and the amount of change in the arrangement intervals. D in the arrangement of the design units 31 between the auxiliary line $x_{-5}$ and the auxiliary line $x_0$ and in the arrangement of the design units 31 between the auxiliary line $X_5$ and the auxiliary line $x_0$ may be set to different values to deform the both arrangements.

Figure 15:
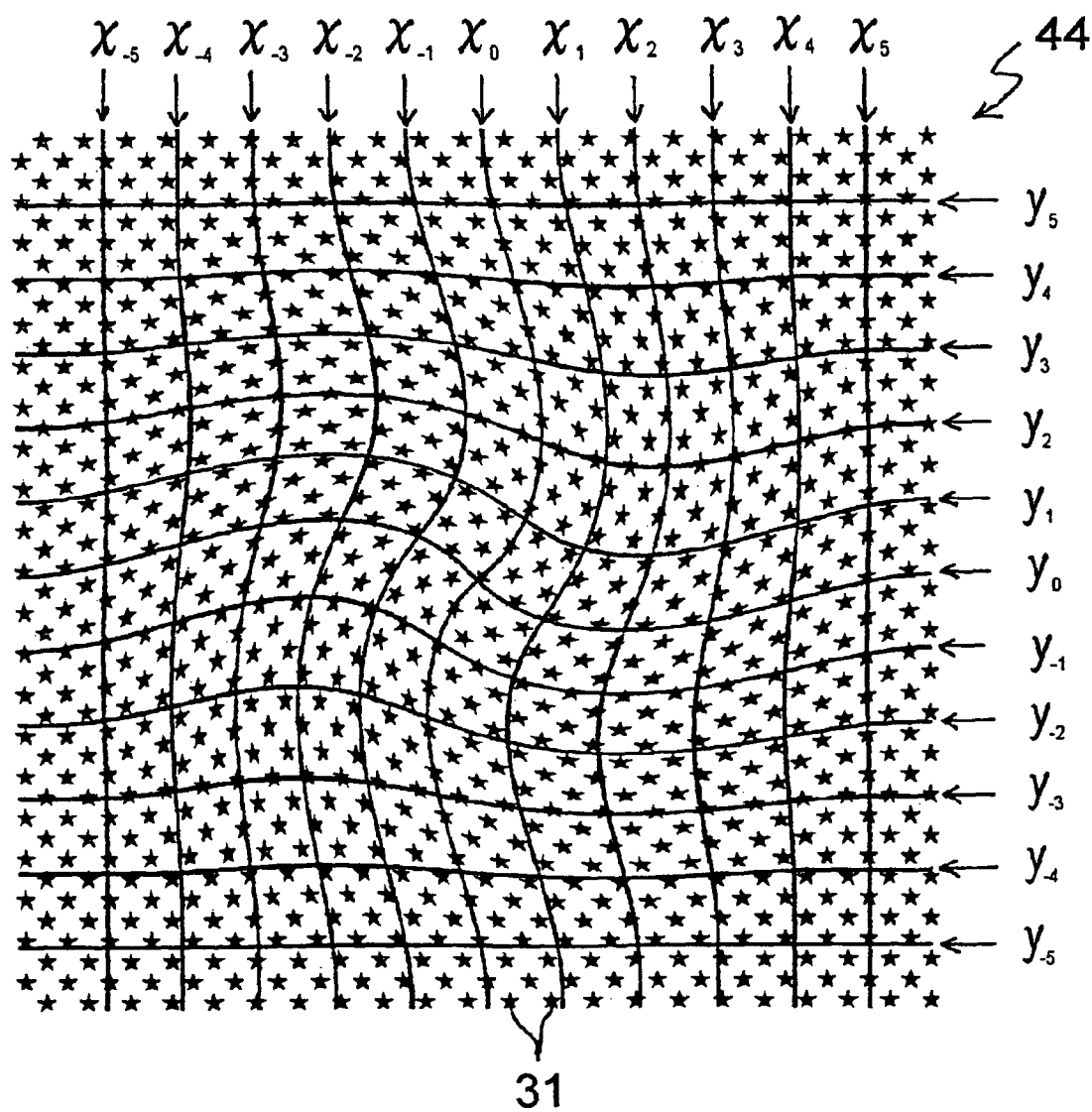
FIG. 15 is a view showing an example of the continuously deformed design portion in the stereoscopic sheet structure of the first embodiment.

Another example of the repeating design portion includes a repeating design portion (not shown) having a continuously deformed design portion 44 shown in FIG. 15. The continuously deformed design portion 44 is configured by deforming a design pattern 37 (see FIG. 14) in which the star-shaped design units 31 are arranged in the arrangement pattern similar to the arrangement of the convex lens assembly 20, such that, as shown in FIG. 15, the arrangement interval D between two design units adjacent in the arrangement direction of the design pattern and the arrangement angle θ formed by this arrangement direction and the straight line connecting the two design units change continuously.

As shown in FIG. 14, the design pattern 37 is an arrangement pattern similar to the arrangement of the convex lens assembly 20, that is, an arrangement pattern in which a plurality of star-shaped design units 31a rearranged at arrangement intervals different from the arrangement intervals L of the convex lens assembly 20. In the design pattern 37, the plurality of star-shaped design units 31 are arranged according to the same arrangement as the convex lens assembly 20 shown in FIG. 4, which is formed according to the square arrangement in which the convex lenses 21 are formed within the regular square lens forming sections 22 that are arranged vertically and horizontally at a tilt. It should be noted that each of the auxiliary lines $X_{-5}$ through $X_5$ and $Y_{-5}$ through $Y_5$ shown in FIG. 14 is an explanatory auxiliary line for explaining a state in which the design pattern 37 is changed, and thus is not for configuring the design pattern 37.

As shown in FIG. 15, as with the continuously deformed design portion 40, in the continuously deformed design portion 44, the arrangements of the design units 31 formed along the auxiliary lines $X_0$ and $Y_0$ of the design pattern 37 are configured by, on the basis of the design pattern 37, continuously changing the arrangement angle θ, which is formed by the arrangement direction of the design pattern 37 and the straight line connecting the two design units 31 adjacent in the arrangement direction. As a result, all of the arrangements of the design units 31 formed along the auxiliary line $X_0$ and the auxiliary line $Y_0$ of the design pattern 37 are deformed such that the arrangement of the design units between the auxiliary line $x_{-5}$ and the auxiliary line $x_0$ and the arrangement of the design units between the auxiliary line $x_5$ and the auxiliary line $x_0$ are deformed from a straight-line arrangement to an S-shaped arrangement and then again to a straight-line arrangement, and the arrangement of the design units between the auxiliary line $y_{-5}$ and the auxiliary line $y_0$ and the arrangement of the design units between the auxiliary line $y_5$ and the auxiliary line $y_0$ are deformed from a straight-line arrangement to an S-shaped arrangement and then again to a straight-line arrangement, especially around the intersection of the auxiliary line $x_0$ and the auxiliary line $y_0$. It should be noted that in FIG. 15 the auxiliary lines obtained after the deformation are indicated by lower-case letters "x" and "y."

Figure 16:
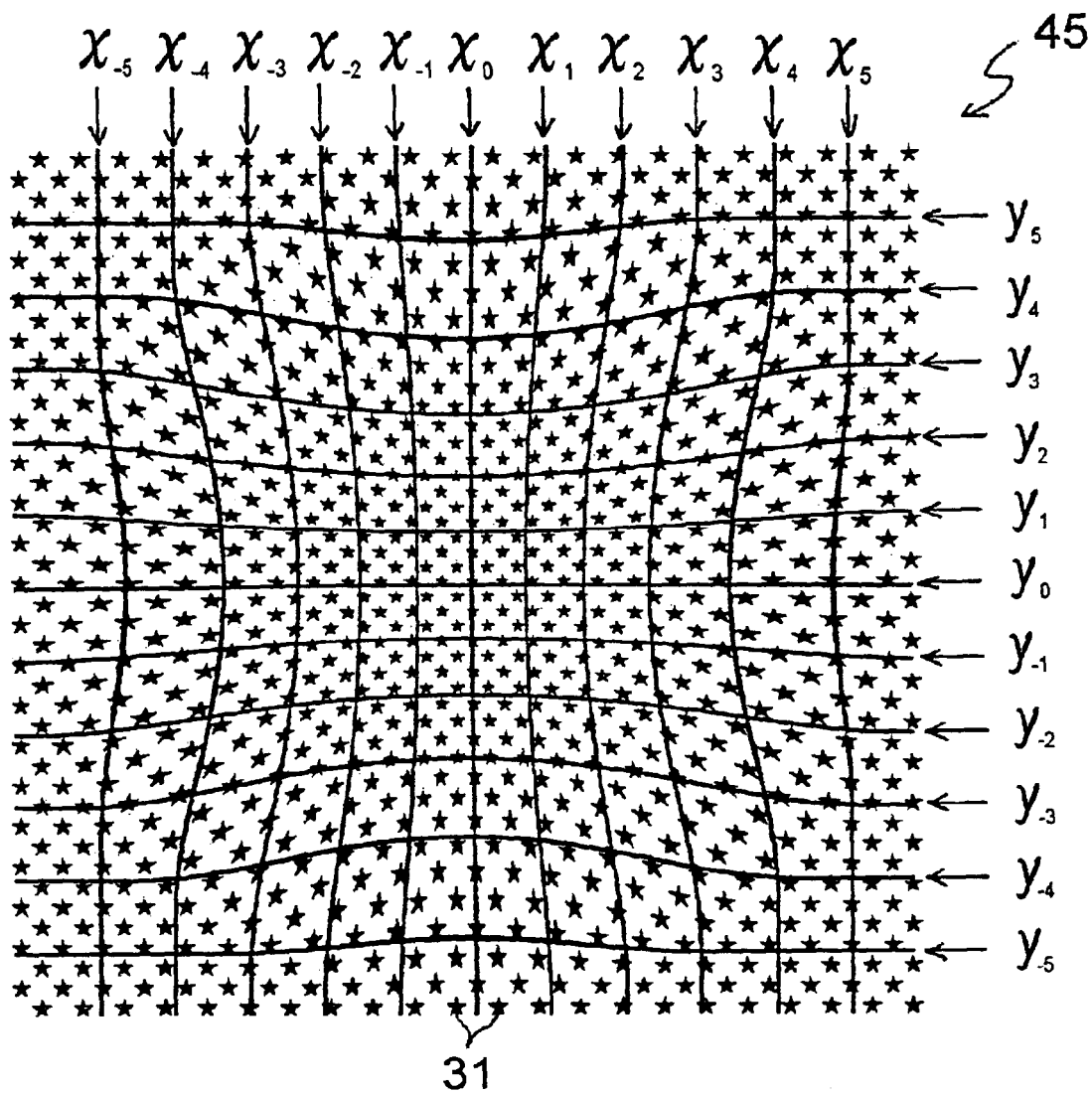
FIG. 16 is a view showing an example of the continuously deformed design portion in the stereoscopic sheet structure of the first embodiment.

Another example of the repeating design portion includes a repeating design portion having a continuously deformed design portion 45 shown in FIG. 16. The continuously deformed design portion 45 is configured by deforming the design pattern 37 shown in FIG. 14 such that, as with the continuously deformed pattern portion 1, the arrangement interval D between the two design units 31 adjacent in the arrangement direction of the design pattern 37 and the arrangement angle θ formed so as to satisfy the expression (2) for the any three selected continuous design units 31 change continuously. The continuously deformed design portion 45 of the repeating design portion 30 shown in FIG. 16 has the intervals larger and smaller than the arrangement intervals of the design pattern 37, wherein all of the arrangements of the design units 31 along the auxiliary lines $X_0$ and $Y_0$ of the design pattern 37 are deformed such that the arrangement of the design units between the auxiliary line $X_{-5}$ and the auxiliary line $x_0$ and the arrangement of the design units between the auxiliary line $X_5$ and the auxiliary line $x_0$ are line-symmetric to each other with respect to the auxiliary line $x_0$, and such that the arrangement of the design units 31 between the auxiliary line $y_{-5}$ and the auxiliary line $y_0$ and the arrangement of the design units 31 between the auxiliary line $y_5$ and the auxiliary line $y_0$ are line-symmetric to each other with respect to the auxiliary line $y_0$. It should be noted that in FIG. 16 the auxiliary lines obtained after the deformation are indicated by lower-case letters "x" and "y."

Figure 17:
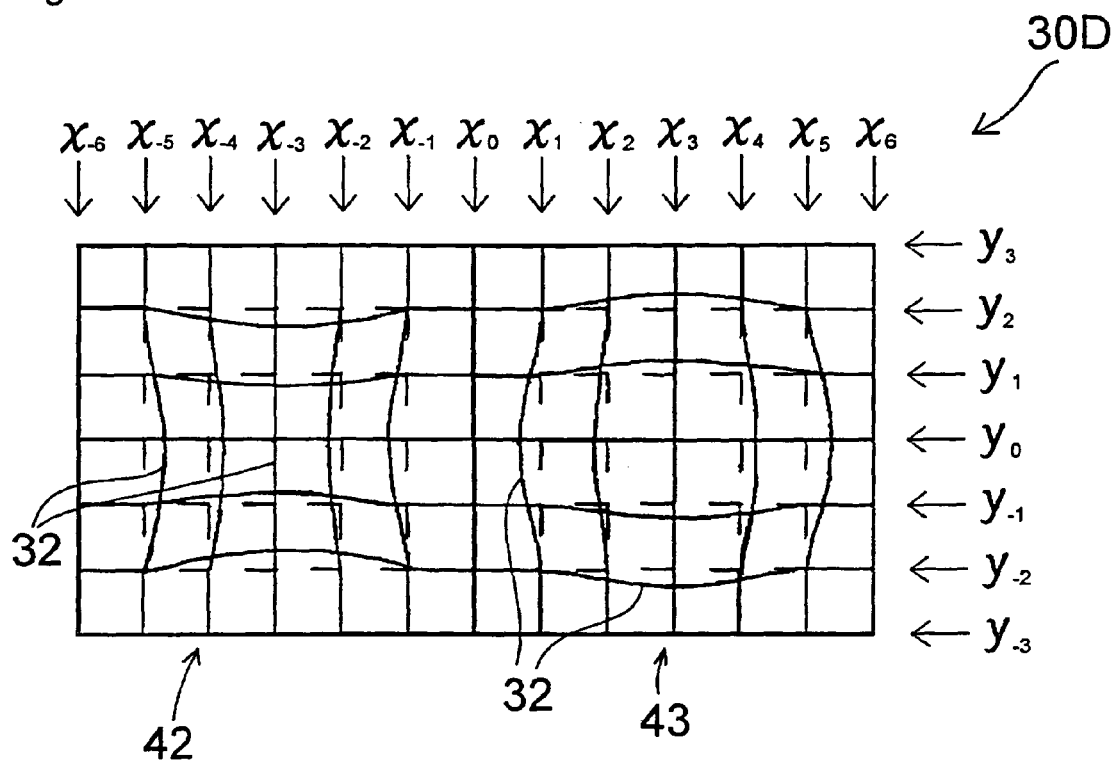
FIG. 17 is a view showing an example of the continuously deformed design portion in the stereoscopic sheet structure of the first embodiment.

Another example of the repeating design portion includes a repeating design portion 30D having a continuously deformed design portion 42 and a continuously deformed design portion 43 shown in FIG. 17. FIG. 17 shows a part of the repeating design portion 30D. The repeating design portion 30D is so configured that the design units thereof deform the two continuously deformed design portions 42 and 43 in the x direction of the auxiliary lines and the y direction of the auxiliary lines. It should be noted that in FIG. 17 the line segments configuring the continuously deformed design portions 42 and 43 are indicated by solid lines.

As with the continuously deformed design portion 41 or 45, the continuously deformed design portion 42 is configured by deforming a design pattern (not shown) composed of the design units 31. In this continuously deformed design portion 42, the arrangement intervals D of the design units 31 change from large to small in distance around the intersection of the auxiliary line $y_0$ and the auxiliary line $x_{-3}$, as the design unit is located farther from this intersection. The continuously deformed design portion 43 is configured by deforming the design pattern 36 such that the arrangement intervals D of the design units 31 change from large to small in distance around the intersection of the auxiliary line $y_0$ and the auxiliary line $x_3$, as the design unit is located farther from this intersection, that is, by means of a deformation method that is opposite to the one for the continuously deformed design portion 42.

The design pattern shown in FIG. 17, which is a collection of design units, is constituted by the design pattern in which line segments are arranged in the form of a grid, i.e., vertically and horizontally, thus the plurality of convex lenses of the convex lens assembly 20 are arranged in the form of a square in which the regular square lens forming sections shown in FIG. 3 are disposed vertically and horizontally.

The repeating design portion having the continuously deformed design portions 40 through 45 is formed on a surface opposite to the surface of the sheet member 10 on which the convex lens assembly 20, that is, a focal plane of the convex lenses.

In the stereoscopic sheet structure 1, the continuously deformed design portion 40 is used as an example for describing the principle in which the three-dimensional moiré designs based on the repeating design portions 30, 30D having the continuously deformed design portions 40 through 45 appear as though they were displaced and moved, by changing the angle of observation, even if the visual distance is long or short.

When viewing the repeating design portion 30 having the continuously deformed design portion 40 through the convex lens assembly 20, the continuously deformed design portion 40 appears as a three-dimensional moiré design and as though it is displaced and moved, by changing the angle for observing it.

In the stereoscopic sheet structure 1, the three-dimensional visual effect of the continuously deformed design portion 40 is determined by the difference between the arrangement interval L between convex lenses 21 of the convex lens assembly 20 and the arrangement interval D between design units 31 of the continuously deformed design portion 40, and by the angular difference between the arrangement direction of the convex lenses 21 of the convex lens assembly 20 and the arrangement direction of the design units 31 of the continuously deformed design portion 40. Specifically, if the arrangement interval L is larger than the arrangement interval D, the repeating design portion 30 appears as though it were subducted, but if, on the other hand, the arrangement interval D is larger than the arrangement interval L, the repeating design portion 30 appears as though it were floating. The smaller the difference between the arrangement interval L and the arrangement interval D (absolute value), the larger the degree of subduction or the degree of floating seems. Moreover, the smaller the angular difference between the arrangement direction of the convex lenses 21 of the convex lens assembly 20 and the arrangement direction of the design units 31 of the continuously deformed design portion 40 (absolute value), the larger the degree of subduction or the degree of floating seems.

Therefore, in the continuously deformed design portion 40 in which the arrangement interval D and the arrangement angle θ in the design units 31 are continuously changed gradually or steplessly, since the arrangement interval D and the arrangement angle θ of the plurality of design units 31 configuring the continuously deformed design portion 40 are continuously changed, the degree of subduction or degree of floating of the continuously deformed design portion 40 also appears to be changed continuously when viewing the continuously deformed design portion 40 via the convex lens assembly 20. As a result, the continuously deformed design portion 40 that appears to be subducted or floating is enhanced three-dimensionally when viewed via the convex lens assembly 20, whereby the three-dimensional visual effect of the continuously deformed design portion 40 becomes significant.

On the other hand, when the angle for viewing the continuously deformed design portion 40 via the lens assembly 20 is changed, the degree of movement at which the design units 31 configuring the continuously deformed design portion 40 appear to be moving depends on the significance of the above-mentioned three-dimensional visual effects. Specifically, the smaller the difference between the arrangement interval L and the arrangement interval D (absolute value), or the smaller the angular difference between the arrangement direction of the convex lenses 21 of the convex lens assembly 20 and the arrangement direction of the design units 31 of the continuously deformed design portion 40 (absolute value), the degree of subduction or degree of floating of the continuously deformed design portion increases and thereby the degree of movement of the same increases, by changing the angle for observing the continuously deformed design portion 40. Therefore, when the angle of observation is changed, the degree of movement at which the design units 31 configuring the continuously deformed design portion 40 appear to be moving is changed according to the difference between the arrangement interval L and the arrangement interval D (absolute value). Moreover, when the angular difference between the arrangement direction of the convex lenses 21 of the convex lens assembly 20 and the arrangement direction of the design units 31 of the continuously deformed design portion 40 (absolute value) is changed, the design units 31 configuring the continuously deformed design portion 40 appear to be moving in a direction different from the direction of movement of eyes, when viewing from a different angle. The direction of movement of the design units 31 at this moment depends on the angular difference between the arrangement direction of the convex lenses 21 of the convex lens assembly 20 and the arrangement direction of the design units 31 of the continuously deformed design portion 40 (absolute value), thus if this difference increases, the direction of movement of the design units 31 diverges sharply from the direction of movement of eyes.

As a result, in a section of the continuously deformed design portion 40 in which the arrangement interval D is continuously changed, the amount of displacement of the design units 31 appears constantly differently when the angle of observation is changed, and in a section in which the arrangement angle θ is continuously changed, the direction of displacement of the design units 31 appears constantly differently when the angle of observation is changed. Therefore, when the angle for viewing the continuously deformed design portion 40 via the convex lens assembly 20 is changed, the movement of the continuously deformed design portion 40 is enhanced, whereby the continuously deformed design portion appears more clearly.

As described above, in the continuously deformed design portion 40 in which the difference between the arrangement interval L and the arrangement interval D (absolute value) and the angular difference between the arrangement direction of the convex lens 21 of the convex lens assembly 20 and the arrangement direction of the design units 31 of the continuously deformed design portion 40 (absolute value) are continuously changed gradually and steplessly, a difference is continuously generated in the amount of displacement of the design pattern 31 configuring the continuously deformed design portion 40 and in the direction of displacement of the design pattern 31, and, as a result, the movement of the continuously deformed design portion 40 is enhanced to thereby appear clearly, thus the movement of the continuously deformed design portion 40 can be observed clearly and easily, not only when the visual distance is short but also when the visual distance is long.

Therefore, as in the stereoscopic sheet structure 1 of the first embodiment according to the present invention, the three-dimensionally subducting or floating state of the continuously deformed design portion 40 viewed via the convex lens assembly 20 appears clearly, and when the continuously deformed design portion 40 is viewed via the lens assembly 20, the three-dimensional moiré designs appear as though they were displaced and moved even if the visual distance is long, by changing the angle of observation.

Therefore, the stereoscopic sheet structure 1 can be applied to, for example, a packaging material that is viewed from a short distance, and, for example, advertising display in the street, a poster, an advertisement tower, an information display board and the like that are normally viewed from a long distance.

In the continuously deformed design portion 40 and the continuously deformed design portion 44, specifically, when viewed at a different angle via the convex lens assembly 20, the three-dimensional moiré designs, in which the design units 31 converge toward the intersection of the auxiliary line $x_0$ and the auxiliary line $y_0$ and float, appear as though they flew into or flew out of the intersection.

In the continuously deformed design portion 41 and the continuously deformed design portion 45, specifically, when viewed at a different angle via the convex lens assembly 20, the three-dimensional moiré designs in which the design units 31 converge toward the intersection of the auxiliary line $x_0$ and the auxiliary line $y_0$ and are subducted appear as though they flew into or flew out of the intersection.

In the continuously deformed design portion 42 shown in FIG. 17, specifically, when viewed at a different angle via the convex lens assembly 20, the three-dimensional moiré designs in which the design units 32 converge toward the intersection of the auxiliary line $x_{-3}$ and the auxiliary line $y_0$ and are subducted appear as though they flew into or flew out of the intersection, while in the continuously deformed design portion 43, specifically, when viewed at a different angle via the convex lens assembly 20, the three-dimensional moiré designs in which the design units 32 expand radially from the intersection of the auxiliary line $x_3$ and the auxiliary line $y_0$ and float appear as though they flew into or flew out of the intersection. In other words, the repeating design portion 30D, as a whole, appears as though the undulating designs thereof having alternate convex and concave portions rippled.

The method of producing the stereoscopic sheet structure 1 is described. First, the sheet member 10 is formed using the abovementioned materials by a known production method such as a molding technique. At this moment, a surface of the sheet member 10 on which the convex lens 20 is formed may be subjected to surface processing in accordance with a predetermined method to provide the abovementioned surface roughness, or may be provided with an underlayer. The underlayer can be formed using a resin composition or the like by means of dipping, brush coating, spraying, application using a roll coater, printing, or other method.

Next, the abovementioned materials are used to form the convex lens assembly 20 on a surface of the sheet member 10. Examples of the method for forming the convex lens assembly 20 include a known formation method capable of forming the convex lens assembly 20, such as a molding method using a mold or a printing method.

When the sheet member 10 and the convex lens assembly 20 are formed using the same material, the sheet member 10 and the convex lens assembly 20 may be integrally formed by means of, for example, a molding technique or the like.

Next, in order to form the repeating design portion 30 having the continuously deformed design portion 40, first of all, in the repeating design portion 30 a plurality of design units 31 are arranged using image editing software (for example, Adobe Illustrator™ produced by Adobe Systems, Adobe Photoshop produced by Adobe Systems, etc.) by means of, for example, a personal computer so as to form an arrangement pattern having an arrangement interval different from the arrangement interval L of the convex lens assembly 20, thereby creating the design pattern 35 shown in, for example FIG. 9. Next, in a partial area or the entire areas in this repeating design portion 30 (corresponding to the design pattern 35), the arrangement angle and arrangement interval D of the design pattern 35 are changed to obtain the arrangement shown in FIG. 10 by means of the abovementioned image editing software. The repeating design portion 30 having the continuously deformed design portion 40, which is formed in the manner described above, can be formed on the surface of the sheet member 10 on which the convex lens assembly 20 is not formed, that is, on the focal plane of the convex lenses, whereby the stereoscopic sheet structure 1 can be produced. It should be noted that the repeating design portion having the continuously deformed design portion 41 shown in FIG. 12, the continuously deformed design portion 44 shown in FIG. 15, the continuously deformed design portion 45 shown in FIG. 16, and the repeating design portion 30D having the continuously deformed design portions 42, 42 shown in FIG. 17 can formed in the same manner.

According to the present invention, the continuously deformed design portions that are partially or entirely deformed can be easily formed as described above, thus the stereoscopic sheet structure 1 can be produced easily.

Also, the continuously deformed design portions may be configured by deforming the design patterns by gradually or drastically changing the arrangement interval D and the arrangement angle θ of the any three continuous design units 31 in the arrangement direction, so long as the relationship of the expression (1) and the expression (2) are satisfied by the abovementioned design units 31, thus the design patterns are not particularly limited to those of the continuously deformed design portions 40 through 45.

Furthermore, each of the repeating design portions 30 in the stereoscopic sheet structure 1 has one continuously deformed design portion but may have two or more continuously deformed design portions as shown in FIG. 17. In this case, the two or more continuously deformed design portions may be the same continuously deformed design portion or different continuously deformed design portions. For example, each of the repeating design portions 30, 30A through 30C may have a plurality of the continuously deformed design portions 40 or continuously deformed design portions 41 or may have both in plurality. In the case in which the repeating designs have a plurality of continuously deformed design portions, the continuously deformed design portions can be arranged arbitrarily.

Moreover, although it is assumed that the areas in which any of the repeating design portions 30, 30D and the continuously deformed design portions 40 through 45 in the stereoscopic sheet structure 1 are formed are square-shaped, the contour shape of the areas for forming the repeating designs and continuously deformed design portions is not particularly limited, thus examples of the shape include polygons such as triangle, square, pentagon and hexagon, circle, ellipse, heart shape, star shape, tear shape, arrow shape, streamline shape, character shape, and a combination of these shapes.

The configuration of the stereoscopic sheet structure according to the present invention is not limited to the one in which the convex lens assembly that is formed by assembling a plurality of convex lenses is formed on one surface of the transparent sheet member having one or a plurality of layers, and then the repeating design portion having the continuously deformed design portions is formed on the focal plane of the convex lenses of the sheet member. For example, the stereoscopic sheet structure according to the present invention is also a stereoscopic sheet structure in which one surface of the first sheet member is provided with the convex lens assembly, one surface of the second sheet member is provided with the repeating design portion, and the first sheet member and the second sheet member are stacked detachably or integrally so that the focal plane of the convex lenses of the first sheet member faces a surface of the second sheet member that has the repeating design portion.

Figure 18:
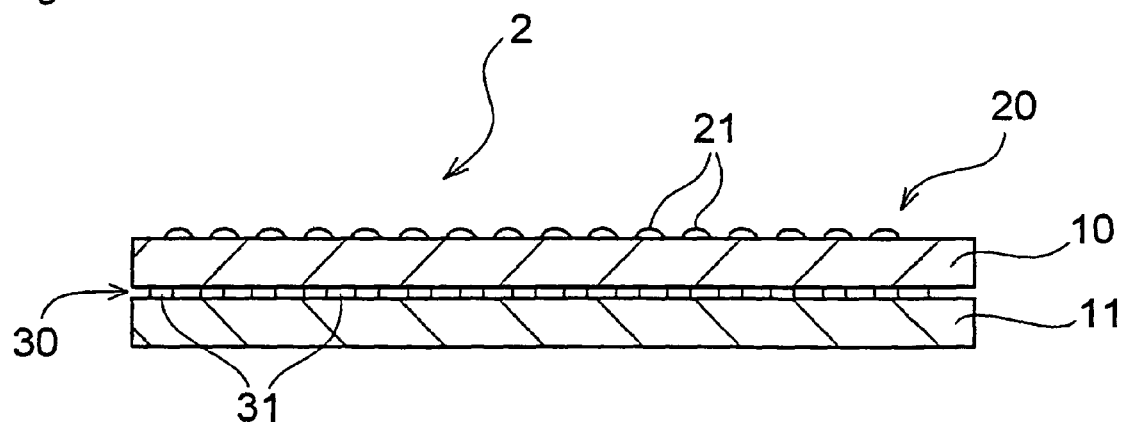
FIG. 18 is a schematic cross-sectional view showing the stereoscopic sheet structure as an example of the present invention.

Specifically, in a stereoscopic sheet structure 2, as shown in FIG. 18, one surface of the first sheet member 10 has the convex lens assembly 20, one surface of the second sheet member 11 has the repeating design portion 30, and the first sheet member 10 and the second sheet member 11 are stacked so that the other surface of the first sheet member 10, that is, a focal plane of the convex lenses, faces the surface of the second sheet member 11 that has the repeating design portion 30. The sheet member 11 in the stereoscopic sheet structure 2 may be transparent or can be formed by means of a material such as paper, synthetic resin, a coating film or the like.

The stacked body does not have to be integrally fixed, i.e., adhered or bonded, in a state in which the sheet member 10 and the sheet member 11 face each other; the sheet member 10 and the sheet member 11 may be grasped using, for example, two holding plates or the like to thereby keep the state in which the sheet member 10 and the sheet member 11 face each other, when the stacked body is used. In the stereoscopic sheet structure 2 shown in FIG. 18, the repeating design portion 30 is created and formed on a surface of the sheet member 11 by using the abovementioned method, whereby the sheet member 11 having the repeating design portion 30 can be formed.

Moreover, FIG. 18 shows the stacked body having the two sheet members 10 and 11, but the stacked body may have three or more stacked sheet members. For example, a third sheet member may be interposed between the sheet member 10 and the sheet member 11, or the sheet member 10, the sheet member 11, and the third sheet member may be stacked in this order. The third sheet member sometimes functions as a support layer for supporting the sheet member 10 or the sheet member 11, and also functions as a focal distance adjustment layer for adjusting the focal distance so that the focal points of the convex lens assembly 20 form an image on the repeating designs.

Figure 19:
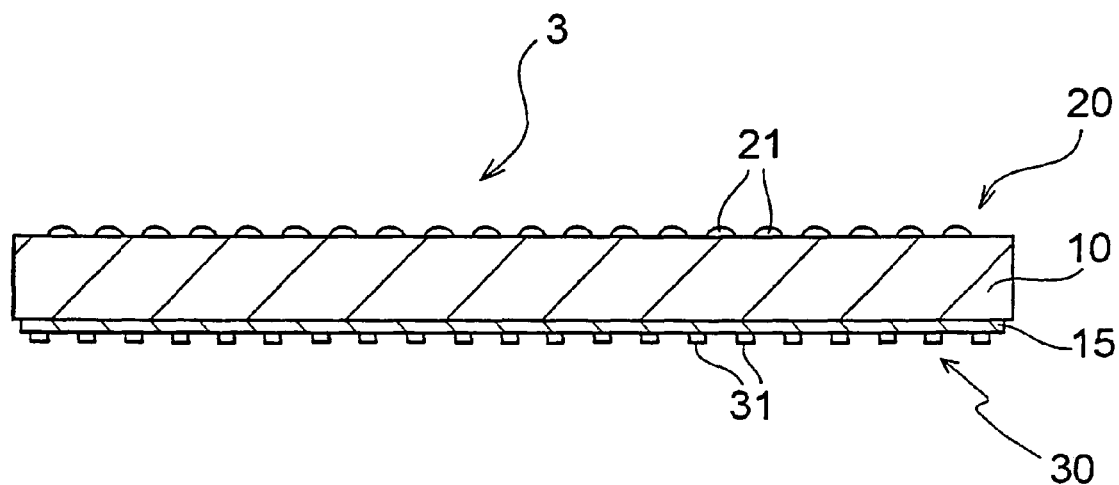
FIG. 19 is a schematic cross-sectional view showing the stereoscopic sheet structure as an example of the present invention.

In addition, the stereoscopic sheet structures 1 and 2 have the repeating designs, but may further have other designs or images in addition to these repeating designs. For example, as in a stereoscopic sheet structure 3 shown in FIG. 19, an image 15 may be formed on a surface of the sheet member 10 on which the convex lens assembly 20 is not formed and the repeating design portion 30 may be formed on the surface of the image 15 as a background or the like of the image 15. Of course, the repeating design portion 30 may be formed on the surface of the sheet member 10 and the image 15 may be formed on the surface of the repeating design portion 30.

A stereoscopic sheet structure 4 of a second embodiment of the present invention is described with reference to the drawings. As with the stereoscopic sheet structure 1 of the first embodiment shown in FIG. 1, in the stereoscopic sheet structure 4 shown in FIG. 20 one surface of the sheet member 10 has the convex lens assembly 20 on which a plurality of lenses 21 are formed, and the other surface of the sheet member 10 has repeating designs 50. The sheet member 10 and the convex lens assembly 20 of the stereoscopic sheet structure 4 according to the second embodiment are the same as the sheet member 10 and the convex lens assembly 20 of the stereoscopic sheet structure 1 according to the first embodiment. In the stereoscopic sheet structure 4 according to the second embodiment, for example, the convex lens assembly 20 has a square-shaped arrangement in which the regular square lens forming sections shown in FIG. 3 are disposed vertically and horizontally.

Figure 20:
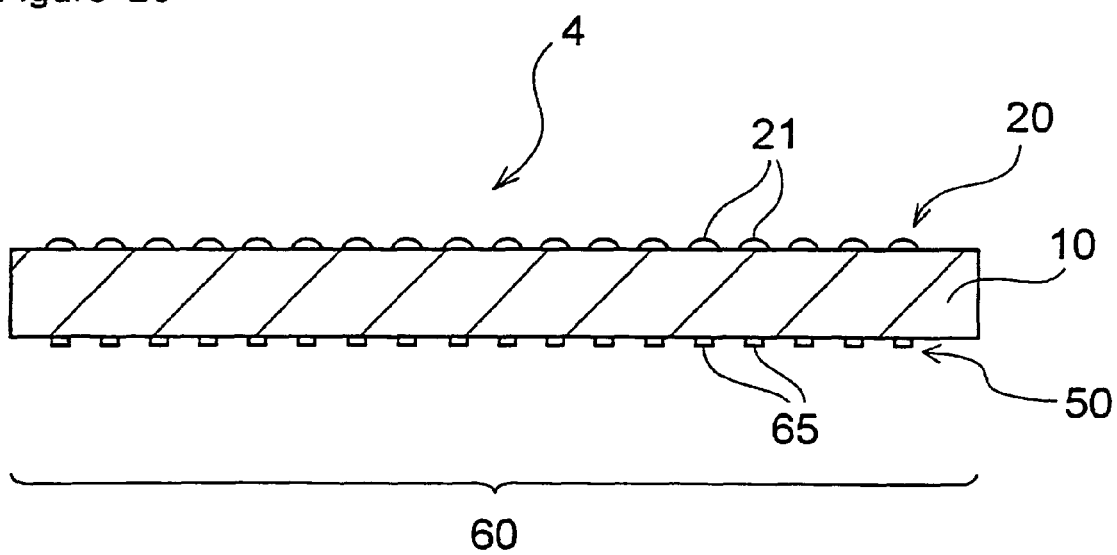
FIG. 20 is a schematic cross-sectional view showing the stereoscopic sheet structure as an example of the present invention.

As shown in FIG. 20, the repeating designs 50 in the stereoscopic sheet structure 4 have a line segment assembly portion 60 in which a plurality of line segments 65 are adjacent to one another at intervals D different from the arrangement intervals L of the convex lenses 21 of the convex lens assembly 20.

The contour shape of an area forming the line segment assembly portion 60 can be determined arbitrarily so as to have a desired design, and the examples thereof include polygons such as triangle, square, pentagon and hexagon, circle, ellipse, heart shape, star shape, tear shape, arrow shape, streamline shape, character shape, and a combination of these shapes.

Figure 21:
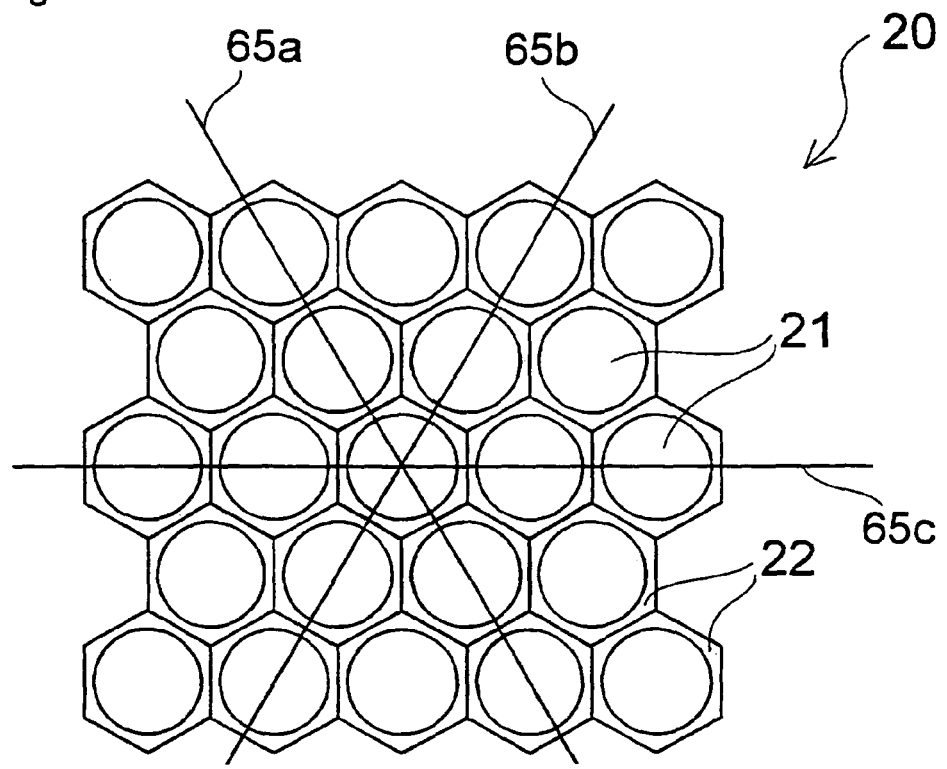
FIG. 21 is a view showing an example of line segments that can be adopted as line segments configuring a line segment assembly portion of a stereoscopic sheet structure of a second embodiment in a honeycomb-shaped arrangement.
Figure 22:
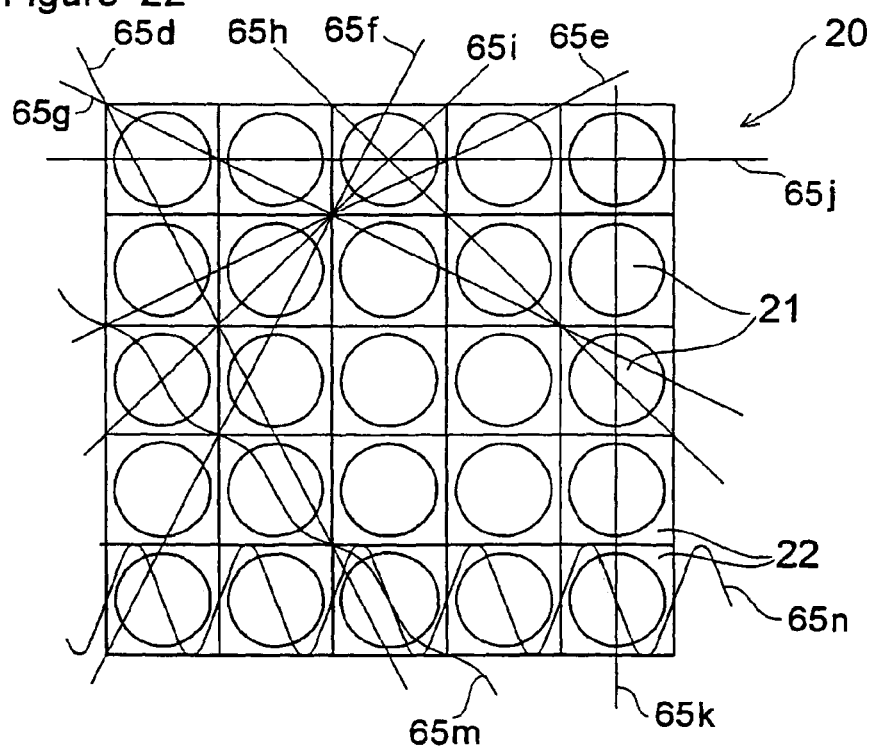
FIG. 22 is a view showing an example of line segments that can be adopted as line segments configuring a line segment assembly portion of the stereoscopic sheet structure of the second embodiment in a square-shaped arrangement.

The line segments 65 configuring the line segment assembly portion 60 are adjacent to one another substantially parallel at intervals different from the arrangement intervals L of the convex lenses 21 of the convex lens assembly 20, and may be line segments capable of forming a repeating pattern, such as straight lines, curved lines, or lines having these lines. Examples of such line segments 65 include line segments that extend in the same direction as the direction of extension of the line segments that pass through convex lenses 21 adjacent to the convex lenses 21 configuring the convex lens assembly 20. More specifically, the examples include, in the case in which the convex lens assembly 20 is formed according to the arrangements shown in FIG. 2, line segments that extend in the same direction as the direction of extension of line segments 65a through 65c shown in FIG. 21, and in the case in which the convex lens assembly 20 is formed according to the arrangements shown in FIG. 3, line segments that extend in the same direction as the direction of extension of line segments 65d through 65m shown in FIG. 22.

In the line segment assembly portion 60, the line segments thereof are assembled and adjacent to one another substantially parallel at intervals different from the arrangement intervals L of the convex lenses 21 of the convex lens assembly 20. Here, the description "intervals different from the arrangement intervals of the convex lenses 21" means that, for example, the intervals between the plurality of adjacent line segments configuring the line segment assembly portion 60 are shorter than the arrangement interval L and constant, longer than the arrangement interval L and constant, become short or long continuously and gradually or drastically, and become short and long continuously and gradually or drastically. The abovementioned constant intervals can be, for example, 1/n through n times (n is an integer except 0) the arrangement interval L of the convex lenses.

Figure 23:
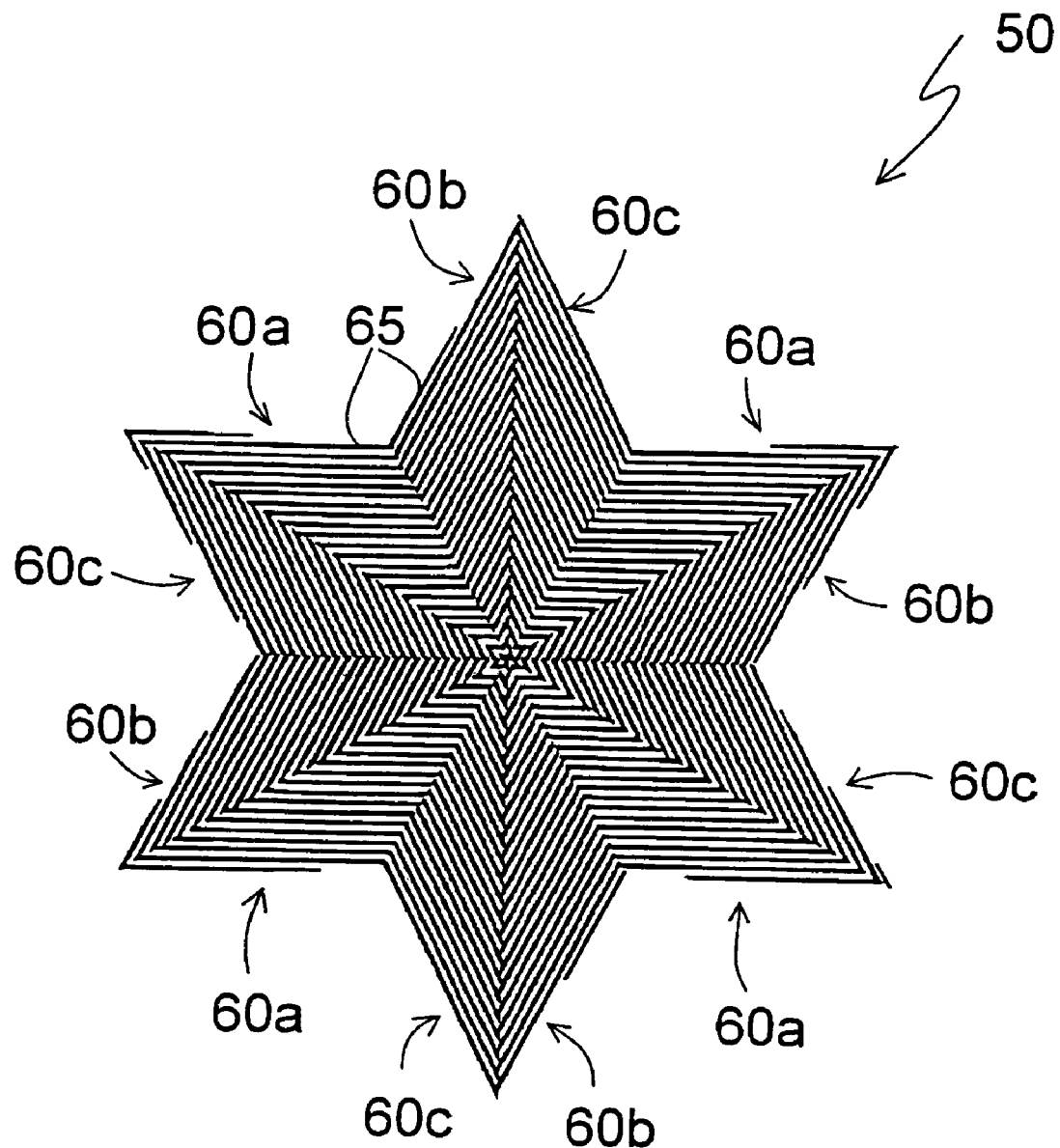
FIG. 23 is a view showing an example of a repeating design in the stereoscopic sheet structure of the second embodiment.

In the stereoscopic sheet structure 4, each of the repeating designs 50 has a star-shaped contour based on a regular hexagonal shape as shown in, for example, FIG. 23, and triangle portions obtained by dividing this star shape into twelve triangle portions have disposed therein four of three types of line segment assembly portions 60a, 60b and 60c. The three types of line segment assembly portions 60a, 60b and 60c are arranged in the order of the line segment assembly portions 60a, 60b and 60c in a clockwise direction so that the directions of extension of the line segments configuring these line segment assembly portions 60a through 60c differ from the directions of extension of the line segments configuring the two adjacent line segment assembly portions. Each of the line segments 65 configuring the line segment assembly portions 60a, 60b and 60c extends in the same direction as the directions of extension of a line segment 65j and of line segments 65d and 65f shown in FIG. 22, and the distance between adjacent line segments 65 configuring each of the line segment assembly portions 60a, 60b and 60c is set to be different from the arrangement interval L of the convex lenses 21 configuring the convex lens assembly 20. All of the three types of line segment assembly portions 60a, 60b and 60c are arranged at a distance different from the arrangement interval L, and the plurality of line segments 65 are arranged parallel.

As with the stereoscopic sheet structure 1, in the stereoscopic sheet structure 4 the repeating designs 50 are formed on a convex lens focal plane, which is a surface opposite to the surface of the sheet member 10 on which the convex lens assembly 20 is formed.

Hereinafter, there is described the principle in which in the stereoscopic sheet structure 4, the three-dimensional moiré designs of the repeating designs 50 having the line segment assembly 60 appear as though they were displaced and moved, by changing the angle of observation, even if the visual distance is long or short.

When the three types of line segment assembly portions 60a, 60b and 60c of the repeating designs 50 are viewed via the convex lens assembly 20 at a different angle, the plurality of line segments configuring each of the line segment assembly portions 60a, 60b and 60c uniformly move in parallel, and as a result each of the line segment assembly portions 60a, 60b and 60c appears as though they were displaced and moved. Specifically, when the repeating design 50 shown in FIG. 23 is viewed via the convex lens assembly 20 after moving the eyes in a horizontal direction (lateral direction in FIG. 23), the line segment assembly portion 60a in which the directions of extension of the line segments configuring the line segment assembly portion match the direction of movement of eyes is actually displaced and moved, but the direction of displacement matches the direction of movement of eyes, thus apparently the line segment assembly portion 60a does not appear to be moving, but the line segment assembly portions 60b and 60c in which the directions of extension of the line segments configuring these line segment assembly portions do not match the direction of movement of eyes appear to be moving. In this manner, a part of the repeating design 50 (line segment assembly portion 60a) does not appear to be moving, but other parts (line segment assembly portions 60b and 60c) appear to be moving, thus the repeating design 50 appears to be moving three-dimensionally, when the repeating design 50 is viewed via the convex lens assembly 20 by moving eyes in the horizontal direction.

In the repeating design 50, the plurality of line segment assembly portions 60a, 60b and 60c are disposed such that the directions of extension of the line segments configuring a line segment assembly portion differ from the directions of extension of the line segments configuring the two adjacent line segment assembly portions, thus, when the angle of observation is changed, three-dimensional movement of the repeating design 50 appears more clearly when the line segment assembly portions move differently from one another. Therefore, according to the stereoscopic sheet structure 4 of the second embodiment of the present invention, when the repeating designs 50 are viewed via the lens assembly 20, even if the visual distance is long, movement of the three-dimensional moiré designs can be viewed clearly by changing the angle for observing the repeating designs, and, when the repeating design has a plurality of line segment assembly portions, movement of the three-dimensional moiré designs can be viewed more clearly, as described above.

Therefore, the stereoscopic sheet structure 4 can be applied to, for example, a packaging material that is usually viewed from a short distance, and, for example, advertising display in the street, a poster, an advertisement tower, an information display board and the like that are normally viewed from a long distance.

When the repeating design 50 is viewed via the convex lens assembly 20 by moving eyes in the horizontal direction, specifically, the line segment assembly portion 60a appears to be static, while the line segment assembly portions 60b and 60c appear as though they were flowing toward the outside or the inside of the repeating design 50. On the other hand, when viewing the repeating design 50 by moving eyes in a direction that does not match any of the directions of extension of the line segments configuring the line segment assembly portions 60a through 60c, all of the line segment assembly portions 60a through 60c appear as though they were flowing toward the outside or the inside of the repeating design 50 separately.

The stereoscopic sheet structure 4 can be produced in the same manner as the stereoscopic sheet structures 1 through 3 of the first embodiment. The repeating design 50 having the line segment assembly portion 60 can create desired image data using the abovementioned image editing software or the like using a personal computer in the same manner as, for example, the repeating design portion 30.

Figure 24:
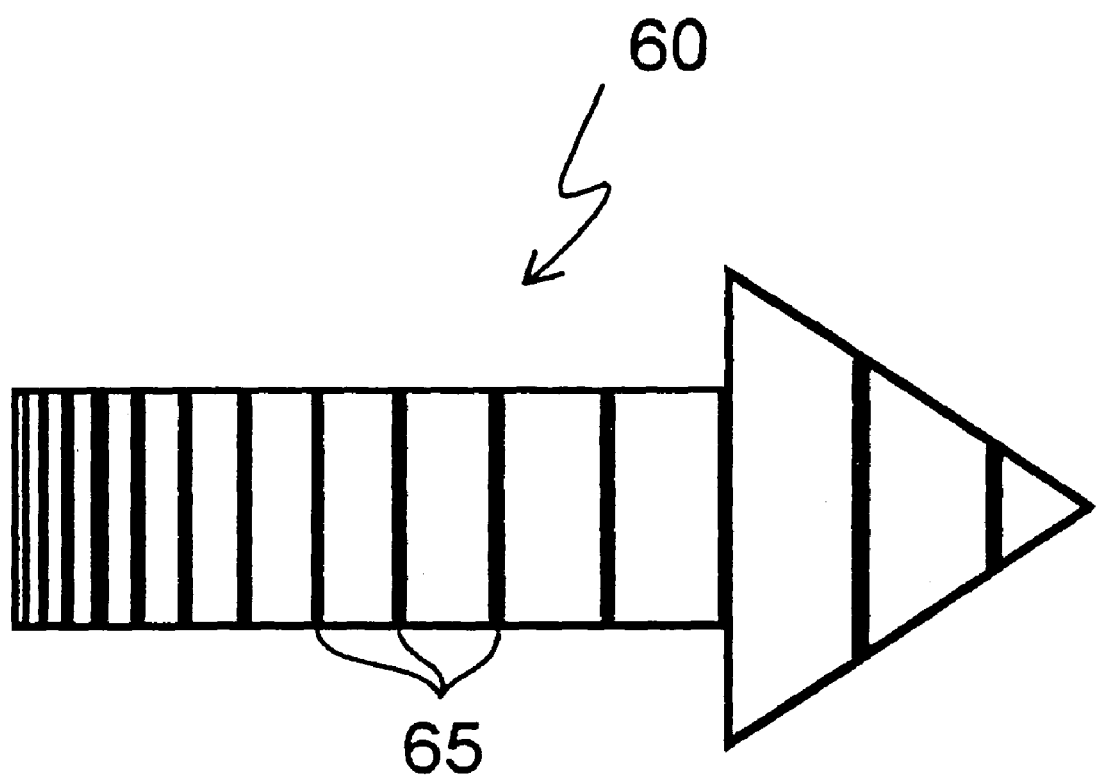
FIG. 24 is a view showing an example of the line segment assembly portion in the stereoscopic sheet structure of the second embodiment.

In the stereoscopic sheet structure 4 of the second embodiment, the shape of the repeating design 50 is not limited to a star shape having the line segment assembly portions 60a through 60c. For example, the repeating design 50 may have at least one line segment assembly portion. Furthermore, the plurality of line segments configuring the line segment assembly portion may have intervals therebetween that continuously become short gradually or steplessly, that continuously become long gradually or steplessly, and that continuously become short and long gradually or steplessly, as shown in FIG. 24. In such cases, the three-dimensional moiré designs appear to be continuously moving gradually or steplessly. Moreover, other design or image may be interposed between the line segments configuring the line segment assembly portion.

Moreover, as with the stereoscopic sheet structure 1 of the first embodiment, in the stereoscopic sheet structure 4 as well, a stacked body of the sheet member 10 and the sheet member 11 may be provided as in the stereoscopic sheet structure 2 shown in FIG. 18, or a stacked body in which three or more sheet members are stacked may be provided. Similarly, the stereoscopic sheet structure 4 may also be provided with other design or the image 15 besides the repeating design 50, as in the stereoscopic sheet structure 3 shown in FIG. 19.

A stereoscopic sheet structure 5 of a third embodiment of the present invention is described with reference to the drawings. As with the stereoscopic sheet structure 1 of the first embodiment shown in FIG. 1, in the stereoscopic sheet structure 5 shown in FIG. 25 one surface of the sheet member 10 has the convex lens assembly 20 on which a plurality of lenses 21 are formed, and the other surface of the sheet member 10 has repeating designs 70. The sheet member 10 and the convex lens assembly 20 of the stereoscopic sheet structure 5 according to the third embodiment are the same as the sheet member 10 and the convex lens assembly 20 of the stereoscopic sheet structure 1 according to the first embodiment. In the stereoscopic sheet structure 5 according to the third embodiment, for example, the convex lens assembly 20 has a square-shaped arrangement in which the regular square lens forming sections shown in FIG. 3 are disposed vertically and horizontally.

Figure 25:
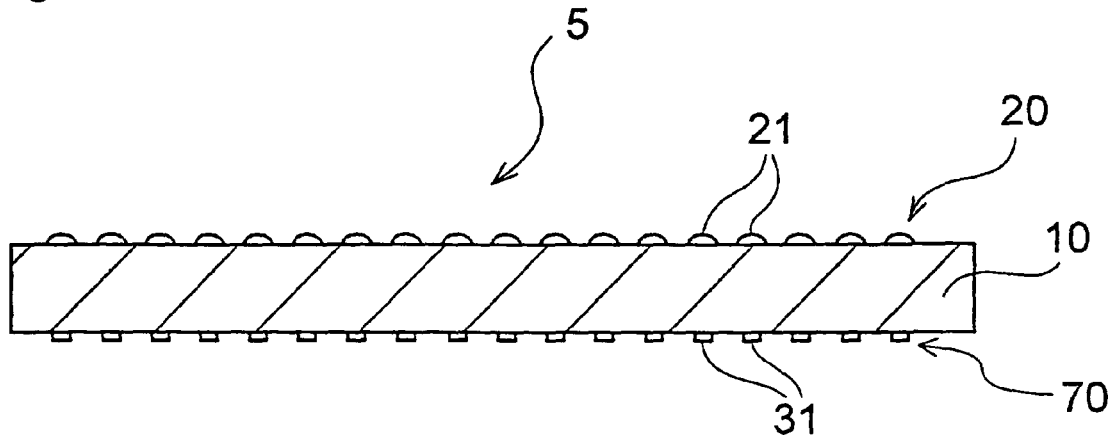
FIG. 25 is a schematic cross-sectional view showing the stereoscopic sheet structure as an example of the present invention.

As shown in FIG. 25, the repeating designs 70 of the stereoscopic sheet structure 5 have continuously deformed design portions that are configured by deforming a design pattern, such that a plurality of sections having the equal number of design units 31 are formed in the design pattern that has the plurality of design units 31 arranged at arrangement intervals D different from the arrangement intervals L of the convex lenses 21 of the convex lens assembly 20, the plurality of sections being obtained by division at regular intervals in each arrangement direction of the design unit 31, and the sections formed along at least one of the arrangement directions have a plurality of design units 31 arranged in the abovementioned one direction at the arrangement intervals D different from the arrangement intervals following the abovementioned one direction of the design units 31 contained in at least one different section adjacent to this section in the abovementioned direction. In other words, the repeating designs 70 have continuously deformed design portions in which the design units 31 are arranged, such that the plurality of design units 31 (A) are arranged at the arrangement intervals D different from the arrangement intervals L of the convex lenses 21 of the convex lens assembly 20, and (B) in sections that are obtained by division into a plurality of pieces in each arrangement direction of the design units 31 and that have the equal number of the design units 31, the arrangement intervals following at least one of the arrangement directions of the design units 31 included in one section are different from the arrangement intervals following the abovementioned one direction of the design units 31 included in at least one section adjacent to this section in the abovementioned one direction. An example of the repeating designs 70 of the stereoscopic sheet structure 5 is described with reference to FIG. 26 through FIG. 31. It should be noted that the repeating designs shown in FIG. 26 are not the repeating designs according to the present invention but are used as a reference for describing the repeating designs according to the present invention.

Figure 26:
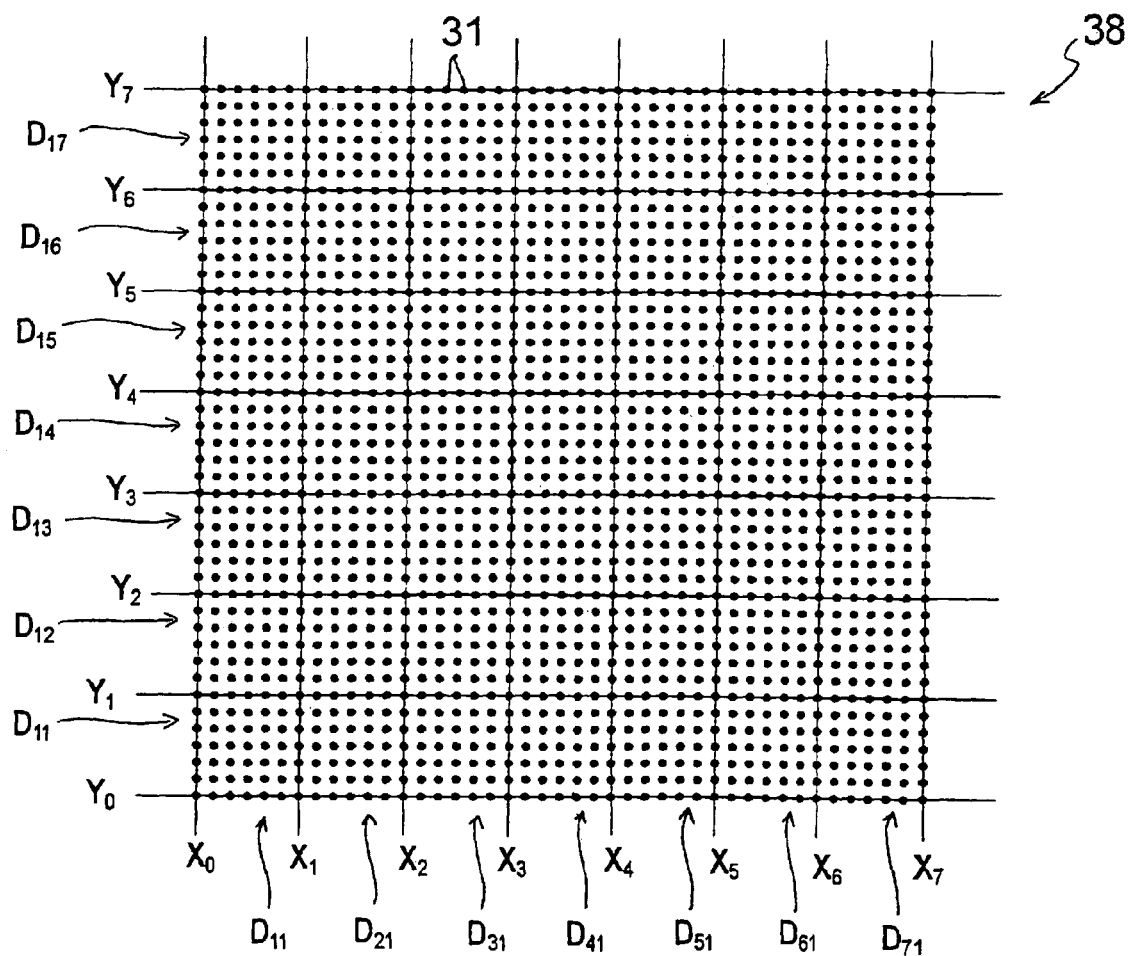
FIG. 26 is a view showing an example of patterns that can be adopted as design patterns.
Figure 27:
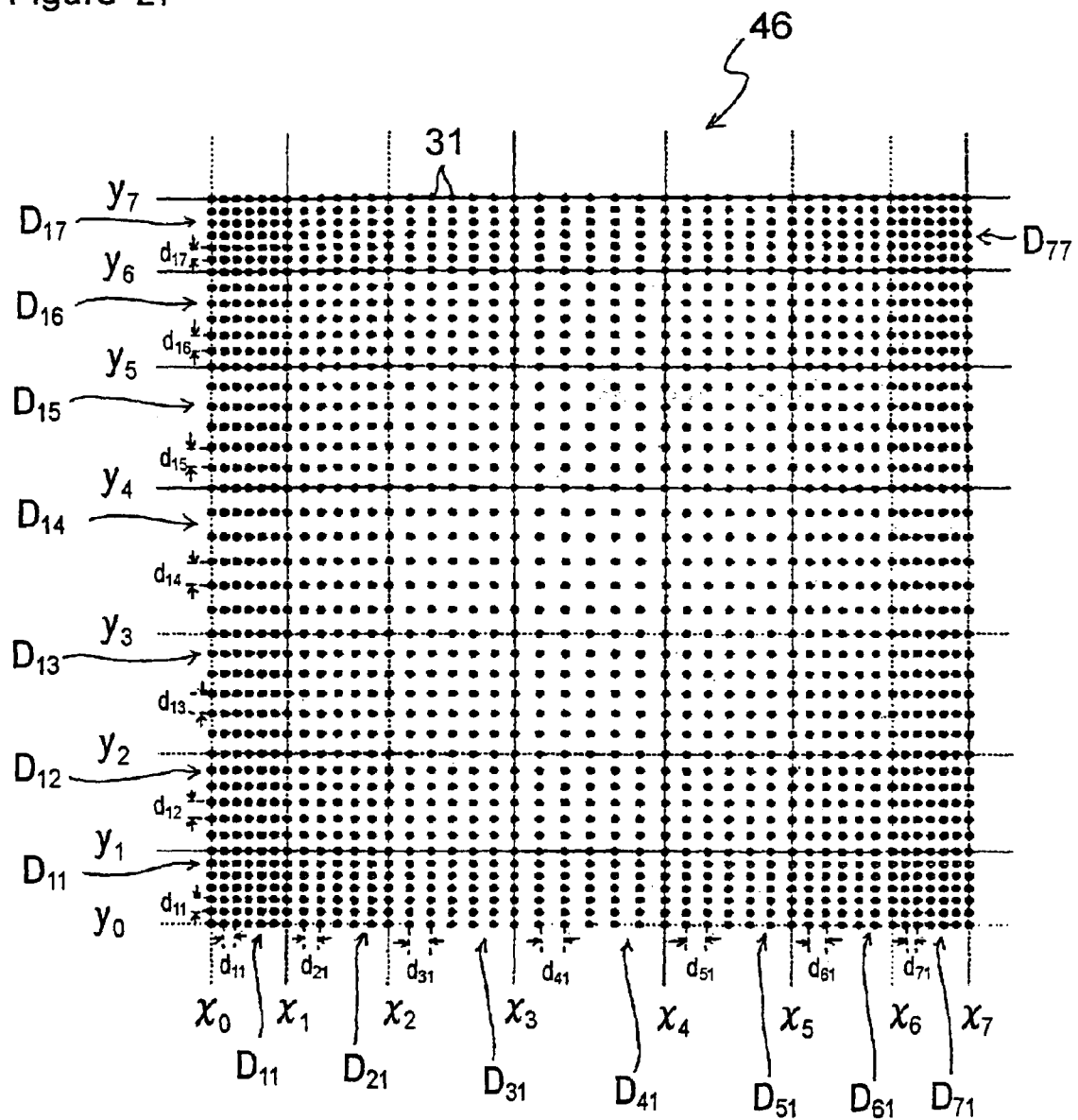
FIG. 27 is a view showing an example of the continuously deformed design portion in the stereoscopic sheet structure of a third embodiment.

Examples of the repeating designs 70 of the stereoscopic sheet structure 5 of the third embodiment include repeating designs having a continuously deformed design portion 46 shown in FIG. 27. In this continuously deformed design portion 46, as shown in FIG. 27, a design pattern 38 shown in FIG. 26 is deformed such that a plurality of sections that are obtained by division in the form of a grid at regular intervals in the vertical and horizontal arrangement directions of design units 31 and have the equal number of design units 31 are formed in the design pattern in which the plurality of circular design units 31 are arranged at arrangement intervals D different from the arrangement intervals L of the convex lenses 21 of the convex lens assembly 20, and the sections that are formed along the vertical and horizontal arrangement directions of the design units 31 have the plurality of design units 31 that are arranged in vertical and horizontal arrangement directions at vertical and horizontal arrangement intervals different from the vertical and horizontal arrangement intervals of the design units 31 included in other sections adjacent to these sections vertically and horizontally. Specifically, as shown in FIG. 26, the continuously deformed design portion 46 is configured by deforming the design pattern 38, as described above, in which the design units 31 are arranged at an arrangement pattern similar to the arrangement of the convex lens assembly 20.

The design pattern 38 is, specifically, an arrangement pattern having intervals different from the arrangement intervals L of the convex lens assembly 20, as shown in FIG. 26, and the plurality of circular design units 31 are arranged in this design pattern, but the configuration of the design pattern 38 is not limited to this configuration. Specifically, the design pattern 38 may be similar to the arrangement of the convex lens assembly 20, thus, for example, the arrangement intervals of the design pattern 38 is smaller or larger than the arrangement intervals L of the convex lens assembly 20, and the arrangement direction of the same is the same as or different from the arrangement direction in the convex lens assembly 20. For example, when the convex lens assembly 20 is formed according to the arrangements shown in FIG. 2 through FIG. 8, the design patterns are formed according to the arrangements shown in FIG. 2 through FIG. 8 so as to have the arrangement intervals D different from the arrangement intervals L of the arrangements shown in FIG. 2 through FIG. 8. It should be noted that the design units configuring the design pattern 38 are the same as the design units of the stereoscopic sheet structure 1 of the first embodiment. Since the convex lens assembly 20 (lens forming sections 22) of the stereoscopic sheet structure 5 of the third embodiment is formed according to the square-shaped arrangement shown in FIG. 3, in the design pattern 38 the plurality of circular design units 31 are formed according to the square-shaped arrangement, as shown in FIG. 26. It should be noted that the auxiliary lines $X_0$ through $X_7$ and $Y_0$ through $Y_7$ shown in FIG. 26 are the explanatory auxiliary lines for explaining the state for changing the design pattern 38 and are not for configuring the design pattern 38.

As shown in FIG. 26, in the design pattern 38, a plurality of grid-like sections that are obtained by division in each of the vertical and horizontal arrangement directions of the design units 31 at regular intervals and have the equal number of design units 31 are formed. The grid-like sections formed in the design pattern 38 are obtained by division into seven pieces vertically and horizontally by the auxiliary lines $X_0$ through $X_7$ and $Y_0$ through $Y_7$ that are drawn in vertical and horizontal arrangement directions of the design pattern 38 at regular intervals, and each of the sections has forty-nine design units 31.

The continuously deformed design portion 46 is configured by, for example, deforming the design pattern 38 having forty-nine sections formed therein, as described above. In other words, in the continuously deformed design portion 46, the design units 31 are arranged such that the plurality of design units 31 (A) are arranged at the arrangement intervals D different from the arrangement intervals L of the convex lenses 21 of the convex lens assembly 20, and (B) in sections that are obtained by division in the form of a grid into a plurality of pieces in the vertical and horizontal arrangement directions of the design units 31 and that have the equal number of the design units 31, the arrangement intervals following one of the arrangement directions of the design units 31 included in one section are different from the arrangement intervals following the abovementioned arrangement direction of the design units 31 included in a section that is adjacent to this section in the abovementioned arrangement direction.

Specifically, as shown in FIG. 27, in the continuously deformed design portion 46, the design pattern 38 is deformed in the direction of extension of the auxiliary lines y and thereupon the plurality of design units 31 are arranged, such that, for example, arrangement intervals $d_{11}$ through $d_{71}$ that continue in the direction of extension of the auxiliary lines y (which may sometimes be referred to as "auxiliary line y direction" hereinafter, and which means a horizontal arrangement direction in the continuously deformed design portion 46 in FIG. 27) and follow the auxiliary line y direction of the design units 31 contained in sections $D_{11}$ through $D_{71}$ respectively differ from the arrangement intervals D of the design units 31 contained in other sections adjacent to each other in the auxiliary line y direction, i.e., the arrangement intervals $d_{11}$ through $d_{71}$ in the sections $D_{11}$ through $D_{71}$ respectively become small sequentially after becoming sequentially large continuously or non-continuously and gradually or steplessly so as to be symmetric with respect to a section $D_{41}$. Specifically, the arrangement intervals $d_{11}$ through $d_{71}$ of the design units in the sections $D_{11}$ through $D_{71}$ have a relationship of "$d_{11}=d_{71}<d_{21}=d_{61}<d_{31}=d_{51}<d_{41}$," and the arrangement intervals in the auxiliary line y direction vary in the sections adjacent to each other in the abovementioned direction. It should be noted that the auxiliary lines $x_0$ through $x_7$ and $y_0$ through $y_7$ shown in FIG. 27 correspond to the auxiliary lines $X_0$ through $X_7$ and $Y_0$ through $Y_7$ of the design pattern 38 respectively, and are not the auxiliary lines for configuring the continuously deformed design portion 46 but are the explanatory auxiliary lines for explaining the state for deforming the sections.

Furthermore, in the continuously deformed design portion 46, the design pattern 38 is deformed in the direction of extension of the auxiliary lines x and thereupon the plurality of design units 31 are arranged, such that, for example, arrangement intervals $d_{11}$ through $d_{17}$ that continue in the direction of extension of the auxiliary lines x (which may sometimes be referred to as "auxiliary line x direction" hereinafter, and which means a vertical arrangement direction in the continuously deformed design portion 46 in FIG. 27) and follow the auxiliary line x direction of the design units 31 contained in sections $D_{11}$ through $D_{17}$ respectively differ from the arrangement intervals D of the design units 31 contained in other sections adjacent to each other in the auxiliary line x direction at the same rate as the sections $D_{11}$ through $D_{71}$ continuing in the abovementioned auxiliary line y direction, i.e., the arrangement intervals $d_{11}$ through $d_{17}$ in the sections $D_{11}$ through $D_{17}$ respectively become small sequentially after becoming sequentially large continuously or non-continuously and gradually or steplessly so as to be symmetric with respect to a section $D_{14}$, at the same rate as the sections $D_{11}$ through $D_{71}$ continuing in the abovementioned auxiliary line y direction. Specifically, the arrangement intervals $d_{11}$ through $d_{17}$ of the design units in the sections $D_{11}$ through $D_{17}$ have a relationship of "$d_{11}=d_{17}<d_{12}=d_{16}<d_{13}=d_{15}<d_{14}$," and the arrangement intervals in the auxiliary line x direction vary in the sections adjacent to each other in the abovementioned direction. Moreover, the arrangement intervals D in the sections formed in the continuously deformed design portion 46 have a relationship of "$d_{11}=d_{71}=d_{17}$, $d_{21}=d_{61}=d_{12}=d_{16}$, $d_{31}=d_{51}=d_{13}=d_{15}$, $d_{41}=d_{14}$."

The continuously deformed design portion 46 was explained using the sections $D_{11}$ through $D_{71}$ and $D_{11}$ through $D_{17}$ as examples, but the sections continuing along the auxiliary line y direction and the sections continuing along the auxiliary line x direction are all deformed as with the sections $D_{11}$ through $D_{71}$ and $D_{11}$ through $D_{17}$ as shown in FIG. 27, and the design units 31 are arranged similarly.

Therefore, since the continuously deformed design portion 46 is deformed similarly in the auxiliary line x direction and the auxiliary line y direction and thereupon the design units 31 are arranged similarly, thus the contour shape of the continuously deformed design portion is a regular square as with the contour shape of the design pattern 38, the density of the design units 31 increases toward the outside of the continuously deformed design portion, while the density of the design units 31 decreases toward the inside of the continuously deformed design portion, the density of the design units 31 is the largest at the sections $D_{11}$, $D_{17}$, $D_{71}$ and $D_{77}$ located at four corners, while the density of the design units 31 is the smallest at the section $D_{44}$ located at the center, and the sections arranged along a diagonal line of the continuously deformed design portion 46 have a similar shape.

Examples of the continuously deformed design portion 46 are described in FIG. 26 and FIG. 27, but the size of the arrangement intervals d can be arbitrarily set when continuously or non-continuously changing the arrangement intervals d gradually or steplessly.

Moreover, as shown in FIG. 26, in the continuously deformed design portion 46, forty-nine sections that are obtained by dividing the design units 31 into seven sections in each vertical and horizontal arrangement direction at regular intervals are formed in the design pattern 38, wherein the sections that are formed along the vertical and horizontal arrangement directions of the design units 31 are arranged at vertical and horizontal arrangement intervals different from the vertical and horizontal arrangement intervals of the design units 31 contained in other sections adjacent to these sections vertically and horizontally, so as to have the plurality of design units 31 that are arranged along the vertical and horizontal directions, whereby the design pattern 38 is deformed, but the number of sections to be formed in the design pattern 38 is not limited to forty-nine, and thus can be set to any number.

Moreover, in the continuously deformed design portion 46 shown in FIG. 27, the design pattern 38 is deformed in the auxiliary line x direction and the auxiliary line y direction so that the arrangement interval D between sections D varies, at the same rate as the auxiliary line x direction and the auxiliary line y direction, whereby the plurality of design units 31 are arranged, but the design pattern 38 may be deformed in the auxiliary line x direction and the auxiliary line y direction so that the arrangement interval D between the sections D varies, in a different rate in the auxiliary line x direction and the auxiliary line y direction, whereby the plurality of design units 31 may be arranged.

In addition, in the continuously deformed design portion 46 shown in FIG. 27, the design pattern 38 is deformed in the auxiliary line x direction and the auxiliary line y direction and thereby the plurality of design units 31 are arranged such that the arrangement interval d between the sections D sequentially decreases after sequentially increasing continuously or non-continuously and gradually or steplessly and such that the intervals d become symmetric with respect to the section $D_{14}$ and the section $D_{41}$. In the stereoscopic sheet structure 5 of the third embodiment, however, the method of deformation and arrangement is not limited to such method of formation and arrangement, thus, for example, the design pattern 38 may be deformed in the auxiliary line x direction and the auxiliary line y direction and thereby the plurality of design units 31 may be arranged, such that the arrangement intervals d in the sections continuing in the auxiliary line x direction and the auxiliary line y direction sequentially become large or small continuously or non-continuously and gradually or steplessly or alternately become large or small continuously or non-continuously and gradually or steplessly.

It should be noted that the repeating design 70 may be configured as the continuously deformed design portion 46 as a whole or may partially have one or a plurality of continuously deformed design portions 46.

Figure 28:
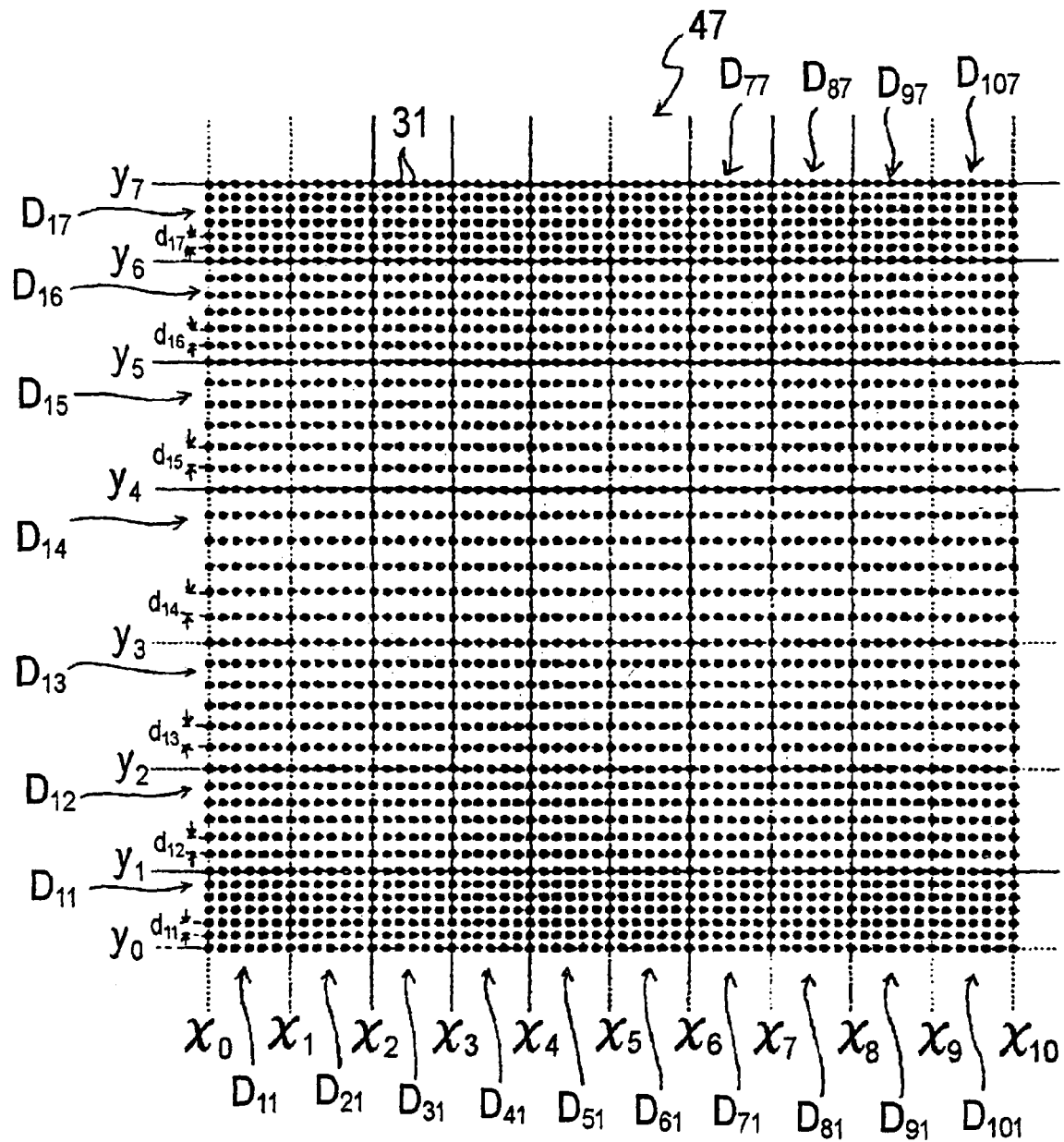
FIG. 28 is a view showing an example of the continuously deformed design portion in the stereoscopic sheet structure of the third embodiment.

As another example of the repeating design 70, there is a repeating design (not shown) that has a continuously deformed design portion 47 shown in FIG. 28. In this continuously deformed design portion 47, as shown in FIG. 28, only the vertical arrangement direction of the design pattern 38 is deformed such that a plurality of sections that are obtained by division in the form of a grid at regular intervals in the vertical and horizontal arrangement directions of design units 31 and have the equal number of design units 31 are formed in the design pattern in which the plurality of circular design units 31 are arranged at arrangement intervals D different from the arrangement intervals L of the convex lenses 21 of the convex lens assembly 20, and the sections that are formed along the vertical arrangement direction of the design units 31 have the plurality of design units 31 that are arranged in vertical arrangement direction at arrangement intervals different from the vertical arrangement interval of the design units 31 included in other sections adjacent to these sections. Specifically, as shown in FIG. 28, the continuously deformed design portion 47 is different from the continuously deformed design portion 46 in which the vertical and horizontal arrangement directions of the design units 31 are changed, in that only the vertical arrangement direction of the design pattern 38 is deformed.

The continuously deformed design portion 47 is configured by deforming the design pattern 38 having forty-nine sections formed therein, as described above. In other words, in the continuously deformed design portion 47, the design units 31 are arranged such that the plurality of design units 31 (A) are arranged at the arrangement intervals D different from the arrangement intervals L of the convex lenses 21 of the convex lens assembly 20, and (B) in sections that are obtained by division in the form of a grid into a plurality of pieces in the vertical and horizontal arrangement directions of the design units 31 and that have the equal number of the design units 31, the arrangement intervals following the vertical arrangement direction of the design units 31 included in one section are different from the arrangement intervals following the vertical arrangement direction of the design units 31 included in a section that is adjacent to this section in the vertical arrangement direction.

Specifically, in the continuously deformed design portion 47, as shown in FIG. 28, the design pattern 38 is deformed in the auxiliary line x direction and thereupon the plurality of design units 31 are arranged, such that, for example, arrangement intervals $d_{11}$ through $d_{17}$ that continue in the auxiliary line x direction and follow the auxiliary line x direction of the design units 31 contained in sections $D_{11}$ through $D_{17}$ respectively differ from the arrangement intervals d of the design units 31 contained in other sections adjacent to each other in the auxiliary line x direction, i.e., the arrangement intervals $d_{11}$ through $d_{17}$ in the sections $D_{11}$ through $D_{17}$ respectively become small sequentially after becoming sequentially large continuously or non-continuously and gradually or steplessly so as to be symmetric with respect to the section $D_{14}$. Specifically, the arrangement intervals $d_{11}$ through $d_{17}$ of the design units in the sections $D_{11}$ through $D_{17}$ have a relationship of "$d_{11}=d_{17}<d_{12}=d_{16}<d_{13}=d_{15}<d_{14}$," and the arrangement intervals in the auxiliary line x direction vary in the sections adjacent to each other in the abovementioned direction. It should be noted that the auxiliary line $x_0$ through $x_{10}$ and $y_0$ through $y_7$ shown in FIG. 28 are not for configuring the continuously deformed design portion 47, as with the auxiliary lines shown in FIG. 27.

The continuously deformed design portion 47 was explained using the sections $D_{11}$ through $D_{17}$ as examples, but the sections continuing along the auxiliary line x direction are all deformed as described above, as shown in FIG. 28. Also, the arrangement intervals D following the auxiliary line y direction of the design units 31 contained in the sections continuing in the auxiliary line y direction are all constant throughout the sections, and may be the same as the arrangement intervals of the design pattern 38 or may be smaller or larger than the arrangement intervals.

Therefore, since the continuously deformed design portion 47 is deformed in the auxiliary line x direction only and there upon the design units 31 are arranged, thus the continuously deformed design portion has a rectangular contour shape that is different from the contour shape of the design pattern 38, and the density of the design units 31 increases toward the outside in the auxiliary line x direction, while the density of the design units 31 decreases toward the inside. As shown in FIG. 28, in the continuously deformed design portion 47, section columns $D_{81}$ through $D_{87}$, section columns $D_{91}$ through $D_{97}$ and section columns $D_{101}$ through $D_{107}$ are formed along an auxiliary line y-axis direction of section columns $D_{71}$ through $D_{77}$ continuing in the auxiliary line x direction, so as to have a contour shape that is substantially similar to the contour shape of the design pattern 38.

The continuously deformed design portion 47 is the same as the continuously deformed design portion 46 in that the number of sections to be formed in the design patter 38 is not limited to forty-nine, that the arrangement intervals d to be deformed can be set arbitrarily, that the design pattern 38 may be deformed in the auxiliary line X direction such that the arrangement intervals d in the sections D continuing in the auxiliary line x direction sequentially become large or small continuously or non-continuously and gradually or steplessly, or alternately become large or small continuously or non-continuously and gradually or steplessly, and that a repeating design 70A may be configured as the continuously deformed design portion 47 as a whole or may partially have one or a plurality of continuously deformed design portions 47.

Figure 29:
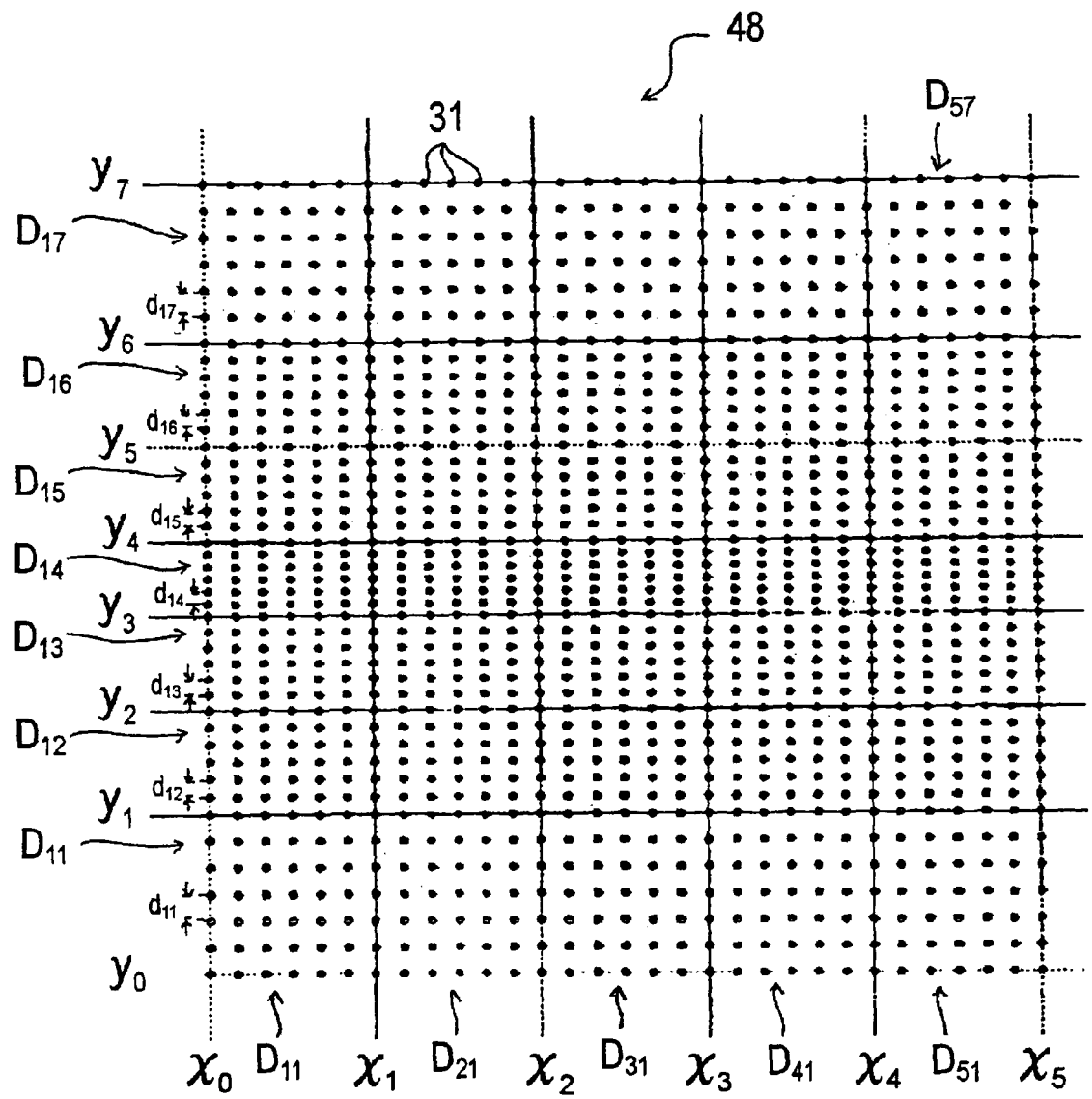
FIG. 29 is a view showing an example of the continuously deformed design portion in the stereoscopic sheet structure of the third embodiment.

As another example of the repeating design 70, there is a repeating design 70B (not shown) that has a continuously deformed design portion 48 shown in FIG. 29. As shown in FIG. 29, this continuously deformed design portion 48 is different from the continuously deformed design portion 47 in that only the vertical arrangement direction of the design pattern 38 are deformed such that the arrangement intervals D of the design units 31 contained in the sections formed along the vertical arrangement direction (auxiliary line x direction) of the design units 31 sequentially become large after sequentially becoming small continuously or non-continuously and gradually or steplessly. Specifically, in the continuously deformed design portion 48, as shown in FIG. 29, the design pattern 38 is deformed in the auxiliary line x direction and thereupon the plurality of design units 31 are arranged, such that, for example, the arrangement intervals $d_{11}$ through $d_{17}$ that continue in the auxiliary line x direction and follow the auxiliary line x direction of the design units 31 contained in the sections $D_{11}$ through $D_{17}$ respectively differ from the arrangement intervals d of the design units 31 contained in other sections adjacent to each other in the auxiliary line x direction, i.e., the arrangement intervals $d_{11}$ through $d_{17}$ in the sections $D_{11}$ through $D_{17}$ respectively become large sequentially after becoming sequentially small continuously or non-continuously and gradually or steplessly so as to be symmetric with respect to the section $D_{14}$. Specifically, the arrangement intervals $d_{11}$ through $d_{17}$ of the design units in the sections $D_{11}$ through $D_{17}$ have a relationship of "$d_{11}=d_{17}>d_{12}=d_{16}>d_{13}=d_{15}>d_{14}$." It should be noted that the auxiliary line $x_0$ through $x_5$ and $y_0$ through $y_7$ shown in FIG. 29 are not for configuring the continuously deformed design portion 48, as with the auxiliary lines shown in FIG. 27.

The continuously deformed design portion 48 was explained using the sections $D_{11}$ through $D_{17}$ as examples, but the sections continuing along the auxiliary line x direction are all deformed as described above, as shown in FIG. 29. Also, the arrangement intervals d following the auxiliary line y direction of the design units 31 contained in the sections continuing in the auxiliary line y direction are all constant throughout the sections, and may be the same as the arrangement intervals of the design pattern 38 or may be smaller or larger than the arrangement intervals.

Therefore, since the continuously deformed design portion 48 is deformed in the auxiliary line x direction only and thereupon the design units 31 are arranged, thus the continuously deformed design portion has a rectangular contour shape that is different from the contour shape of the design pattern 38, and the density of the design units 31 decreases toward the outside in the auxiliary line x direction, while the density of the design units 31 increases toward the inside. As shown in FIG. 29, in the continuously deformed design portion 48, section column $D_{61}$ through $D_{67}$ and section columns $D_{71}$ through $D_{77}$ (all not shown) that exist along the auxiliary line y-axis direction of section columns $D_{51}$ through $D_{57}$ continuing in the auxiliary line x direction are deleted, so as to have a contour shape that is substantially similar to the contour shape of the design pattern 38.

The continuously deformed design portion 48 is the same as the continuously deformed design portion 46 in that the number of sections to be formed in the design patter 38 is not limited to forty-nine, that the arrangement intervals d to be deformed can be set arbitrarily, that the design pattern 38 may be deformed in the auxiliary line X direction such that the arrangement intervals d in the sections D continuing in the auxiliary line x direction sequentially become large or small continuously or non-continuously and gradually or steplessly, or alternately become large or small continuously or non-continuously and gradually or steplessly, and that the repeating design 70B may be configured as the continuously deformed design portion 48 as a whole or may partially have one or a plurality of continuously deformed design portions 48.

As described above, in the continuously deformed design portion 47 and the continuously deformed design portion 48, only the vertical arrangement direction of the design pattern 38 is deformed such that the arrangement intervals d of the design units 31 contained in the sections formed along the vertical arrangement direction (auxiliary line x direction) of the design units 31 are in an opposite relationship to each other, thus when the repeating design 70A and the repeating design 70B have one continuously deformed design portion 47 and one continuously deformed design portion 48 respectively, the designs of the repeating design 70A and the repeating design 70B become different, but when the repeating design 70A and the repeating design 70B have a plurality of the continuously deformed design portions 47 and a plurality of the continuously deformed design portions 48 respectively, the repeating design 70A and the repeating design 70B have the same repeating design.

Figure 30:
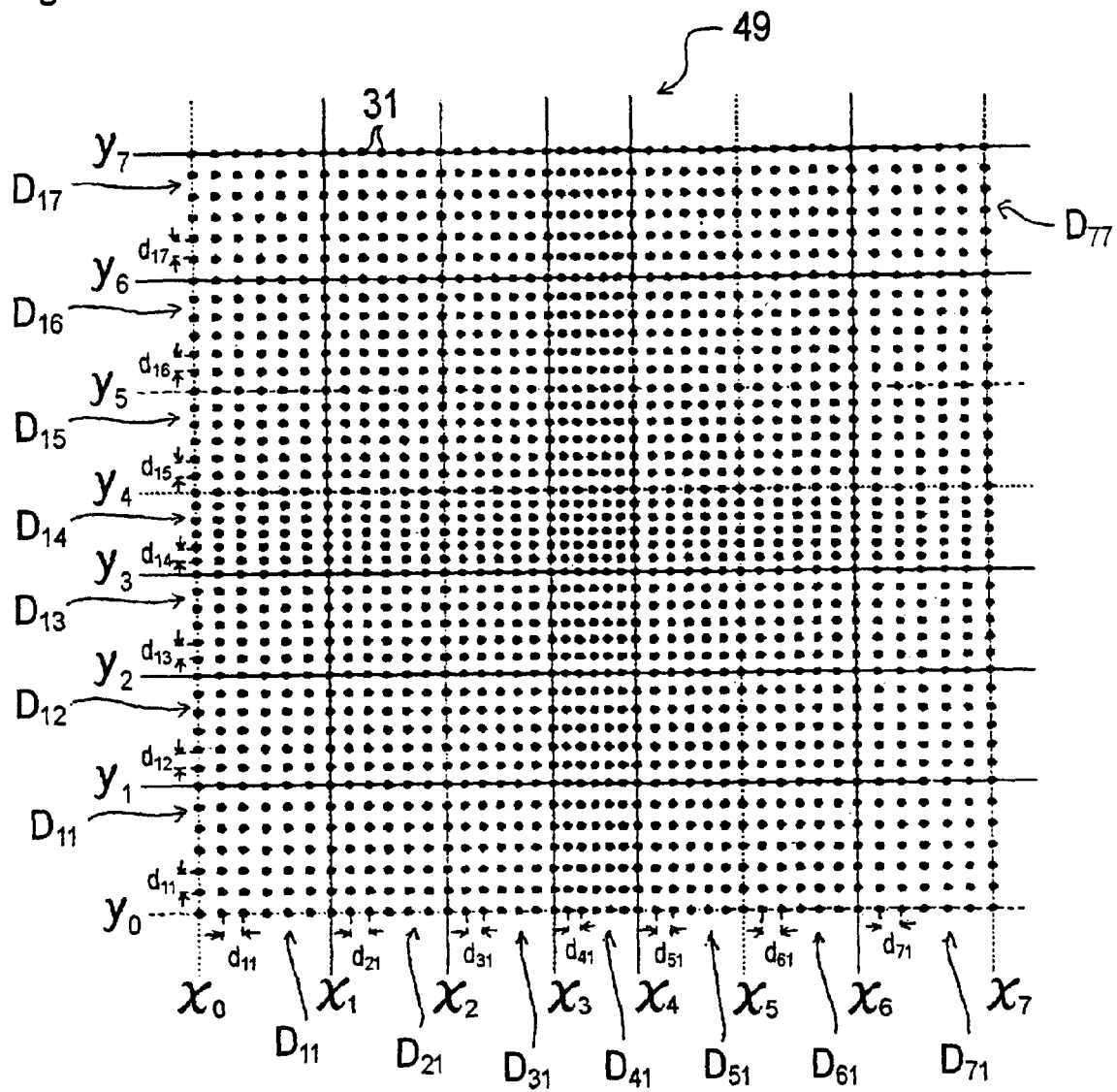
FIG. 30 is a view showing an example of the continuously deformed design portion in the stereoscopic sheet structure of the third embodiment.

As another example of the repeating design 70, there is a repeating design 70C (not shown) that has a continuously deformed design portion 49 shown in FIG. 30. As shown in FIG. 30, this continuously deformed design portion 49 is different from the continuously deformed design portion 46 in that the design pattern 38 is deformed in the auxiliary line x direction and the auxiliary line y direction and thereupon the plurality of design patterns 31 are arranged, such that the arrangement intervals d of the design units 31 of the sections continuing in the auxiliary line x direction and the auxiliary line y direction are deformed so as to become sequentially large after becoming sequentially small continuously or non-continuously and gradually or steplessly. Specifically, in the continuously deformed design portion 49, the method of deforming the design pattern 38 in the auxiliary line x direction and the auxiliary line y direction and the arrangement intervals of the design units 31 are opposite to the deformation method and the arrangement intervals of the continuously deformed design portion 46. Specifically, as shown in FIG. 30, in the continuously deformed design portion 49, the design pattern 38 is deformed in the auxiliary line y direction and thereupon the plurality of design units 31 are arranged such that, for example, the arrangement intervals $d_{11}$ through $d_{71}$ continuing in the auxiliary line y direction and following the auxiliary line y direction of the design units 31 contained respectively in the sections $D_{11}$ through $D_{71}$ sequentially become small after sequentially becoming large continuously or non-continuously and gradually or steplessly, and become symmetric with respect to the section $D_{41}$, and such that, for example, the arrangement intervals $d_{11}$ through $d_{17}$ continuing in the auxiliary line x direction and following the auxiliary line x direction of the design units 31 contained respectively in the sections $D_{11}$ through $D_{17}$ sequentially become small after sequentially becoming large continuously or non-continuously and gradually or steplessly, and become symmetric with respect to the section $D_{14}$. Therefore, the arrangement intervals $d_{11}$ through $d_{71}$ of the design units in the sections $D_{11}$ through $D_{71}$ have a relationship of "$d_{11}=d_{71}>d_{21}=d_{61}>d_{31}=d_{51}>d_{41}$," and the arrangement intervals in the auxiliary line y direction in the sections adjacent to each other in the abovementioned direction are different. Moreover, the arrangement intervals $d_{11}$ through $d_{17}$ of the design units in the sections $D_{11}$ through $D_{17}$ have a relationship of "$d_{11}=d_{17}>d_{12}=d_{16}>d_{13}=d_{15}>d_{14}$," and the arrangement intervals in the auxiliary line x direction in the sections adjacent to each other in the abovementioned direction are different. Furthermore, the arrangement intervals d in the sections formed in the continuously deformed design portion 49 have a relationship of "$d_{11}=d_{71}=d_{17}$, $d_{21}=d_{61}=d_{12}=d_{16}$, $d_{31}=d_{51}$ $d_{13}=d_{15}$, and $d_{41}=d_{14}$. It should be noted that the auxiliary lines $x_0$ through $X_7$ and $y_0$ through $y_7$ shown in FIG. 30 are not for configuring the continuously deformed design portion 49, as with the auxiliary lines shown in FIG. 27.

Therefore, since the continuously deformed design portion is deformed similarly in the auxiliary line x direction and the auxiliary line y direction and thereupon the design units are arranged similarly, thus the contour shape of the continuously deformed design portion is a regular square as with the contour shape of the design pattern 38, the density of the design units 31 decreases toward the outside of the continuously deformed design portion, while the density of the design units increases toward the inside of the continuously deformed design portion 49, the density of the design units 31 is the smallest at the sections $D_{11}$, $D_{17}$, $D_{71}$ and $D_{77}$ located at four corners, while the density of the design units 31 is the largest at the section $D_{44}$ located at the center, and the sections arranged along a diagonal line of the continuously deformed design portion 49 have a similar shape.

The continuously deformed design portion 49 is the same as the continuously deformed design portion 46 in that the number of sections to be formed in the design patter 38 is not limited to forty-nine, that the arrangement intervals d to be deformed can be set arbitrarily, that the design pattern 38 may be deformed such that the arrangement intervals d in each section D varies, in a different rate in the auxiliary line x direction and the auxiliary line y direction, that the design pattern 38 may be deformed in the auxiliary line x direction and the auxiliary line y direction such that the arrangement intervals d in the sections continuing in the auxiliary line x direction and the auxiliary line y direction sequentially become large or small continuously or non-continuously and gradually or steplessly, or alternately become large or small continuously or non-continuously and gradually or steplessly, and that the repeating design 70C may be configured as the continuously deformed design portion 49 as a whole or may partially have one or a plurality of continuously deformed design portions 49.

As described above, in the continuously deformed design portion 46 and the continuously deformed design portion 49, the vertical and horizontal arrangement directions of the design pattern 38 are deformed such that the arrangement intervals d of the design units 31 contained in the sections formed along the vertical and horizontal arrangement directions (auxiliary line x direction and auxiliary line y direction) of the design units 31 are in an opposite relationship to each other, thus when the repeating design 70 and the repeating design 70C have one continuously deformed design portion 46 and one continuously deformed design portion 49 respectively, the designs of the repeating design 70 and the repeating design 70C become different, but when the repeating design 70 and the repeating design 70C have a plurality of the continuously deformed design portions 46 and a plurality of the continuously deformed design portions 49 respectively, the repeating design 70 and the repeating design 70C have the same repeating design.

In the design pattern 38 of any of the continuously deformed design portions 46 through 49, there are formed a plurality of sections that are obtained by division at regular intervals in each arrangement direction of the design units 31 configuring the design pattern 38 and have the equal number of design units 31, but the sections to be formed in the design pattern 38 may not necessarily be obtained by division in each arrangement direction of the design units 31 at regular intervals, thus the sections to be formed in the design pattern may be obtained by division, for example, randomly in each arrangement direction, may have different intervals in each arrangement direction, and may be obtained by division at regular intervals or randomly.

Furthermore, the design pattern 38 have the design units 31 of the same shape, but the design pattern may have a plurality of design units 31 having different shapes.

It should be noted that in the design pattern 38 of any of the continuously deformed design portions 46 through 49, there are formed a plurality of sections that are obtained by division at regular intervals in each arrangement direction of the design units 31 configuring the design pattern 38 and have the equal number of design units 31, wherein the design pattern is deformed such that the sections that are formed along at least one of the arrangement directions have a plurality of design units that are arranged in the abovementioned one direction at arrangement intervals different from the arrangement intervals following the abovementioned one direction of the design units contained in other sections adjacent to these sections in the abovementioned direction. Here, the auxiliary lines for forming the abovementioned sections can be auxiliary lines that extend, for example, in two directions that are perpendicular to each other, and the arrangement intervals of the design units 31 correspond to, for example, the length of the formed sections as shown in FIG. 26 through 30 (the distance between two auxiliary lines that extend in the same direction forming the sections). Therefore, in any of the continuously deformed design portions 46 through 49, the design pattern 38 is deformed such that a plurality of sections D, which are obtained by division at regular intervals in two directions perpendicular to each other and which have the equal number of design units 31, are formed in the design pattern that has a plurality of design units 31 arranged at the arrangement intervals d different from the arrangement intervals L of the convex lenses 21 of the convex lens assembly 20, wherein a section D that is formed along at least one of the two directions perpendicular to each other has a section length that is different from the section length of the abovementioned one direction in at least one section that is adjacent to this section D in the abovementioned at least one direction. "Two directions perpendicular to each other" are described as follows.

Figure 31:
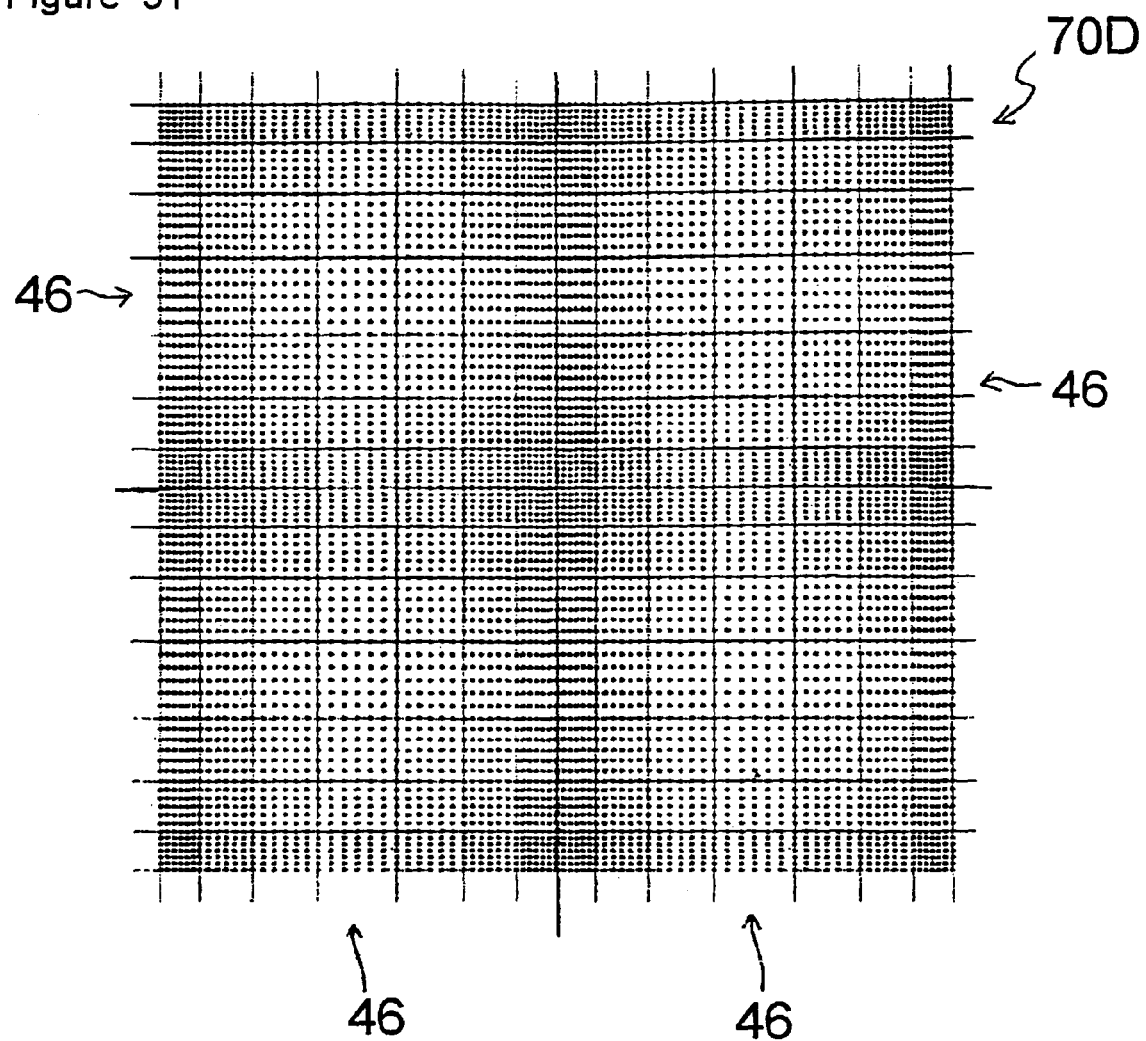
FIG. 31 is a view showing an example of the continuously deformed design portion in the stereoscopic sheet structure of the third embodiment.

As another example of the repeating design 70, there is a repeating design 70D (not shown) that has a plurality of the continuously deformed design portion 46 shown in FIG. 31. FIG. 31 shows a part of the repeating design 70D. The repeating design 70D has a plurality of the continuously deformed design portions 46 that are continuously arranged in a vertical direction and a horizontal direction.

Although the repeating design 70D has only the same continuously deformed design portions 46 in plurality, the repeating design may be configured such that different continuously deformed design portions, e.g., at least two types of continuously deformed design portions that are selected from the group of continuously deformed design portions 46 through 49, are arranged in a predetermined pattern or randomly.

Another aspect of the repeating design 70 of the stereoscopic sheet structure 5 has a continuously deformed design portion in which a design pattern is deformed, such that a plurality of sections D, which are obtained by division at regular intervals in two directions perpendicular to each other and have the equal number of design units 31, are formed in the design pattern that has the plurality of design units 31 arranged in arrangement intervals d different from the arrangement intervals L of the convex lenses 21 of the convex lens assembly 20, wherein a section D that is formed along at least one of the two directions perpendicular to other has a section length that is different from the section length of the abovementioned one direction of at least one section adjacent to this section D in the abovementioned at least one direction. Here, "two directions perpendicular to each other" described above indicate a straight line that extends in direction passing through one certain design pattern 31 and another design pattern 31 existing around this design pattern 31 (regardless of the distance between the abovementioned one certain design pattern 31 and the abovementioned another design pattern 31), and a straight line that is perpendicular to this straight line.

Figure 32:
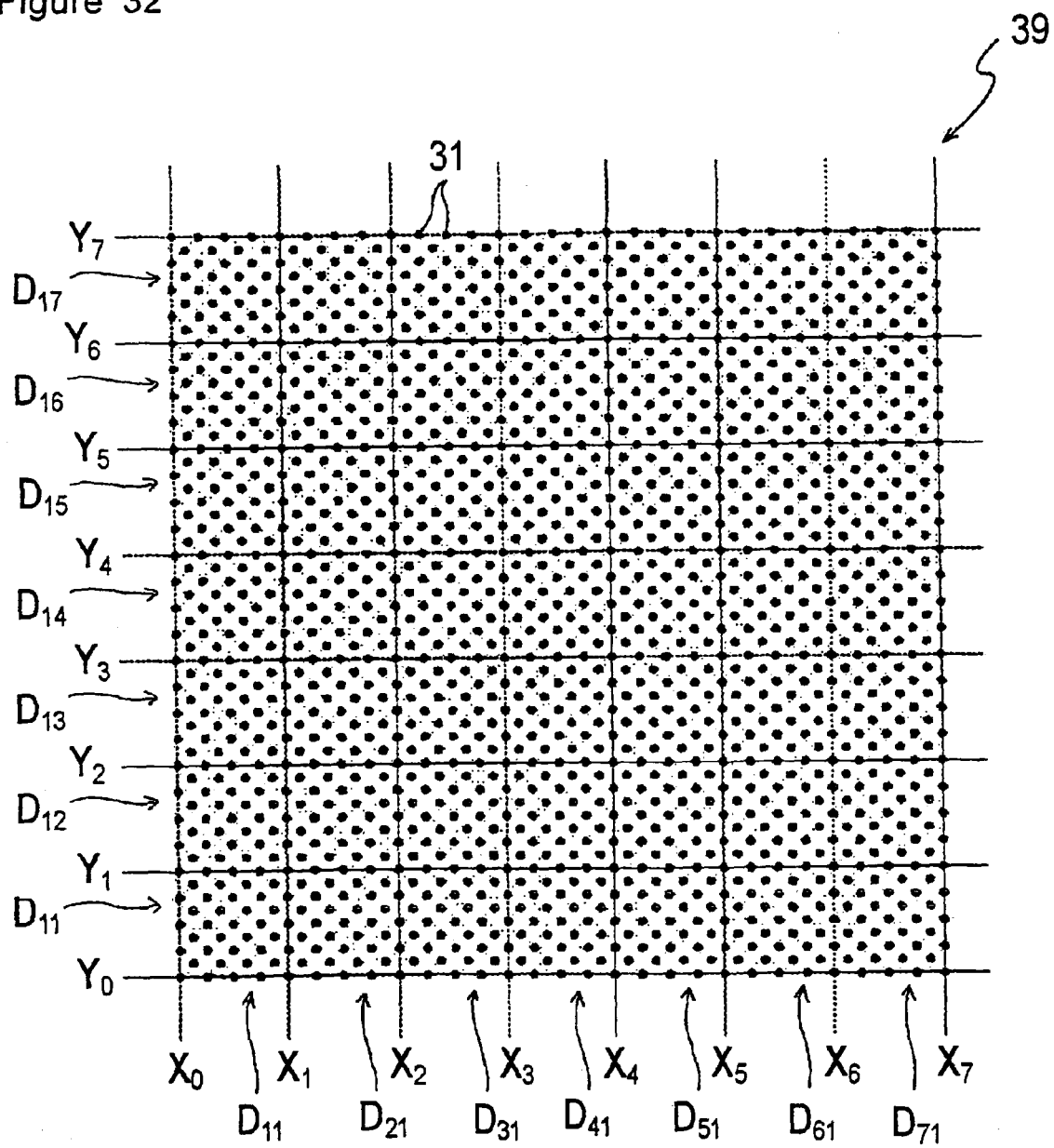
FIG. 32 is a view showing an example of patterns that can be adopted as design patterns.

Another aspect of the repeating design 70, specifically, has a continuously deformed design portion in which the design units 31 are arranged such that the plurality of design units 31 (A) are arranged at the arrangement intervals d different from the arrangement intervals L of the convex lenses 21 of the convex lens assembly 20, and (B) in the sections that are obtained by division into a plurality of pieces in at least one of the two directions perpendicular to each other, i.e., the vertical direction and the horizontal direction in FIG. 32, and that have the equal number of design units 31, the section length in the abovementioned at least one direction in one section is different from the section length in the abovementioned at least one direction in at least one section that is adjacent to this section in the abovementioned one direction. An example of another aspect of the repeating design 70 of the stereoscopic sheet structure 5 is described with reference to FIG. 32 through FIG. 37.

Figure 33:
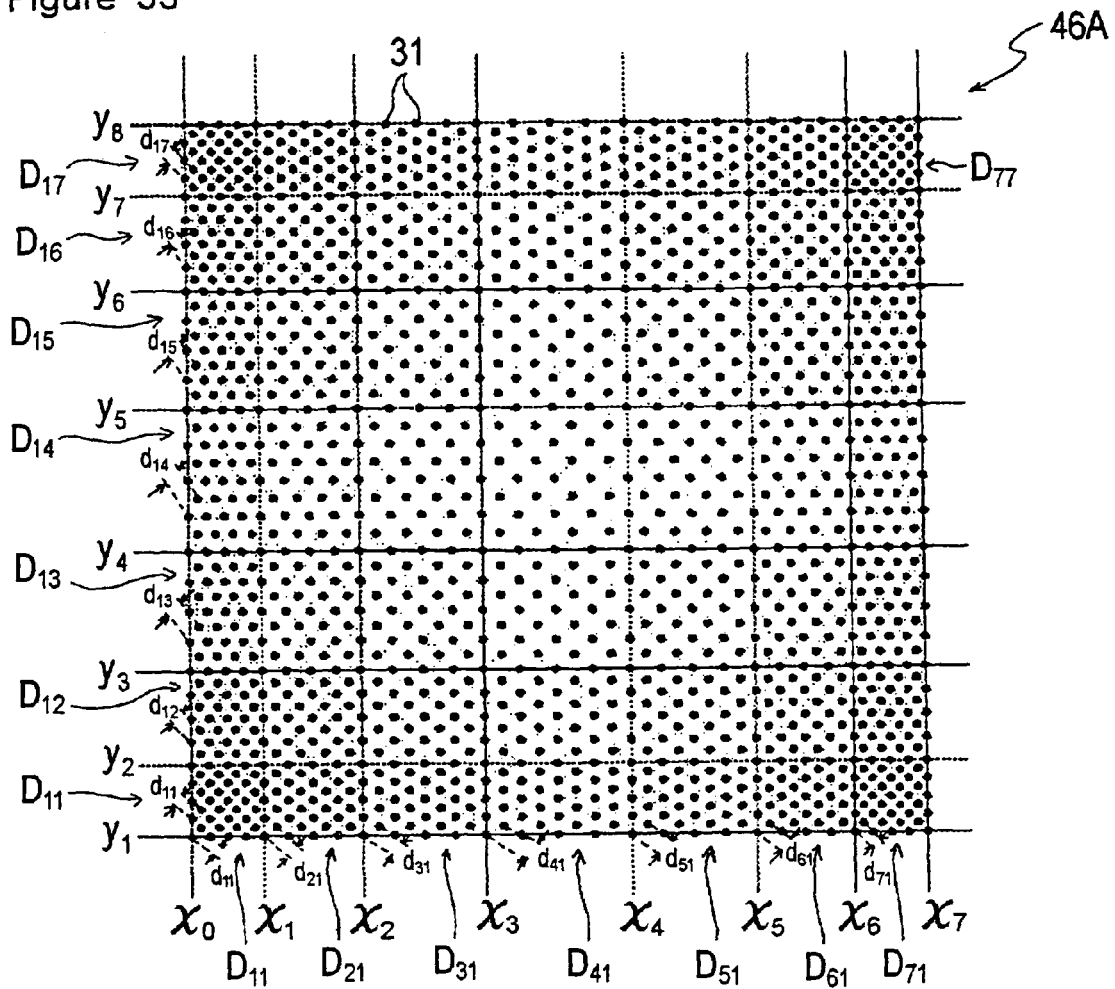
FIG. 33 is a view showing an example of the continuously deformed design portion in the stereoscopic sheet structure of the third embodiment.

As an example of another aspect of the repeating design 70 of the stereoscopic sheet structure 5 according to the third embodiment, there is a repeating design 70E (not shown) that has a continuously deformed design portion 46A shown in FIG. 33. As shown in FIG. 33, in this continuously deformed design portion 46A, a design pattern 39 is deformed such that a plurality of sections D, which are obtained by division in the form of a grid at regular intervals in two directions perpendicular to each other and have the equal number of design units 31, are formed in the design pattern in which the plurality of circular design units 31 are arranged at arrangement intervals d different from the arrangement intervals L of the convex lenses 21 of the convex lens assembly 20, and a section D that is formed along at least one of the two directions perpendicular to each other has a section length that is different from the section length of the abovementioned one direction in other section adjacent to this section D in the abovementioned at least one direction. Specifically, in the continuously deformed design portion 46A, the design pattern 39 in which the design units 31 are arranged in an arrangement pattern similar to the arrangement of the convex lens assembly 20 is deformed as described above as shown in FIG. 33.

As with the design pattern 38, in the design pattern 39 the plurality of circular design units 31 are arranged in an arrangement pattern that is similar to the arrangement of the convex lens assembly 20, that is, in an arrangement pattern at intervals different from the arrangement intervals L of the convex lens assembly 20, as shown in FIG. 32. More specifically, in another aspect of the repeating design 70, since the convex lens assembly 20 (lens forming sections 22) is formed according to the square-shaped arrangement rotated by 45 degrees as shown in FIG. 4, the design pattern 39 is formed according to the square-shaped arrangement in which the plurality of circular design units 31 are rotated by 45 degrees, as shown in FIG. 32. Specifically, the design pattern 39 is same as the design pattern 38, except that the design pattern 38 in which the design units 31 are arranged in the form of a square as shown in FIG. 26 is rotated by 45 degrees. It should be noted that the auxiliary lines $X_0$ through $X_7$ and $Y_0$ through $Y_7$ shown in FIG. 32 are not auxiliary lines for configuring the design pattern 39, but explanatory auxiliary lines for explaining the state for changing the design pattern 39.

In the design pattern 39, there are formed a plurality of grid-like sections that are obtained by division at regular intervals in two directions, i.e., a vertical direction (direction in which the auxiliary lines X extend) and a horizontal direction (a direction in which the auxiliary lines Y extend) in FIG. 32, and have the equal number of design units 31, the two directions being perpendicular to each other at an angle of 45 degrees with respect to the arrangement direction of the design units 31. The grid-like sections formed in the design pattern 39 are obtained by division into seven sections vertically and horizontally by the auxiliary lines $X_0$ through $X_7$ and $Y_0$ through $Y_7$ that are drawn at regular intervals in the vertical direction and the horizontal direction of the design pattern 39, and each of the sections has forty-nine design units 31.

The continuously deformed design portion 46A is configured by deforming the design pattern 39 having forty-nine sections formed therein, as described above. In other words, in the continuously deformed design portion 46A, the design units 31 are arranged such that the plurality of design units 31 (A) are arranged at the arrangement intervals d different from the arrangement intervals L of the convex lenses 21 of the convex lens assembly 20, and (B) in the sections that are obtained by division into a plurality of pieces in the form of a grid in the auxiliary line X direction and the auxiliary line Y direction perpendicular to each other and that have the equal number of design units 31, the section length in the auxiliary line X direction and the auxiliary line Y direction in one section is different from the section length in the auxiliary line X direction and the auxiliary line Y direction in a section that is adjacent to this section in the auxiliary line X direction and the auxiliary line Y direction.

Specifically, as shown in FIG. 33, in the continuously deformed design portion 46A the design pattern 39 is deformed in an auxiliary line y direction, such that, for example, the section length of each of the sections $D_{11}$ through $D_{71}$ (distance between two auxiliary lines extending in the same direction for forming these sections) continuing in the auxiliary line y direction (horizontal direction of the continuously deformed design portion 46A in FIG. 33) differs from the section length of other section that is adjacent in the auxiliary line y direction, that is, the section length in the sections $D_{11}$ through $D_{71}$ sequentially becomes small after sequentially becoming large continuously or non-continuously and gradually or steplessly and becomes symmetric with respect to the section $D_{41}$. As a result, each arrangement interval in each arrangement direction in the sections $D_{11}$ through $D_{71}$ sequentially becomes small after sequentially becoming large continuously or non-continuously and gradually or steplessly and becomes symmetric with respect to $d_{41}$, and further the angle that is formed by two arrangement directions in the sections $D_{11}$ through $D_{71}$ changes, in accordance with the section length deformed as described above, whereby the plurality of design units 31 are arranged. It should be noted that the auxiliary lines $x_0$ through $x_7$ and $y_0$ through $y_7$ shown in FIG. 33 are not auxiliary lines for configuring the continuously deformed design portion 46A but are explanatory auxiliary lines for explaining the state for deforming the sections in accordance with the auxiliary lines $X_0$ through $X_7$ and $Y_0$ through $Y_7$ of the design pattern 39.

Furthermore, in the continuously deformed design portion 46A, the design pattern 39 is deformed in the auxiliary line y direction, such that, for example, the section length of each of the sections $D_{11}$ through $D_{17}$ continuing along the auxiliary line x direction (vertical direction of the continuously deformed design portion 46A in FIG. 33) changes at the same rate as the sections $D_{11}$ through $D_{71}$ continuing in the auxiliary line y direction, i.e., the section length in the sections $D_{11}$ through $D_{71}$ sequentially becomes small after sequentially becoming large continuously or non-continuously and gradually or steplessly and becomes symmetric with respect to the section $D_{14}$. As a result, each arrangement interval in each arrangement direction in the sections $D_{11}$ through $D_{17}$ sequentially becomes small after sequentially becoming large continuously or non-continuously and gradually or steplessly and becomes symmetric with respect to $d_{14}$, and further the angle that is formed by two arrangement directions in the sections $D_{11}$ through $D_{17}$ changes, in accordance with the section length deformed as described above, whereby the plurality of design units 31 are arranged.

The continuously deformed design portion 46A was explained using the sections $D_{11}$ through $D_{71}$ and $D_{11}$ through $D_{17}$ as examples, but the sections continuing along the auxiliary line y direction and the sections continuing along the auxiliary line x direction are all deformed as with the sections $D_{11}$ through $D_{71}$ and $D_{11}$ through $D_{17}$ as shown in FIG. 33, and the design units 31 are arranged similarly.

Therefore, since the continuously deformed design portion 46A is deformed similarly in the auxiliary line x direction and the auxiliary line y direction and thereupon the design units 31 are arranged similarly, thus the contour shape of the continuously deformed design portion is a regular square as with the contour shape of the design pattern 39, the density of the design units 31 increases toward the outside of the continuously deformed design portion, while the density of the design units 31 decreases toward the inside of the continuously deformed design portion, the density of the design units 31 is the largest at the sections $D_{11}$, $D_{17}$, $D_{71}$ and $D_{77}$ located at four corners, while the density of the design units 31 is the smallest at the section $D_{44}$ located at the center, and the sections arranged along a diagonal line of the continuously deformed design portion 46A have a similar shape.

Examples of the continuously deformed design portion 46A are described in FIG. 32 and FIG. 33, but the size of the section length can be arbitrarily set when continuously or non-continuously changing the section length gradually or steplessly.

Moreover, in the continuously deformed design portion 46A, forty-nine sections that are obtained by dividing the design units 31 into seven sections in the vertical direction and the horizontal direction at regular intervals are formed in the design pattern 39, and the design pattern 39 is deformed as described above, but the number of sections to be formed in the design pattern 39 is not limited to forty-nine, and thus can be set to any number.

Moreover, in the continuously deformed design portion 46A shown in FIG. 32 and FIG. 33, the design pattern 39 is deformed in the auxiliary line x direction and the auxiliary line y direction so that the section length in the sections D varies, at the same rate as the auxiliary line x direction and the auxiliary line y direction, whereby the plurality of design units 31 are arranged, but the design pattern 39 may be deformed in the auxiliary line x direction and the auxiliary line y direction so that the section length in the sections D varies, in a different rate in the auxiliary line x direction and the auxiliary line y direction, whereby the plurality of design units 31 may be arranged.

In addition, in the continuously deformed design portion 46A shown in FIG. 32 and FIG. 33, the design pattern 39 is deformed in the auxiliary line x direction and the auxiliary line y direction and thereby the plurality of design units 31 are arranged such that the section length in each section D sequentially decreases after sequentially increasing continuously or non-continuously and gradually or steplessly and such that the design units become symmetric with respect to the section $D_{14}$ and the section $D_{41}$, but the method of deformation and arrangement is not limited to such method of formation and arrangement, thus, for example, the design pattern 39 may be deformed in the auxiliary line x direction and the auxiliary line y direction and thereby the plurality of design units 31 may be arranged, such that the section length in the sections continuing in the auxiliary line x direction and the auxiliary line y direction sequentially becomes large or small continuously or non-continuously and gradually or steplessly or alternately becomes large or small continuously or non-continuously and gradually or steplessly.

It should be noted that the repeating design 70E may be configured as the continuously deformed design portion 46A as a whole or may partially have one or a plurality of continuously deformed design portions 46A.

Figure 34:
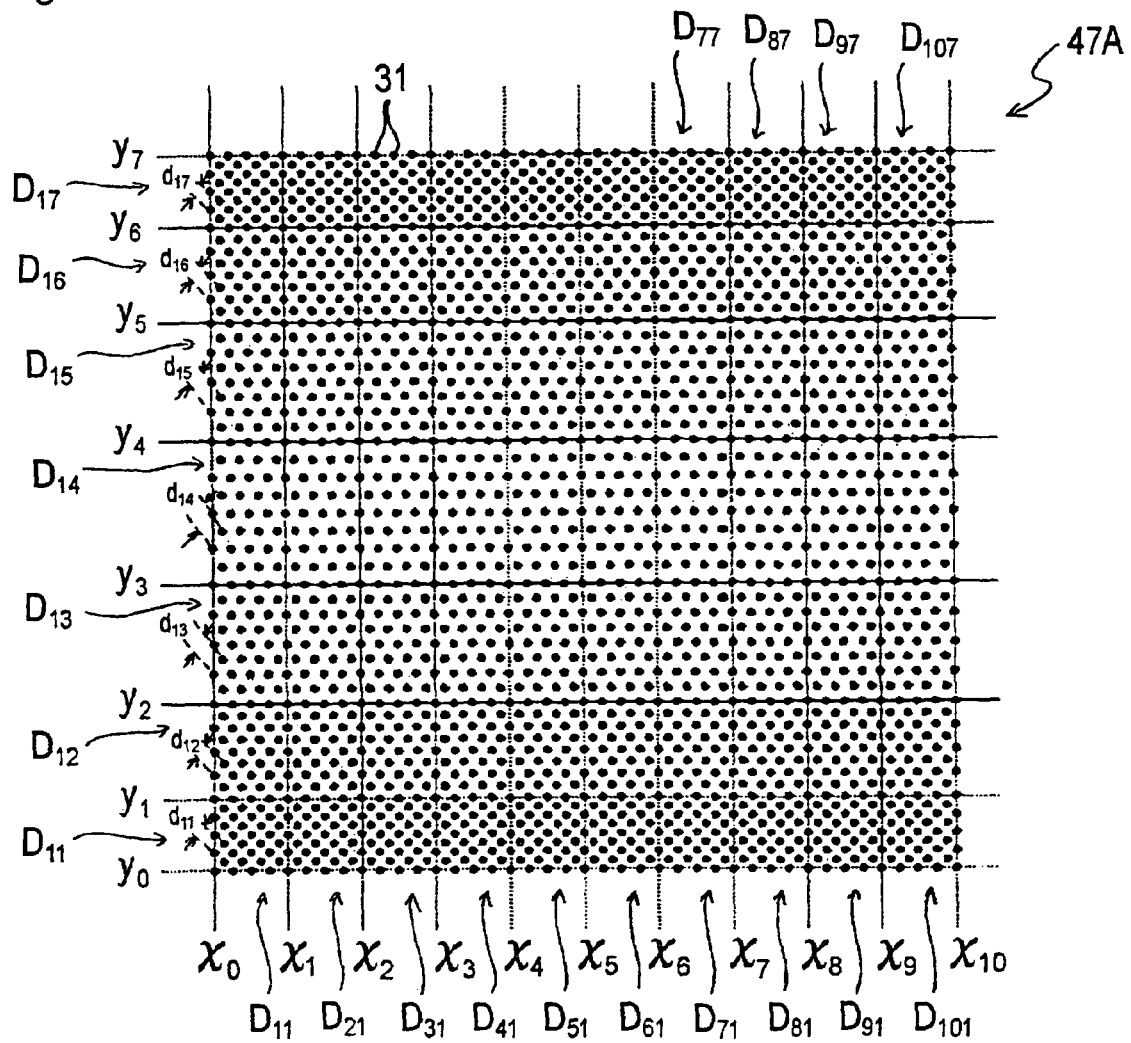
FIG. 34 is a view showing an example of the continuously deformed design portion in the stereoscopic-sheet structure of the third embodiment.

As another example of the repeating design 70 of the stereoscopic sheet structure 5 according to the third embodiment, there is a repeating design 70F (not shown) that has a continuously deformed design portion 47A shown in FIG. 34. As shown in FIG. 34, in this continuously deformed design portion 47A, the design pattern 39 is deformed such that a plurality of sections D, which are obtained by division in the form of a grid at regular intervals in two directions perpendicular to each other and have the equal number of design units 31, are formed in the design pattern in which the plurality of circular design units 31 are arranged at arrangement intervals d different from the arrangement intervals L of the convex lenses 21 of the convex lens assembly 20, and a section D that is formed along the vertical direction has a section length that is different from the section length of the vertical direction in other section adjacent to this section D in the vertical direction. Specifically, the continuously deformed design portion 46A is different from the continuously deformed design portion 47A in which the vertical and horizontal arrangement directions of the design units 31 are deformed, in that only the vertical arrangement direction of the design pattern 39 is deformed.

The continuously deformed design portion 47A is configured by deforming the design pattern 39 having forty-nine sections formed therein, as described above. In other words, in the continuously deformed design portion 47A, the design units 31 are arranged such that the plurality of design units 31 (A) are arranged at the arrangement intervals d different from the arrangement intervals L of the convex lenses 21 of the convex lens assembly 20, and (B) in the sections that are obtained by division into a plurality of pieces in the form of a grid in the auxiliary line X direction and the auxiliary line Y direction and that have the equal number of design units 31, the section length in the auxiliary line X direction in one section is different from the section length in the auxiliary line X direction in a section that is adjacent to this section in the auxiliary line X direction.

Specifically, as shown in FIG. 34, in the continuously deformed design portion 47A the design pattern 39 is deformed in the auxiliary line X direction, such that, as with the sections $D_{11}$ through $D_{17}$ continuing along the auxiliary line x direction in the continuously deformed design portion 46A, for example, the section length in the sections $D_{11}$ through $D_{17}$ continuing along the auxiliary line x direction (vertical direction of the continuously deformed design portion 47A in FIG. 34) sequentially becomes small after sequentially becoming large continuously or non-continuously and gradually or steplessly and becomes symmetric with respect to the section $D_{14}$. As a result, each arrangement interval in each arrangement direction in the sections $D_{11}$ through $D_{17}$ sequentially becomes small after sequentially becoming large continuously or non-continuously and gradually or steplessly and becomes symmetric with respect to $d_{14}$, and further the angle that is formed by two arrangement directions in the sections $D_{11}$ through $D_{17}$ changes, in accordance with the section length deformed as described above, whereby the plurality of design units 31 are arranged.

The continuously deformed design portion 47A was explained using the sections $D_{11}$ through $D_{17}$ as examples, but the sections continuing along the auxiliary line x direction are all deformed as described above, as shown in FIG. 34. Also, the section length following the auxiliary line y direction of the design units 31 contained in the sections continuing in the auxiliary line y direction is constant throughout the sections, and may be the same as the arrangement intervals of the design pattern 39 or may be smaller or larger than the arrangement intervals.

Therefore, since the continuously deformed design portion 47A is deformed in the auxiliary line x direction only and thereupon the design units 31 are arranged, thus the continuously deformed design portion has a rectangular contour shape that is different from the contour shape of the design pattern 39, and the density of the design units 31 increases toward the outside in the auxiliary line x direction, while the density of the design units 31 decreases toward the inside. As shown in FIG. 34, in the continuously deformed design portion 47A, section columns $D_{81}$ through $D_{87}$, section columns $D_{91}$ through $D_{97}$ and section columns $D_{81}$ through $D_{87}$ are formed along an auxiliary line y-axis direction of section columns $D_{71}$ through $D_{77}$ continuing in the auxiliary line x direction, so as to have a contour shape that is substantially similar to the contour shape of the design pattern 39.

The continuously deformed design portion 47A is the same as the continuously deformed design portion 46A in that the number of sections to be formed in the design patter 39 is not limited to forty-nine, that the length of sections to be deformed can be set arbitrarily, that the design pattern 39 may be deformed in the auxiliary line x direction such that the section length in the sections continuing in the auxiliary line x direction sequentially becomes large or small continuously or non-continuously and gradually or steplessly, or alternately becomes large or small continuously or non-continuously and gradually or steplessly, and that the repeating design 70F may be configured as the continuously deformed design portion 46A as a whole or may partially have one or a plurality of continuously deformed design portions 47A.

Figure 35:
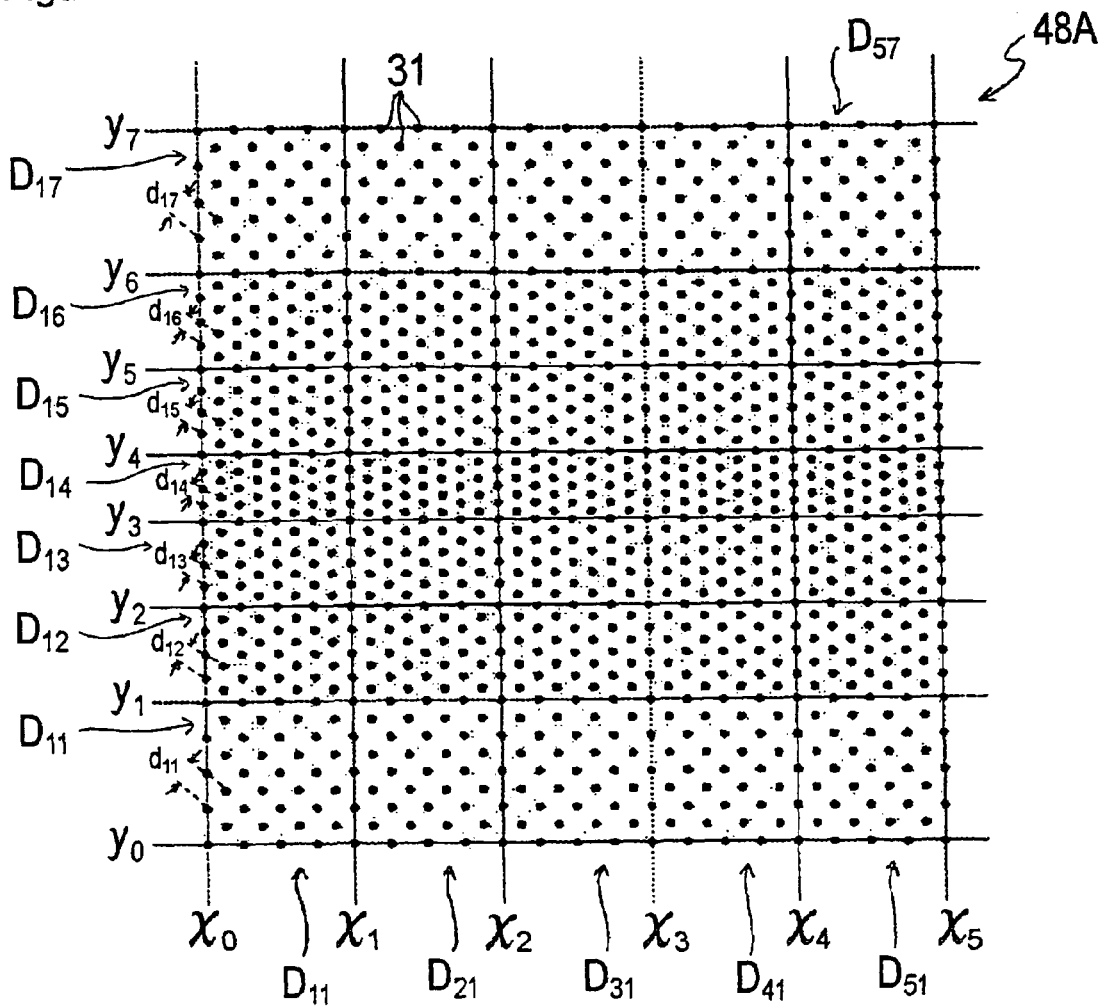
FIG. 35 is a view showing an example of the continuously deformed design portion in the stereoscopic sheet structure of the third embodiment.

As an example of another aspect of the repeating design 70 of the stereoscopic sheet structure 5 according to the third embodiment, there is a repeating design 70G (not shown) that has a continuously deformed design portion 48A shown in FIG. 35. The continuously deformed design portion 48A has a pattern opposite to that of the continuously deformed design portion 47A, that is, the continuously deformed design portion is different from the continuously deformed design portion 47A in that only the vertical arrangement direction of the design pattern 39 is deformed such that the section length of the sections formed along the vertical direction sequentially becomes large after sequentially becoming small continuously or non-continuously and gradually or steplessly. As a result, each arrangement interval in each arrangement direction in the sections $D_{11}$ through $D_{17}$ sequentially becomes small after sequentially becoming large continuously or non-continuously and gradually or steplessly and becomes symmetric with respect to $d_{14}$, and further the angle that is formed by two arrangement directions in the sections $D_{11}$ through $D_{17}$ changes, in accordance with the section length deformed as described above, whereby the plurality of design units 31 are arranged.

The continuously deformed design portion 48A was explained using the sections $D_{11}$ through $D_{17}$ as examples, but the sections continuing along the auxiliary line x direction are all deformed as described above, as shown in FIG. 35. Also, the arrangement intervals d following the auxiliary line y direction of the design units 31 contained in the sections continuing in the auxiliary line y direction are all constant throughout the sections, and may be the same as the arrangement intervals of the design pattern 39 or may be smaller or larger than the arrangement intervals.

Therefore, since the continuously deformed design portion 48A is deformed in the auxiliary line x direction only and thereupon the design units 31 are arranged, thus the continuously deformed design portion has a rectangular contour shape that is different from the contour shape of the design pattern 39, and the density of the design units 31 decreases toward the outside in the auxiliary line x direction, while the density of the design units 31 increases toward the inside. As shown in FIG. 35, in the continuously deformed design portion 48A, section column $D_{61}$ through $D_{67}$ and section columns $D_{71}$ through $D_{77}$ (all not shown) that exist along the auxiliary line y-axis direction of section columns $D_{51}$ through $D_{57}$ continuing in the auxiliary line x direction are deleted, so as to have a contour shape that is substantially similar to the contour shape of the design pattern 39.

The continuously deformed design portion 48A is the same as the continuously deformed design portion 47A in that the number of sections to be formed in the design patter 39 is not limited to forty-nine, that the length of sections to be deformed can be set arbitrarily, that the design pattern 39 may be deformed in the auxiliary line x direction such that the section length in the sections continuing in the auxiliary line x direction sequentially becomes large or small continuously or non-continuously and gradually or steplessly, or alternately becomes large or small continuously or non-continuously and gradually or steplessly, and that the repeating design 70G may be configured as the continuously deformed design portion 48A as a whole or may partially have one or a plurality of continuously deformed design portions 48A.

As described above, in the continuously deformed design portion 47A and the continuously deformed design portion 48A, the design pattern 39 is deformed such that the section lengths of the sections formed along the vertical direction are in an opposite relationship to each other, thus when the repeating design 70F and the repeating design 70G have one continuously deformed design portion 47A and one continuously deformed design portion 48A respectively, the designs of the repeating design 70F and the repeating design 70G become different, but when the repeating design 70F and the repeating design 70G have a plurality of the continuously deformed design portions 47A and one continuously deformed design portions 48A respectively, the repeating design 70F and the repeating design 70G have the same repeating design.

Figure 36:
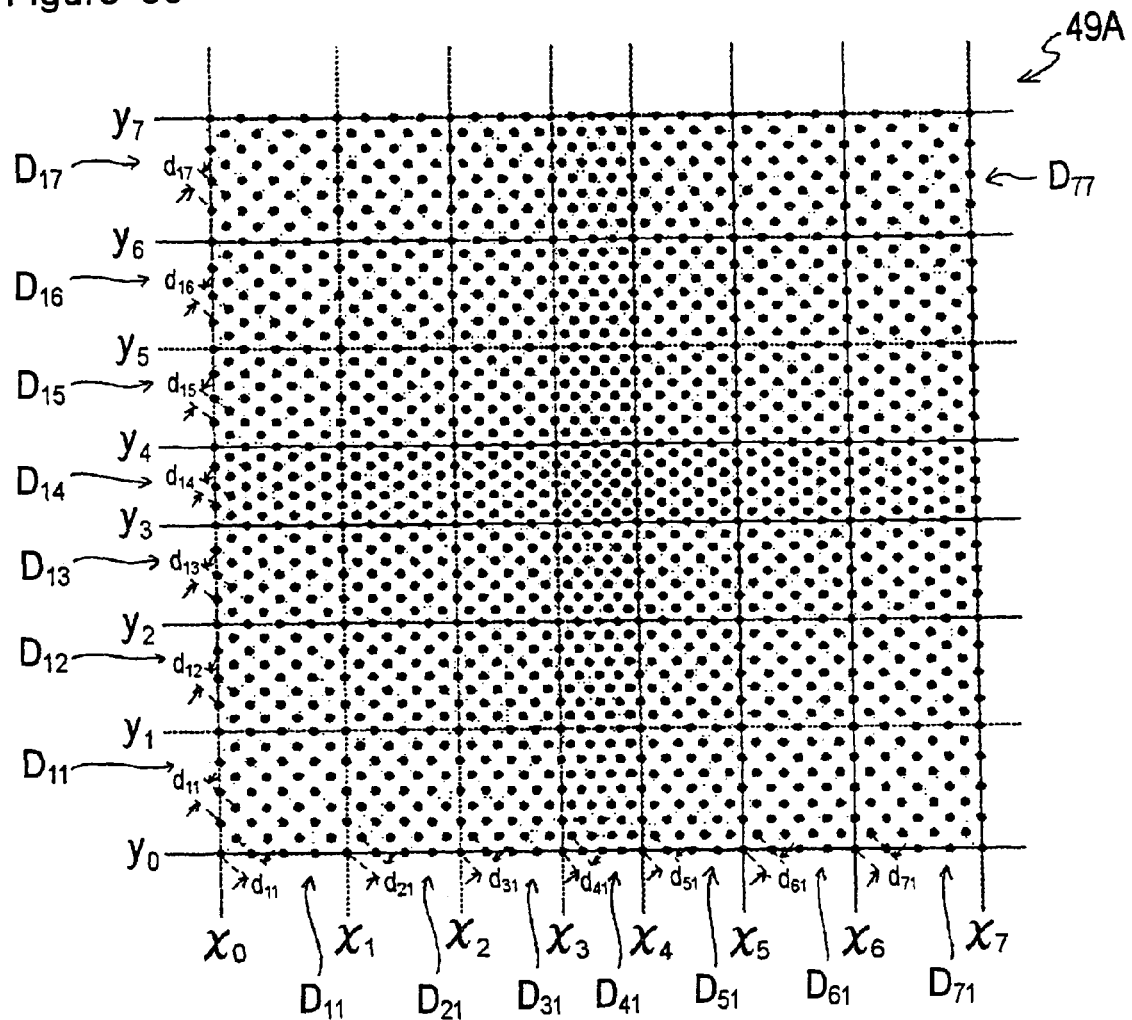
FIG. 36 is a view showing an example of the continuously deformed design portion in the stereoscopic sheet structure of the third embodiment.

As an example of another aspect of the repeating design 70 of the stereoscopic sheet structure 5 according to the third embodiment, there is a repeating design 70H (not shown) that has a continuously deformed design portion 49A shown in FIG. 36. This continuously deformed design portion 49A is different from the continuously deformed design portion 46A in that the design pattern 39 is deformed such that, as shown in FIG. 36, the section length in the sections D formed along at least one of two directions perpendicular to each other sequentially becomes larger after sequentially becoming small continuously or non-continuously and gradually or steplessly. Specifically, as shown in FIG. 36, in the continuously deformed design portion 49A the method of deforming the design pattern 39 in the auxiliary line x direction and the auxiliary line y direction is opposite to the deformation method of the continuously deformed design portion 46A. As a result, each arrangement interval d in each arrangement direction in the sections $D_{11}$ through $D_{71}$ and in the sections $D_{11}$ through $D_{17}$ sequentially becomes large after sequentially becoming small continuously or non-continuously and gradually or steplessly and becomes symmetric with respect to $d_{41}$ and $d_{14}$, and further the angle that is formed by two arrangement directions in the sections $D_{11}$ through $D_{71}$ and in the sections $D_{11}$ through $D_{17}$ changes, in accordance with the section length deformed as described above, whereby the plurality of design units 31 are arranged.

The continuously deformed design portion 49A was explained using the sections $D_{11}$ through $D_{71}$ and the sections $D_{11}$ through $D_{17}$ as examples, but the sections continuing along the auxiliary line y direction and the sections continuing along the auxiliary line x direction are all deformed as with the sections $D_{11}$ through $D_{71}$ and the sections $D_{11}$ through $D_{17}$, as shown in FIG. 36, whereby the design units 31 are similarly arranged.

Therefore, since the continuously deformed design portion 49A is deformed similarly in the auxiliary line x direction and the auxiliary line y direction and thereupon the design units 31 are arranged similarly, thus the contour shape of the continuously deformed design portion is a regular square as with the contour shape of the design pattern 39, the density of the design units 31 decreases toward the outside of the continuously deformed design portion, while the density of the design units 31 increases toward the inside of the continuously deformed design portion, the density of the design units 31 is the smallest at the sections $D_{11}$, $D_{17}$, $D_{71}$ and $D_{77}$ located at four corners, while the density of the design units 31 is the largest at the section $D_{44}$ located at the center, and the sections arranged along a diagonal line of the continuously deformed design portion 49A have a similar shape.

The continuously deformed design portion 49A is the same as the continuously deformed design portion 46A in that the number of sections to be formed in the design patter 39 is not limited to forty-nine, that the length of sections to be deformed can be set arbitrarily, that the section length in each section D may be deformed in a different rate in the auxiliary line x direction and the auxiliary line y direction, that the design pattern 39 may be deformed in the auxiliary line x direction such that the section length in each section D sequentially becomes large or small continuously or non-continuously and gradually or steplessly, or alternately becomes large or small continuously or non-continuously and gradually or steplessly, and that the repeating design 70H may be configured as the continuously deformed design portion 49A as a whole or may partially have one or a plurality of continuously deformed design portions 49A.

As described above, in the continuously deformed design portion 46A and the continuously deformed design portion 49A, the design pattern 39 is deformed such that the section lengths of the sections formed along the two directions perpendicular to each other are in an opposite relationship to each other, thus when the repeating design 70E and the repeating design 70H have one continuously deformed design portion 46A and one continuously deformed design portion 49A respectively, the designs of the repeating design 70E and the repeating design 70H become different, but when the repeating design 70E and the repeating design 70H have a plurality of the continuously deformed design portions 46A and one continuously deformed design portions 49A respectively, the repeating design 70E and the repeating design 70H have the same repeating design.

In the design pattern 39 of any of the continuously deformed design portions 46A through 53, there are formed a plurality of sections that are obtained by division at regular intervals in two directions perpendicular to each other and have the equal number of design units 31, but the sections to be formed in the design pattern 39 may not necessarily be obtained by division at regular intervals in two directions perpendicular to each other, thus the sections to be formed in the design pattern may be obtained by division, for example, randomly in two directions forming a predetermined angle, may have different intervals in the two directions forming the predetermined angle, and may be obtained by division at regular intervals or randomly.

Furthermore, the design pattern 39 have the design units 31 of the same shape, but the design pattern may have a plurality of design units 31 having different shapes.

Figure 37:
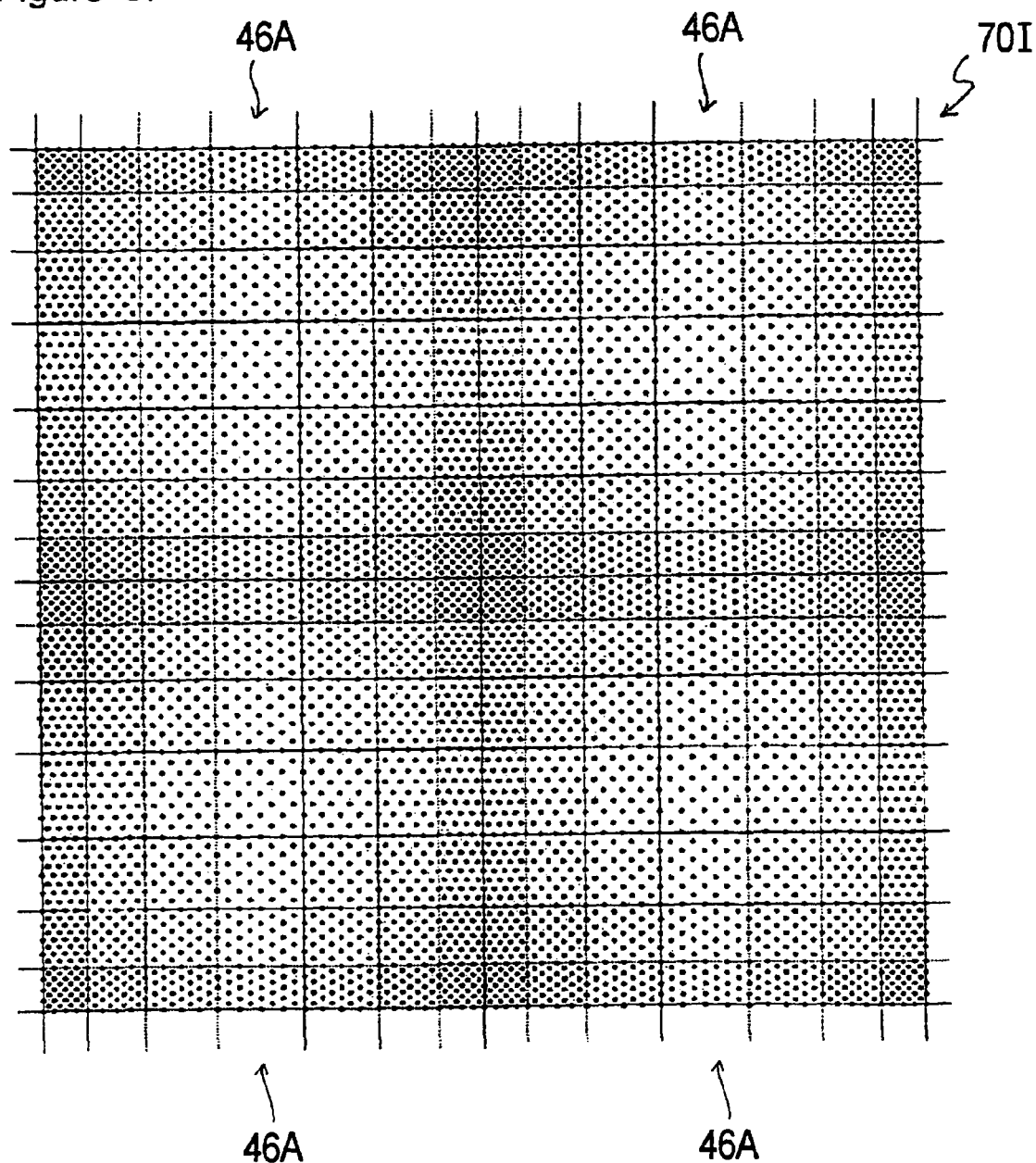
FIG. 37 is a view showing an example of the continuously deformed design portion in the stereoscopic sheet structure of the third embodiment.

As an example of another aspect of the repeating design 70, there is a repeating design 70I (not shown) that has a plurality of the continuously deformed design portion 46A shown in FIG. 37. FIG. 37 shows a part of the repeating design 70I. The repeating design 70I has a plurality of the continuously deformed design portions 46A that are continuously arranged in a vertical direction and a horizontal direction.

Although the repeating design 70I has only the same continuously deformed design portions 46A in plurality, the repeating design may be configured such that different continuously deformed design portions, e.g., at least two types of continuously deformed design portions that are selected from the group of continuously deformed design portions 46A through 53, are arranged in a predetermined pattern or randomly.

In the stereoscopic sheet structure 5, the principle in which the three-dimensional moiré designs of the repeating designs 70, 70A through 70I having the continuously deformed design portions 46 through 49A appear to be changing when the angle of observation is changed is described using the continuously deformed design portion 46 as an example.

When the repeating design 70 having the continuously deformed design portion 46 is viewed through the convex lens assembly 20, the continuously deformed design portion 46 as a three-dimensional design and the three-dimensional moiré design appears to be changing by gradually changing the angle of observation. As with the stereoscopic sheet structure 1, in the stereoscopic sheet structure 5, the three-dimensional visual effect of the continuously deformed design portion 46 is determined by the difference between the arrangement interval L between convex lenses 21 of the convex lens assembly 20 and the arrangement interval d between design units 31 of the continuously deformed design portion 40. Specifically, if the arrangement interval L is larger than the arrangement interval d, the repeating design 70 appears as though it is subducted, but if, on the other hand, the arrangement interval d is larger than the arrangement interval L, the repeating design 70 appears as though it is floating. The smaller the difference between the arrangement interval L and the arrangement interval d (absolute value), the larger the degree of subduction or the degree of floating seems.

Therefore, in the continuously deformed design portion 46 in which the arrangement intervals d of the design units 31 contained in the continuous sections are changed continuously or non-continuously and gradually or steplessly in each section, when the continuously deformed design portion 46 is viewed through the convex lens assembly 20, the degree of subduction or the degree of floating of the design units 31 appears to be continuously changing in each section. As a result, the state in which the continuously deformed design portion 46 that is viewed through the convex lens assembly 20 is subducted or floating is enhanced three-dimensionally, whereby the three-dimensional visual effect of the continuously deformed design portion 46 is improved.

Figure 38:
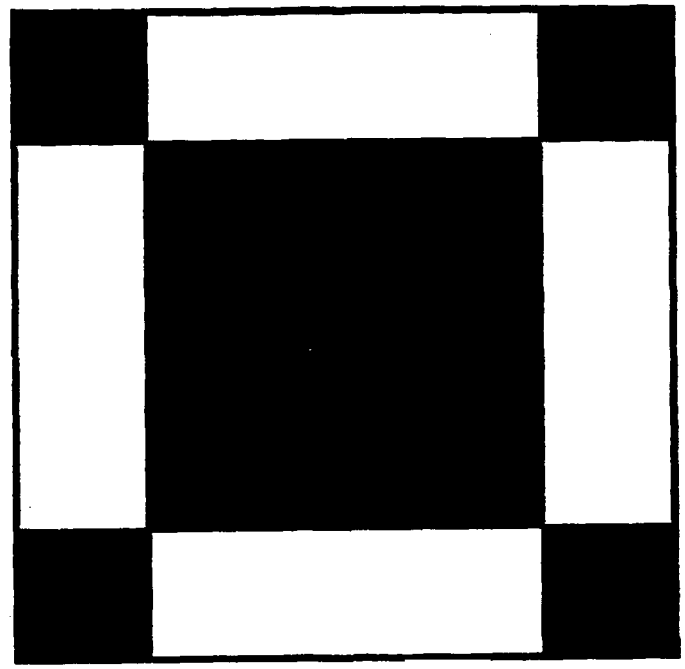
FIG. 38 is a schematic view showing a three-dimensional moiré design that can be observed when a continuously deformed design portion 46 is viewed from the top of a convex lens 21 configuring a convex lens assembly 20.
Figure 39:
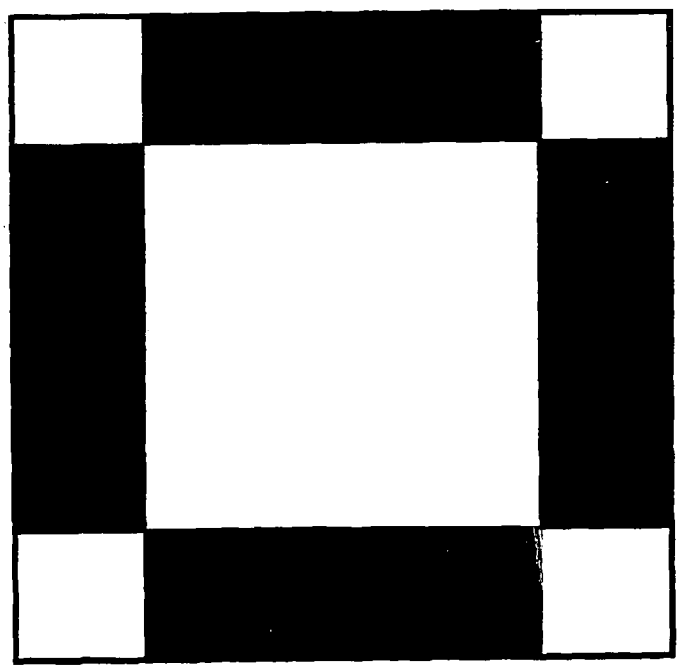
FIG. 39 is a schematic view showing a three-dimensional moiré design that can be observed when the angle of observation is moved in a horizontal direction to view the continuously deformed design portion 46 from the top of the convex lens 21 configuring the convex lens assembly 20.

On the other hand, if the angle for viewing the continuously deformed design portion 46 through the convex lens assembly 20 is changed from the top of the convex lenses 21 configuring the convex lens assembly 20 to a horizontal direction, the focal point of the convex lenses 21 is changed from the bottom of the convex lenses 21 to the horizontal direction. Therefore, when the continuously deformed design portion 46 is viewed from above the convex lenses 21, since the focal point of the convex lenses 21 is located below the convex lenses 21, the section that is located below the convex lenses 21 as a part of the continuously deformed design portion 46 appears three-dimensionally due to the difference between the arrangement interval L and the arrangement interval d. FIG. 38 shows the three-dimensional moiré design that can be observed in such a state. Next, the angle of observation is moved from the top of the convex lenses 21 to the horizontal direction to view the continuously deformed design portion 46, since the focal point of the convex lenses 21 is located to the position moved in the horizontal direction of the convex lenses 21, the section that is a part of the continuously deformed design portion 46 existing in a position focused by the convex lenses 21 appears three-dimensionally due to the difference between the arrangement interval L and the arrangement interval d. The three-dimensional moiré design that can be observed in such a state is a three-dimensional moiré design different from the three-dimensional moiré design shown in FIG. 38, since a part of the continuously deformed design portion 46 that has an arrangement interval different from the arrangement interval of the continuously deformed design portion 46 when viewing from above the convex lenses 21 is viewed through the convex lenses. FIG. 39 shows the three-dimensional moiré design that can be observed in such a state.

In this manner, when the angle of observation is changed from the top of the convex lenses 21 configuring the convex lens assembly 20 to the horizontal direction, the sections of the continuously deformed design portion 46 that are viewed through the convex lenses 21 vary. In the continuously deformed design portion 46, the design pattern 38 is deformed in the auxiliary line x direction and the auxiliary line y direction such that, at the same rate in the auxiliary line x direction and the auxiliary line y direction, the arrangement intervals sequentially decrease after sequentially increasing continuously or non-continuously and gradually or steplessly and become symmetric with respect to the section $D_{14}$ and the section $D_{41}$, thus, when the angle of observation is changed, the shape, size, density and the like of the design units contained in the sections configuring the continuously deformed design portion 46 observed from this angle appear differently according to the deformation of the design pattern 38. Therefore, when the angle for observing the continuously deformed design portion 46 through the convex lens assembly 20 is changed, the three-dimensional moiré design appears to be changing.

In the continuously deformed design portion 46, even when the angle for observing the continuously deformed design portion 46 through the convex lens assembly 20 is changed from the top of the convex lenses 21 configuring the convex lens assembly 20 to a vertical direction, the three-dimensional moiré design appears to be changing as with the case in which the angle for observing the continuously deformed design portion 46 through the convex lens assembly 20 from the top of the convex lenses 21 configuring the convex lens assembly 20 to the horizontal direction.

In this manner, when the continuously deformed design portion 46 is viewed through the convex lens assembly 20, the continuously deformed design portion appears to be subducted or floating three-dimensionally clearly, and when the continuously deformed design portion 46 is viewed through the convex lens assembly 20 the three-dimensional moiré design appears to be changing by changing the angle of observation even if the visual distance is long.

On the other hand, unlike the continuously deformed design portions 46 through 49, in the continuously deformed design portions 46A through 49A the arrangement intervals of the design units 31 change along with the arrangement angles of the design units 31, as described above. Therefore, compared to the continuously deformed design units 46 through 49, the three-dimensional moiré designs of the continuously deformed design portions 46A through 53 appears more clearly.

Therefore, the stereoscopic sheet structure 5 can be applied to, for example, a packaging material that is viewed from a short distance, and, for example, advertising display in the street, a poster, an advertisement tower, an information display board and the like that are normally viewed from a long distance.

In the continuously deformed design portion 47, specifically, the three-dimensional moiré design that is the same as that of the continuously deformed design portion 46 can be observed only in the vertical arrangement direction of the design units 31. Also, in the continuously deformed design portion 48, specifically, the three-dimensional moiré design that is opposite to that of the continuously deformed design portion 47 can be observed. Furthermore, in the continuously deformed design portion 49, specifically, the three-dimensional moiré design that is opposite to that of the continuously deformed design portion 46 can be observed. Moreover, in the repeating design 70D, specifically, the three-dimensional moiré design in which a plurality of the three-dimensional moiré designs same as those of the continuously deformed design portion 46 are connected can be observed.

Moreover, in the continuously deformed design portion 46A, specifically, the three-dimensional moiré design that is the same as that of the continuously deformed design portion 46 can be observed, although the arrangement directions of the design units 31 are different. In the continuously deformed design portion 49A, specifically, the three-dimensional moiré design that is opposite to that of the continuously deformed design portion 46A can be observed. In the continuously deformed design portion 47A, specifically, the three-dimensional moiré design that is the same as that of the continuously deformed design portion 46A only in the vertical direction can be observed. In the continuously deformed design portion 48A, specifically, the three-dimensional moiré design that is opposite to that of the continuously deformed design portion 47A can be observed. Moreover, in the repeating design 70E, specifically, the three-dimensional moiré design in which a plurality of the three-dimensional moiré designs the same as those of the continuously deformed design portion 46A are connected can be observed.

The stereoscopic sheet structure 5 can be basically produced as with the stereoscopic sheet structures 1 through 3 of the first embodiment. As with the repeating design portion 30, desired image data of the repeating designs 70, 70A through 70I having the continuously deformed design portions 46 through 49A can be created using the image editing software or the like by means of a personal computer.

As with the stereoscopic sheet structure 1 of the first embodiment, the stereoscopic sheet structure 5 may have a stacked body having two sheet members 10 and 11 or a stacked body in which three or more sheet members are stacked, as in the stereoscopic sheet structure 2 shown in FIG. 18. Similarly, as with the stereoscopic sheet structure 3 shown in FIG. 19, the stereoscopic sheet structure 5 may be provided with other design or the image 15 besides the repeating design 50.

The stereoscopic sheet structure of the present invention was described in the first embodiment, the second embodiment, and the third embodiment, but the stereoscopic sheet structure of the present invention may be a stereoscopic sheet structure that is obtained by combining these embodiments. For example, there may be configured a stereoscopic sheet structure that has a repeating design having at least two of the continuously deformed design portion of the stereoscopic sheet structure of the first embodiment, the line segment assembly portion of the stereoscopic sheet structure of the second embodiment, and the continuously deformed design portion of the stereoscopic sheet structure of the third embodiment. Moreover, there may be configured a stereoscopic sheet structure having a repeating design that is obtained by deforming a part or the whole of the line segment assembly portion of the stereoscopic sheet structure of the second embodiment, as with the continuously deformed design portion of the stereoscopic sheet structure of the first embodiment, such that the intervals of the line segments and the direction of extension of the line segments are changed continuously and gradually or steplessly, and/or a repeating design that is obtained by deforming the same such that the intervals of the line segments are changed continuously and gradually or steplessly, as with the continuously deformed design portion of the stereoscopic sheet structure of the third embodiment.

The invention claimed is:

1. A stereoscopic sheet structure comprising:
a convex lens assembly comprising a plurality of convex lenses provided on one surface of a first sheet member and disposed at predetermined first arrangement intervals and in predetermined first arrangement directions, wherein the convex lenses focus light on a focal plane; and
a repeating design portion which comprises one or more continuously deformed design portions in which a plurality of design units are arranged on the focal plane of the convex lenses at second arrangement intervals and in second arrangement directions which are different from the first arrangement intervals and/or the first arrangement directions of the convex lenses, and in which a design pattern that has the plurality of the design units arranged at third arrangement intervals which are different from the first arrangement intervals of the plurality of the convex lenses of the convex lens assembly has therein a plurality of sections which are obtained by division at regular intervals in the respective third arrangement directions of the design units wherein each of the sections has an equal number of the design units, and the design pattern is deformed such that a section formed along at least one of the second arrangement directions has a plurality of design units that are arranged in the one direction at second arrangement intervals that are different from second arrangement intervals that follow the one direction in the design units contained in another section adjacent to the section in the one direction, and in each section such that the second arrangement intervals of the design units of the sections formed along the one direction become larger sequentially after becoming smaller sequentially, or become smaller sequentially after becoming larger sequentially, so as to be symmetric.

2. The stereoscopic sheet structure according to claim 1, wherein the focal plane is on one surface of a second sheet member, and the first sheet member and the second sheet member are stacked detachably or integrally.

3. The stereoscopic sheet structure according to claim 1, wherein the focal plane is on the other surface of the first sheet member.

4. The stereoscopic sheet structure according to claim 1, wherein in deforming the design pattern, the design pattern is divided into a plurality of sections along two directions perpendicular to each other; the design pattern is deformed such that a section formed along at least one of the second arrangement directions has a section length which is different from a section length of the direction in at least one section that is adjacent to this section in at least one direction; and the design pattern is deformed such that the section lengths of the sections formed along the one direction become larger sequentially after becoming smaller sequentially, or become smaller sequentially after becoming larger sequentially, so as to be symmetric.

5. The stereoscopic sheet structure according to claim 4, wherein the design pattern is similarly deformed in each second arrangement direction.

6. The stereoscopic sheet structure according to claim 1, wherein the design pattern is deformed such that sections formed along each second arrangement directions have a plurality of the design units that are arranged along each of the second arrangement intervals which are different from the second arrangement intervals that follow two directions in the design units contained in another section adjacent to a section in the one direction.

7. The stereoscopic sheet structure according to claim 1, wherein the design pattern is deformed similarly in each of the third arrangement directions.

8. A stereoscopic sheet structure comprising:
a convex lens assembly comprising a plurality of convex lenses provided on one surface of a first sheet member and disposed at predetermined first arrangement intervals and in predetermined first arrangement directions, wherein the convex lenses focus light on a focal plane; and
a repeating design portion which comprises one or more continuously deformed design portions in which a plurality of design units which are arranged on the focal plane of the convex lenses at second arrangement intervals and in second arrangement directions which are different from the first arrangement intervals and/or the first arrangement directions of the convex lenses, and in which a design pattern that has the plurality of design units arranged at third intervals which are different from the first arrangement intervals of the convex lenses of the convex lens assembly has therein a plurality of divided sections at regular intervals in the respective third arrangement directions of the design units, wherein each of the sections has an equal number of the design units, and the design units are arranged such that the second arrangement intervals along at least one of the second directions are different from the second arrangement intervals that follow the one direction in the design units contained in at least one section adjacent to the section in the one direction, and such that in each section the second arrangement intervals of the design units of the sections formed along the one direction become larger sequentially after becoming smaller sequentially, or become smaller sequentially after becoming larger sequentially, so as to be symmetric.

* * * * *